US012282170B2

(12) United States Patent
Schowengerdt

(10) Patent No.: US 12,282,170 B2
(45) Date of Patent: Apr. 22, 2025

(54) AUGMENTED AND VIRTUAL REALITY DISPLAY SYSTEMS WITH CORRELATED IN-COUPLING AND OUT-COUPLING OPTICAL REGIONS FOR EFFICIENT LIGHT UTILIZATION

(71) Applicant: Magic Leap, Inc., Plantation, FL (US)

(72) Inventor: Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/516,321

(22) Filed: Nov. 21, 2023

(65) Prior Publication Data

US 2024/0085707 A1 Mar. 14, 2024

Related U.S. Application Data

(63) Continuation of application No. 18/068,294, filed on Dec. 19, 2022, now Pat. No. 11,860,370, which is a
(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0076* (2013.01)

(58) Field of Classification Search
CPC ............ G02B 27/0172; G02B 27/0093; G02B 6/0016; G02B 6/0076; G02B 26/105; G02B 2027/0123; G02B 2027/0125
See application file for complete search history.

(56) References Cited

U.S. PATENT DOCUMENTS 6,850,221 B1 2/2005 Tickle
10,197,804 B2 2/2019 Stenberg et al.
(Continued)

FOREIGN PATENT DOCUMENTS

AU 2017345780 A1 5/2019
CN 108803022 A 11/2018
(Continued)

OTHER PUBLICATIONS

CN202180060550.0 Office Action dated Jan. 4, 2024.
(Continued)

*Primary Examiner* — Andrew Jordan
(74) *Attorney, Agent, or Firm* — Tobias Intellectual Property Law, PLLC

(57) ABSTRACT

Augmented reality and virtual reality display systems and devices are configured for efficient use of projected light. In some aspects, a display system includes a light projection system and a head-mounted display configured to project light into an eye of the user to display virtual image content. The head-mounted display includes at least one waveguide comprising a plurality of in-coupling regions each configured to receive, from the light projection system, light corresponding to a portion of the user's field of view and to in-couple the light into the waveguide; and a plurality of out-coupling regions configured to out-couple the light out of the waveguide to display the virtual content, wherein each of the out-coupling regions are configured to receive light from different ones of the in-coupling regions. In some implementations, each in-coupling region has a one-to-one correspondence with a unique corresponding out-coupling region.

20 Claims, 42 Drawing Sheets

Related U.S. Application Data continuation of application No. 17/326,833, filed on May 21, 2021, now Pat. No. 11,543,666.

(60) Provisional application No. 63/050,635, filed on Jul. 10, 2020, provisional application No. 63/029,312, filed on May 22, 2020.

(56) References Cited

U.S. PATENT DOCUMENTS

| | | | |
|---|---|---|---|
| 10,254,454 B2 | 4/2019 | Klug et al. | |
| 10,520,737 B2* | 12/2019 | Yeoh | G02B 27/0172 |
| 10,534,177 B1 | 1/2020 | Chi et al. | |
| 10,690,826 B2 | 6/2020 | Klug et al. | |
| 10,698,215 B2 | 6/2020 | Welch et al. | |
| 10,725,223 B2 | 7/2020 | Schowengerdt et al. | |
| 10,739,593 B2 | 8/2020 | Cheng et al. | |
| 10,948,642 B2 | 3/2021 | Klug et al. | |
| 11,067,732 B2 | 7/2021 | Klug et al. | |
| 11,209,650 B1 | 12/2021 | Trail | |
| 11,231,584 B2 | 1/2022 | Klug et al. | |
| 11,287,657 B2 | 3/2022 | Klug | |
| 11,415,805 B2 | 8/2022 | Huang et al. | |
| 11,428,938 B2 | 8/2022 | Yaroshchuk et al. | |
| 11,531,202 B2 | 12/2022 | Bohn et al. | |
| 11,543,666 B2 | 1/2023 | Schowengerdt | |
| 11,604,354 B2 | 3/2023 | Trisnadi et al. | |
| 11,614,626 B2* | 3/2023 | Miller | G06F 3/013 345/156 |
| 11,614,628 B2 | 3/2023 | Klug et al. | |
| 11,644,669 B2* | 5/2023 | Yeoh | G06F 3/013 345/8 |
| 11,649,935 B2* | 5/2023 | Wei | F21K 9/69 362/615 |
| 11,733,523 B2* | 8/2023 | Sinay | G02B 27/0172 345/8 |
| 11,825,228 B2* | 11/2023 | Berkovich | H04N 25/709 |
| 11,828,942 B2* | 11/2023 | Sissom | G02B 27/0179 |
| 11,828,946 B2* | 11/2023 | Meitav | G02B 27/0093 |
| 11,841,481 B2* | 12/2023 | Sinay | G06T 19/006 |
| 11,841,511 B2* | 12/2023 | Trisnadi | G02B 6/0016 |
| 11,860,370 B2 | 1/2024 | Schowengerdt | |
| 11,888,002 B2* | 1/2024 | Berkovich | H04N 25/40 |
| 11,914,155 B2* | 2/2024 | Zhu | G02B 27/0179 |
| 11,948,089 B2* | 4/2024 | Berkovich | H04N 25/00 |
| 11,960,638 B2* | 4/2024 | Berkovich | G06F 18/251 |
| 11,962,928 B2* | 4/2024 | Reyserhove | H04N 25/40 |
| 12,032,166 B2* | 7/2024 | Curtis | G02B 27/01 |
| 12,034,015 B2* | 7/2024 | Berkovich | H04N 25/772 |
| 12,055,722 B2* | 8/2024 | Trisnadi | G09G 3/002 |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2014/0300966 A1 | 10/2014 | Travers et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2015/0378162 A1 | 12/2015 | Bailey et al. | |
| 2016/0011419 A1 | 1/2016 | Gao | |
| 2016/0026253 A1 | 1/2016 | Bradski et al. | |
| 2017/0010466 A1 | 1/2017 | Klug et al. | |
| 2017/0010488 A1 | 1/2017 | Klug et al. | |
| 2017/0235146 A1 | 8/2017 | Jarvenpaa | |
| 2017/0248790 A1 | 8/2017 | Cheng | |
| 2017/0276948 A1 | 9/2017 | Welch et al. | |
| 2017/0307886 A1 | 10/2017 | Stenberg et al. | |
| 2018/0052277 A1 | 2/2018 | Schowengerdt et al. | |
| 2018/0106996 A1 | 4/2018 | Bailey et al. | |
| 2018/0113311 A1 | 4/2018 | Klug et al. | |
| 2018/0143509 A1 | 5/2018 | Oh | |
| 2018/0172995 A1 | 6/2018 | Lee et al. | |
| 2018/0188528 A1 | 7/2018 | Browy et al. | |
| 2018/0275410 A1* | 9/2018 | Yeoh | G06F 3/011 |
| 2018/0275411 A1 | 9/2018 | Schowengerdt et al. | |
| 2018/0275415 A1 | 9/2018 | Schowengerdt et al. | |
| 2018/0284884 A1 | 10/2018 | Sulai et al. | |
| 2018/0374266 A1 | 12/2018 | Schowengerdt et al. | |
| 2019/0086674 A1* | 3/2019 | Sinay | G02B 27/0172 |
| 2019/0179149 A1* | 6/2019 | Curtis | G02B 27/0176 |
| 2019/0187474 A1 | 6/2019 | Bhargava et al. | |
| 2019/0227211 A1 | 7/2019 | Klug et al. | |
| 2019/0293941 A1* | 9/2019 | Yeoh | G06F 3/011 |
| 2019/0339447 A1 | 11/2019 | Shipton et al. | |
| 2019/0361256 A1 | 11/2019 | Miller | |
| 2019/0391393 A1 | 12/2019 | Ayres et al. | |
| 2020/0117005 A1 | 4/2020 | Chi et al. | |
| 2020/0143516 A1 | 5/2020 | Martin et al. | |
| 2020/0271840 A1 | 8/2020 | Klug et al. | |
| 2020/0284967 A1 | 9/2020 | Schowengerdt et al. | |
| 2020/0301147 A1 | 9/2020 | Klug | |
| 2020/0409156 A1 | 12/2020 | Sissom et al. | |
| 2021/0026140 A1 | 1/2021 | Kasegawa | |
| 2021/0199868 A1 | 7/2021 | Klug et al. | |
| 2021/0199958 A1 | 7/2021 | Huang et al. | |
| 2021/0199970 A1 | 7/2021 | Huang et al. | |
| 2021/0294103 A1 | 9/2021 | Klug et al. | |
| 2021/0311310 A1 | 10/2021 | Trisnadi et al. | |
| 2021/0341661 A1 | 11/2021 | Klug et al. | |
| 2021/0389593 A1* | 12/2021 | Miller | G02F 1/133502 |
| 2021/0397004 A1 | 12/2021 | Schowengerdt | |
| 2022/0011578 A1* | 1/2022 | Sinay | G02B 6/0023 |
| 2022/0035161 A1* | 2/2022 | Sinay | G02B 27/0172 |
| 2022/0137408 A1 | 5/2022 | Bohn et al. | |
| 2022/0146834 A1 | 5/2022 | Klug et al. | |
| 2022/0206295 A1 | 6/2022 | Calafiore et al. | |
| 2022/0221724 A1 | 7/2022 | Klug | |
| 2022/0269340 A1 | 8/2022 | Hirvonen et al. | |
| 2022/0283434 A1 | 9/2022 | Sato et al. | |
| 2022/0413302 A1* | 12/2022 | Meitav | G02B 27/0172 |
| 2023/0118284 A1 | 4/2023 | Schowengerdt | |
| 2023/0221582 A1* | 7/2023 | Stafford | G02C 7/10 359/630 |
| 2023/0237678 A1* | 7/2023 | Tervonen | G02B 27/0172 345/633 |
| 2023/0251492 A1* | 8/2023 | Yeoh | G06T 19/006 345/8 |
| 2023/0384499 A1* | 11/2023 | Klug | G02B 26/103 |
| 2024/0036332 A1* | 2/2024 | Sissom | G02B 6/0065 |
| 2024/0085707 A1* | 3/2024 | Schowengerdt | G02B 27/0172 |
| 2024/0126090 A1* | 4/2024 | Sinay | G02B 27/0172 |
| 2024/0231101 A1* | 7/2024 | Trisnadi | H04N 13/398 |

FOREIGN PATENT DOCUMENTS

| | | |
|---|---|---|
| CN | 109239842 A | 1/2019 |
| WO | 2019178060 A1 | 9/2019 |
| WO | 2021237115 A | 11/2021 |

OTHER PUBLICATIONS

PCTUS2021033700 International Preliminary Report on Patentability dated Nov. 17, 2022.
PCTUS2021033700 International Search Report and Written Opinion mailed Aug. 24, 2021.
EP21808925.8 Extended European Search Report dated May 6, 2024.
ARToolKit: https://web.archive.org/web/20051013062315/http://www.hitl.washington.edu:80/artoolkit/documentation/hardware.htm, archived Oct. 13, 2005.

(56) References Cited

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

CN202180060550.0 Office Action dated Aug. 8, 2024.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

JP2022-570304 Office Action mailed Aug. 2, 2024.

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

JP2024-184902 Office Action mailed Feb. 7, 2025.

\* cited by examiner

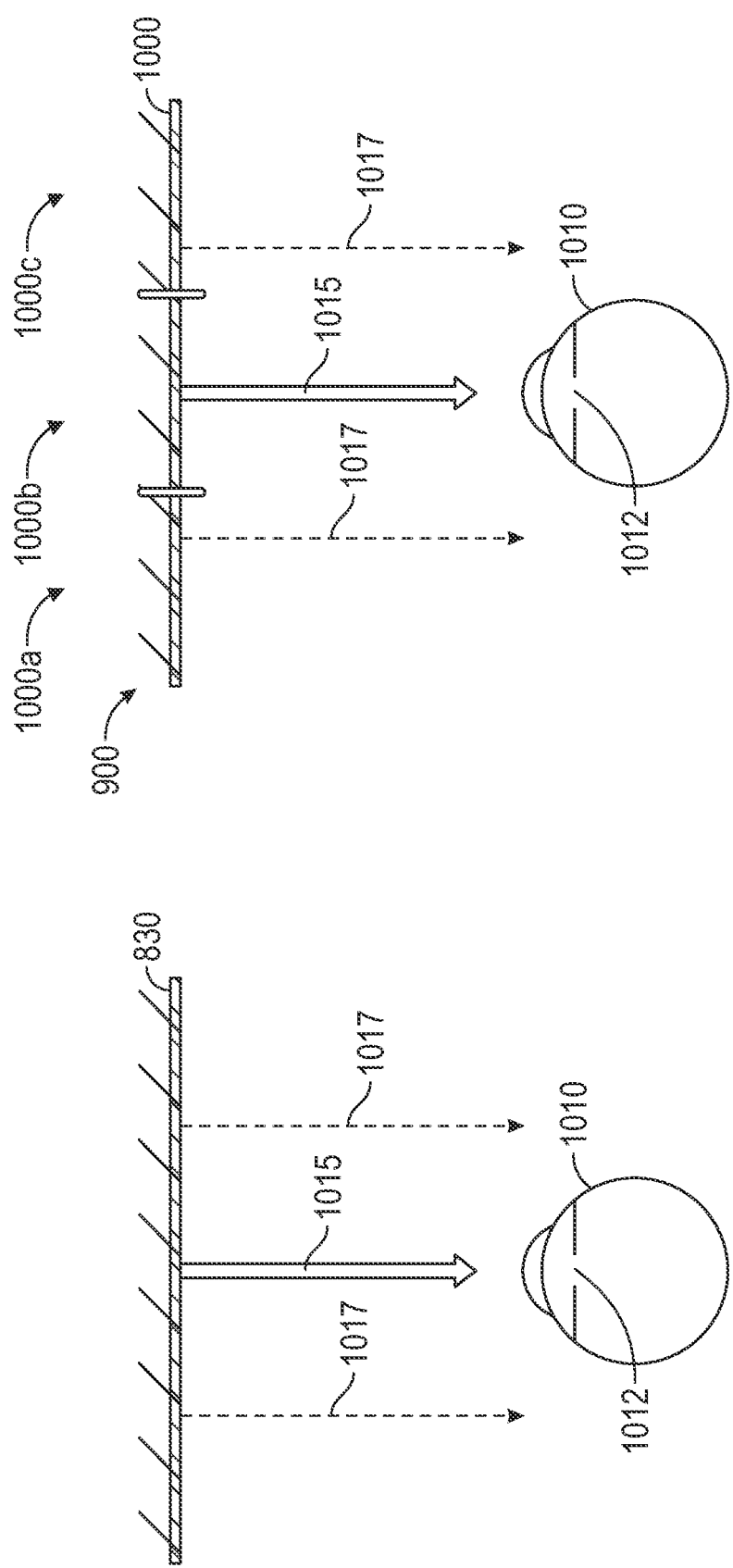

a)

b)

a)

b)

AUGMENTED AND VIRTUAL REALITY DISPLAY SYSTEMS WITH CORRELATED IN-COUPLING AND OUT-COUPLING OPTICAL REGIONS FOR EFFICIENT LIGHT UTILIZATION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 18/068,294 filed on Dec. 19, 2022, titled "AUGMENTED AND VIRUTAL REALITY DISPLAY SYSTEMS WITH CORRELATED IN-COUPLING AND OUT-COUPLING OPTICAL REGIONS FOR EFFICIENT LIGHT UTILIZATION", which is a continuation of U.S. patent application Ser. No. 17/326,833 filed on May 21, 2021, titled "AUGMENTED AND VIRUTAL REALITY DISPLAY SYSTEMS WITH CORRELATED IN-COUPLING AND OUT-COUPLING OPTICAL REGIONS FOR EFFICIENT LIGHT UTILIZATION", which claims priority to U.S. Provisional Patent Application No. 63/029,312 filed on May 22, 2020, titled "METHOD AND SYSTEM FOR DUAL PROJECTOR WAVEGUIDE DISPLAYS WITH WIDE FIELD OF VIEW," and U.S. Provisional Patent Application No. 63/050,635 filed on Jul. 10, 2020, titled "AUGMENTED AND VIRTUAL REALITY DISPLAY SYSTEMS WITH CORRELATED IN-COUPLING AND OUT-COUPLING OPTICAL REGIONS FOR EFFICIENT LIGHT UTILIZATION". The entire contents of each of the above-listed applications are hereby incorporated by reference into this application.

This application is related to U.S. Patent App. Pub. No. 2018/0275410, published Sep. 27, 2018, entitled "DEPTH BASED FOVEATED RENDERING FOR DISPLAY SYSTEMS", U.S. Pat. No. 10,573,042, entitled "PERIOCULAR TEST FOR MIXED REALITY CALIBRATION", issued Feb. 25, 2020, and U.S. Patent App. Pub. No. 2019/0222830, entitled "DISPLAY SYSTEMS AND METHODS FOR DETERMINING REGISTRATION BETWEEN A DISPLAY AND A USER'S EYES", published July 18.2019, U.S. Pat. No. 10,296,792, filed issued May 21, 2019, entitled "IRIS BOUNDARY ESTIMATION USING CORNEA CURVATURE". U.S. Patent Publication No. 2017/0053165, published Feb. 23, 2017, entitled "EYELID SHAPE ESTIMATION USING EYE POSE MEASUREMENT". U.S. Patent Publication No. 2017/0053166, published Feb. 23, 2017, entitled "EYELID SHAPE ESTIMATION". U.S. Patent App. Pub. No. 2019/0243558, published Aug. 8, 2019, entitled "EYE CENTER OF ROTATION DETERMINATION. DEPTH PLANE SELECTION, AND RENDER CAMERA POSITIONING IN DISPLAY SYSTEMS". International Pub. No. WO 2021/01166, published Jan. 21, 2021, entitled "EYE CENTER OF ROTATION DETERMINATION WITH ONE OR MORE EYE TRACKING CAMERAS." U.S. Patent App. Pub. No. 2018/0113311, published Apr. 26, 2018, entitled "SYSTEM AND METHOD FOR PRESENTING IMAGE CONTENT ON MULTIPLE DEPTH PLANES BY PROVIDING MULTIPLE INTRA-PUPIL PARALLAX VIEWS". International Patent Pub. No. WO 2019/173158, published Sep. 12, 2019, entitled "DISPLAY SYSTEM WITH LOW-LATENCY PUPIL TRACKER". U.S. Patent App. Pub. No. 2017/0293145, published Oct. 12, 2017, entitled "AUGMENTED REALITY SYSTEMS AND METHODS WITH VARIABLE FOCUS LENS ELEMENTS", and U.S. Patent App. Pub. No. 2018/0113311, published Apr. 26, 2018, entitled "SYSTEM AND METHOD FOR PRESENTING IMAGE CONTENT ON MULTIPLE DEPTH PLANES BY PROVIDING MULTIPLE INTRA-PUPIL PARALLAX VIEWS", the entire contents of each of which are hereby incorporated by reference in their entirety.

BACKGROUND

Field

The present disclosure relates to display systems and, more particularly, to augmented and virtual reality display systems.

Description of the Related Art

Modem computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to display technology, including AR and VR technology.

SUMMARY

Aspects of the disclosure will now be set forth in detail with respect to the figures and various examples. One of skill in the art will appreciate, however, that other configurations of the devices and methods disclosed herein will still fall within the scope of this disclosure even if not described in the same detail. Aspects of various configurations discussed do not limit the scope of the disclosure herein, which is instead defined by the claims following this description.

Various examples of display systems that project light to one or more eyes of a user to display virtual image content in a vision field of said user are described herein, such as the examples enumerated below:

Example 1: A head-mountable display system configured to project light to display virtual image content, the display system comprising: a light projection system; and a head-mountable display configured to display virtual image content, the head-mountable display including at least one waveguide, the at least one waveguide comprising: a plurality of in-coupling regions each configured to receive, from the light projection system, light having image information for forming the virtual image content and to in-couple the light into the waveguide; and a plurality of out-coupling regions configured to out-couple the light out of the waveguide to display the virtual content, wherein each of the plurality of out-coupling regions are configured to receive light from different ones of the in-coupling regions.

Example 2: The display system of Example 1, wherein each in-coupling region of the plurality of in-coupling regions corresponds to and is configured to selectively direct light to a unique out-coupling region of the plurality of out-coupling regions.

Example 3: The display system of Examples 1 or 2, wherein each in-coupling region is a diffractive grating having at least one of a tilt, a grating orientation, grating structure size, or a grating pitch selected to cause light in-coupled by the in-coupling region to be preferentially out-coupled by the out-coupling region corresponding to the in-coupling region.

Example 4: The display system of any one of Examples 1-3, wherein the light-coupling region is configured to redirect incident light from the light projection system at angles for total internal reflection through the waveguide along a propagation direction, further comprising light-distributing structures configured to redirect a portion of the light to propagate along an axis crossing the propagation direction.

Example 5: The display system of any one of Examples 1-4, wherein the light-distributing structures and the plurality of out-coupling regions are disposed on opposing major surfaces of the at least one waveguide.

Example 6: The display system of any one of Examples 1-5, wherein the plurality of in-coupling regions comprise diffractive gratings.

Example 7: The display system of any one of Examples 1-6, wherein each of the plurality of in-coupling regions has a different grating pitch than at least one other in-coupling region of the waveguide.

Example 8: The display system of any one of Examples 1-7, wherein the different grating pitch changes total internal reflection angles at which light incoupled into the waveguide undergoes total internal reflection towards the waveguide towards an associated out-coupling region of the plurality of out-coupling regions.

Example 9: The display system of any one of Examples 1-6, wherein each of the plurality of in-coupling regions has a different grating orientation, within the plane of the waveguide, than at least one other in-coupling region of the waveguide.

Example 10: The display system of any one of Examples 1-9, wherein the different grating orientations change the angles at which light is coupled into the waveguide such that the light propagates towards an intended out-coupling region of the plurality of out-coupling regions.

Example 11: The display system of any one of Examples 1-10, wherein each of the plurality of in-coupling regions has a different tilt, relative to the plane of the waveguide, than at least one other in-coupling region of the waveguide.

Example 12: The display system of any one of Examples 1-11, wherein the in-coupling regions are spaced apart from one another.

Example 13: The display system of any one of Examples 1-12, wherein the light in-coupling regions are disposed in a row around at least one side of the plurality of out-coupling regions.

Example 14: The display system of any one of Examples 1-13, wherein each of the out-coupling regions defines a stripe across the waveguide, the stripe elongated along an axis crossing the row of in-coupling regions.

Example 15: The display system of any one of Examples 1-14, wherein the out-coupling regions define a grid pattern across the waveguide.

Example 16: The display system of any one of Examples 1-15, wherein each of the plurality of in-coupling regions is arranged to in-couple light and direct that light to propagate by total internal reflection along a different direction, within the waveguide, than at least one other in-coupling region of the waveguide.

Example 17: The display system of any one of Examples 1-16, wherein at least one in-coupling region proximate a lateral edge of the at least one out-coupling region is configured to in-couple light along a range of angles symmetrically disposed about an inwardly biased axis.

Example 18: The display system of any one of Examples 1-17, wherein at least two of the plurality of in-coupling regions are disposed along different sides of at least one of the plurality of out-coupling regions.

Example 19: The display system of any one of Examples 1-18, wherein the plurality of in-coupling regions comprise an in-coupling optical element surrounding the at least one of the plurality of out-coupling regions on at least three sides.

Example 20: The display system of any one of Examples 1-19, wherein the light projection system comprises a light source and a movable light injector configured to direct image light to individual ones of the in-coupling regions.

Example 21: The display system of any one of Examples 1-20, wherein the head-mountable display comprises a plurality of waveguides forming a waveguide stack, each of the waveguides comprising a plurality of the in-coupling regions and the out-coupling regions, wherein the in-coupling regions of each of the waveguides are laterally displaced as seen in a head-on plan view as viewed from a direction of in-coming light incident on the in-coupling regions.

Example 22: The display system of any one of Examples 1-21, wherein out-coupling regions of a same waveguide are configured to output light with a same wavefront divergence, wherein out-coupling regions of different waveguides are configured to output light with different amounts of wavefront divergence than out-coupling regions of at least one other waveguide, wherein the different amounts of wavefront divergence corresponding to different depth planes.

Example 23: The display system of any one of Examples 1-22, wherein the in-coupling regions of each waveguide are configured to in-couple light of a range of wavelengths corresponding to a same component color, wherein in-coupling regions of some waveguides are configured to in-couple light of ranges of wavelengths corresponding to different component colors than in-coupling regions of other waveguides.

Example 24: The display system of any one of Examples 1-23, wherein the light projection system comprises: a light source comprising an array of light emitters; a spatial light modulator configured to modulate light from the light source; and projection optics mounted on the frame and configured to direct light from the spatial light modulator to the in-coupling regions, wherein the display system is configured to activate different pluralities of the light emitters to provide the virtual image content on different depth planes, wherein the display system is configured to: provide a relatively large distance between individual light emitters of a plurality of light emitters for providing the virtual image content on a relatively close depth plane; and provide a relatively small distance between individual light emitters of a plurality of light emitters for providing the virtual image content on a relatively far depth plane.

Example 25: The display system of any one of Examples 1-24, configured to activate each of the light emitters of a plurality of light emitters sequentially at different times, wherein the display system is configured to synchronize activation of each light emitter with the display of a different parallactically-disparate intra-pupil image.

Example 26: The display system of any one of Examples 1-25, wherein the light source is a micro-display and the light emitters are light emitting diodes.

Example 27: The display system of any one of Examples 1-26, further comprising variable focus lens elements on opposing sides of the waveguide.

Example 28: The display system of any one of Examples 1-27, wherein the light projection system comprises a plurality of projectors, and wherein a projector of the plurality of projectors is configured to provide image content for no more than a subdivided portion of a FOV of the head mounted display.

Example 29: A display system comprising: a light projection system; a head-mountable display configured to project light into an eye of a user to display virtual image content, the head-mounted display comprising: at least one waveguide comprising: a plurality of light in-coupling regions configured to receive light from the light projection system; and a plurality of light out-coupling regions configured to output light to the eye of the user; and processing electronics in communication with the display and the inward-facing imaging system, the processing electronics comprising one or more processors and one or more computer storage media storing instructions that when executed by the one or more processors, cause the one or more processors to perform operations comprising: determining a light out-coupling region associated with an eye pose of the eye; and providing instructions to direct light from the light projection system to a light in-coupling region associated with the determined light out-coupling region.

Example 30: The display system of Example 29, wherein determining the light out-coupling region comprises determining an intersection of the line of sight of the eye with one of the plurality of light out-coupling regions.

Example 31: The display system of Example 29 or 30, wherein the light in-coupling regions are disposed in a row around at least one side of the plurality of out-coupling regions.

Example 32: The display system of Example 29, wherein the light projection system comprises at least one light source and at least one movable light injector configured to output image light.

Example 33: The display system of any one of Examples 29-32, wherein the at least one movable light injector comprises a scanning mirror.

Example 34: The display system of any one of Examples 29-33, wherein the at least one movable light injector comprises a scanning fiber injector.

Example 35: The display system of any one of Examples 29-34, wherein the light projection system comprises at least one light source and at least one spatial light modulator configured to modulate light from the light source.

Example 36: The display system any one of Examples 29-35, wherein the head-mounted display is configured to display virtual objects on a plurality of depth planes.

Example 37: The display system of any one of Examples 29-36, wherein the operations comprise injecting sets of parallactically-disparate intra-pupil images of the virtual objects into the eye to display the virtual objects on one of the depth planes.

Example 38: The display system of any one of Examples 29-37, wherein the operations comprise injecting each of the sets of parallactically-disparate intra-pupil images within a flicker fusion threshold.

Example 39: The display system of any one of Examples 29-39, wherein the operations comprise providing instructions to direct light to a plurality of in-coupling elements in a light in-coupling region of the plurality of in-coupling regions associated with the determined light out-coupling region.

Example 40: The display system of any one of Examples 29-39, further comprising at least one variable focus lens element on a user side of the at least one waveguide, wherein the first variable focus lens element is configured to modify the projected light to correct for a refractive error of the eye of the user.

Example 41: The display system of any one of Examples 29-40, wherein the operations further comprise determining a fixation point of the eye and applying a correction corresponding to the fixation point.

Example 42: The display system of any one of Examples 29-41 further comprising an inward-facing imaging system configured to capture one or more images of an eye of the user, wherein the operations comprise: receiving images of the eye of the user captured by the inward-facing imaging system; and identify the eye pose based on the received images.

Example 43: The display system of any one of Examples 29-42, wherein the at least one waveguide is one of a plurality of waveguides forming a waveguide stack, each of the waveguides comprising a plurality of the in-coupling regions and the out-coupling regions, wherein the in-coupling regions of each of the waveguides are laterally displaced as seen in a head-on plan view as viewed from a direction of in-coming light incident on the in-coupling regions.

Example 44: The display system of any one of Examples 29-43, wherein out-coupling regions of a same waveguide are configured to output light with a same wavefront divergence, wherein out-coupling regions of different waveguides are configured to output light with different amounts of wavefront divergence than out-coupling regions of at least one other waveguide, and wherein the different amounts of wavefront divergence corresponding to different depth planes.

Example 45: The display system of any one of Examples 29-44, wherein the in-coupling regions of each waveguide are configured to in-couple light of a range of wavelengths corresponding to a same component color, wherein in-coupling regions of some waveguides are configured to in-couple light of ranges of wavelengths corresponding to different component colors than in-coupling regions of other waveguides.

Example 46: The display system of any one of Examples 29-45, wherein the light projection system comprises a plurality of projectors, and wherein a projector of the plurality of projectors is configured to provide image content for no more than a subdivided portion of a FOV of the head mounted display towards.

Example 47: A display system comprising: a light projection system; a head-mounted display configured to project light into an eye of the user to display virtual image content, the head-mounted display comprising: at least one waveguide comprising: a plurality of light in-coupling regions configured to receive light from the light projection system: and a plurality of light out-coupling regions configured to output light to the eye of the user; and processing electronics in communication with the display, the processing electronics comprising one or more processors and one or more computer storage media storing instructions that when executed by the one or more processors, cause the one or more processors to perform operations comprising: determining a location for a virtual object in a field of view of the user; identifying an out-coupling region corresponding to the location; and providing instructions to direct light from the light projection system to a light in-coupling region associated with the determined light out-coupling region.

Example 48: The display system of Example 47, wherein identifying the out-coupling region comprises: determining an eye pose of the eye; and determining an out-coupling region overlapping the location to be occupied by the virtual object in the field of view.

Example 49: The display system of Example 47 or 48, wherein the operations comprise providing movement for the virtual object.

Example 50: The display system of any one of Examples 47-49, wherein the operations comprise providing temporal changes to a visual property of the virtual object over time, wherein the visual property comprises one or more of color, size, and brightness.

Example 51: The display system of any one of Examples 47-50, wherein the light in-coupling regions are disposed in a row around at least one side of the plurality of out-coupling regions.

Example 52: The display system of any one of Examples 47-52, wherein the light projection system comprises at least one light source and at least one movable light injector configured to output image light.

Example 53: The display system of any one of Examples 47-52, wherein the at least one movable light injector comprises a scanning mirror.

Example 54: The display system of any one of Examples 47-52, wherein the at least one movable light injector comprises a scanning fiber injector.

Example 55: The display system of any one of Examples 47-51, wherein the light projection system comprises at least one light source and at least one spatial light modulator configured to modulate light from the light source.

Example 56: The display system of any one of Examples 47-55, wherein the head-mounted display is configured to display virtual objects on a plurality of depth planes.

Example 57: The display system of any one of Examples 47-56, wherein the operations comprise injecting sets of parallactically-disparate intra-pupil images of the virtual objects into the eye to display the virtual objects on one of the depth planes.

Example 58: The display system of any one of Examples 47-56, wherein the operations comprise providing instructions to direct light to a plurality of in-coupling elements in a light in-coupling region of the plurality of in-coupling regions associated with the determined light out-coupling region.

Example 59: The display system of any one of Examples 47-56, further comprising at least one variable focus lens element on a user side of the at least one waveguide, wherein the first variable focus lens element is configured to modify the projected light to correct for a refractive error of the eye of the user.

Example 60: The display system of any one of Examples 47-59 further comprising an inward-facing imaging system configured to capture one or more images of an eye of the user, wherein the operations comprise: receiving images of the eye of the user captured by the inward-facing imaging system; and identifying the eye pose based on the received images.

Example 61: The display system of any one of Examples 47-60, wherein the at least one waveguide is one of a plurality of waveguides forming a waveguide stack, each of the waveguides comprising a plurality of the in-coupling regions and the out-coupling regions, wherein the in-coupling regions of each of the waveguides are laterally displaced as seen in a head-on plan view as viewed from a direction of in-coming light incident on the in-coupling regions.

Example 62: The display system of any one of Examples 47-61, wherein out-coupling regions of a same waveguide are configured to output light with a same wavefront divergence, wherein out-coupling regions of different waveguides are configured to output light with different amounts of wavefront divergence than out-coupling regions of at least one other waveguide, and wherein the different amounts of wavefront divergence corresponding to different depth planes.

Example 63: The display system of any one of Examples 47-62, wherein the in-coupling regions of each waveguide are configured to in-couple light of a range of wavelengths corresponding to a same component color, wherein in-coupling regions of some waveguides are configured to in-couple light of ranges of wavelengths corresponding to different component colors than in-coupling regions of other waveguides.

Example 64: The display system of any one of Examples 47-63, wherein the in-coupling regions comprise diffractive gratings.

Example 65: The display system of any one of Examples 47-64, wherein the out-coupling regions comprise diffractive gratings.

Example 66: The display system of any one of Examples 47-65, wherein the light projection system comprises a plurality of projectors, and wherein a projector of the plurality of projectors is configured to provide image content for no more than a subdivided portion of a FOV of the head mounted display.

Example 67: A head-mountable display system configured to project light to display virtual image content, the display system comprising: a light projection system; and a head-mountable display configured to display virtual image content, the head-mounted display including at least one waveguide, the at least one waveguide comprising: a plurality of in-coupling regions proximate to at least one lateral edge of the at least one waveguide, wherein each waveguide is configured to receive, from the light projection system, light having image information for forming the virtual image content and to in-couple the light into the waveguide.

Example 68: The display system of Example 67, further comprising a plurality of out-coupling regions configured to out-couple the light out of the waveguide to display the virtual content, wherein each of the plurality of out-coupling regions are configured to receive light from different ones of the in-coupling regions.

Example 69: The display system of Example 67 of 68, wherein at least two of the plurality of in-coupling regions are disposed along different lateral edges of at least one out-coupling region of the plurality of out-coupling regions.

Example 70: The display system of any one of Examples 67-69, wherein the plurality of in-coupling regions encircles the plurality of out-coupling regions.

Example 71: The display system of any one of Examples 67-70, wherein each in-coupling region of the plurality of in-coupling regions corresponds to and is configured to selectively direct light to a unique out-coupling region of the plurality of out-coupling regions.

Example 72: The display system of any one of Examples 67-71, wherein the light-coupling region is configured to redirect incident light from the light projection system at angles for total internal reflection through the waveguide along a propagation direction, further comprising light-distributing structures configured to redirect a portion of the light to propagate along an axis crossing the propagation direction.

Example 73: The display system of any one of Examples 67-72, wherein the light-distributing structures and the plurality of out-coupling regions are disposed on opposing major surfaces of the at least one waveguide.

Example 74: The display system of any one of Examples 67-73, wherein the out-coupling regions define a grid pattern across the waveguide.

Example 75: The display system of any one of Examples 67-74, wherein the head-mountable display comprises a plurality of waveguides forming a waveguide stack, each of the waveguides comprising a plurality of the in-coupling regions and the out-coupling regions, wherein the in-coupling regions of each of the waveguides are laterally displaced as seen in a head-on plan view as viewed from a direction of in-coming light incident on the in-coupling regions.

Example 76: The display system of any one of Examples 67-75, wherein out-coupling regions of a same waveguide are configured to output light with a same wavefront divergence, wherein out-coupling regions of different waveguides are configured to output light with different amounts of wavefront divergence than out-coupling regions of at least one other waveguide, wherein the different amounts of wavefront divergence corresponding to different depth planes.

Example 77: The display system of any one of Examples 67-76, wherein the in-coupling regions of each waveguide are configured to in-couple light of a range of wavelengths corresponding to a same component color, wherein in-coupling regions of some waveguides are configured to in-couple light of ranges of wavelengths corresponding to different component colors than in-coupling regions of other waveguides Example 78: The display system of any one of Examples 67-77, wherein the plurality of in-coupling regions comprise diffractive gratings.

Example 79: The display system of any one of Examples 67-78, wherein each of the plurality of in-coupling regions has a different grating pitch than at least one other in-coupling region of the waveguide.

Example 80: The display system of any one of Examples 67-79, wherein each of the plurality of in-coupling regions has a different grating orientation, within the plane of the waveguide, than at least one other in-coupling region of the waveguide.

Example 81: The display system of any one of Examples 67-80, wherein each of the plurality of in-coupling regions has a different tilt, relative to the plane of the waveguide, than at least one other in-coupling region of the waveguide.

Example 82: The display system of any one of Examples 67-81, wherein the in-coupling regions are spaced apart from one another.

Example 83: The display system of any one of Examples 67-82, wherein each of the plurality of in-coupling regions is arranged to in-couple light and to direct that light to propagate by total internal reflection along a different direction, within the waveguide, than at least one other in-coupling region of the waveguide.

Example 84: The display system of any one of Examples 67-83, wherein the light projection system comprises at least one light source and at least one movable light injector configured to direct image light to individual ones of the in-coupling regions.

Example 85: The display system of any one of Examples 67-84, wherein the light projection system comprises: at least one light source comprising an array of light emitters; at least one spatial light modulator configured to modulate light from the light source; and projection optics mounted on the frame and configured to direct light from the spatial light modulator to the in-coupling regions, wherein the display system is configured to activate different pluralities of the light emitters to provide the virtual image content on different depth planes, wherein the display system is configured to: provide a relatively large distance between individual light emitters of a plurality of light emitters for providing the virtual image content on a relatively close depth plane; and provide a relatively small distance between individual light emitters of a plurality of light emitters for providing the virtual image content on a relatively far depth plane.

Example 86: The display system of any one of Examples 67-86, configured to activate each of the light emitters of a plurality of light emitters sequentially at different times, wherein the display system is configured to synchronize activation of each light emitter with the display of a different parallactically-disparate intra-pupil image.

Example 87: The display system of any one of Examples 67-86, further comprising variable focus lens elements on opposing lateral edges of the waveguide.

Example 88: The display system of any one of Examples 67-87, wherein the light projection system comprises a plurality of projectors, and wherein a projector of the plurality of projectors is configured to provide image content for no more than a subdivided portion of a FOV of the head mounted display.

Details of one or more implementations of the subject matter described in this specification are set forth in the accompanying drawings and the description below. Other features, aspects, and advantages will become apparent from the description, the drawings, and the claims. Neither this summary nor the following detailed description limit the scope of the inventive subject matter.

BRIEF DESCRIPTION OF THE DRAWINGS

FIG. 10A illustrates an example out-coupling element out-coupling light from a waveguide towards an eye of a user.

FIG. 10B illustrates an example configuration of segmentation, into different out-coupling regions, of the example out-coupling element of FIG. 10A.

FIG. 17A-1 schematically illustrates an example coordinate system for determining an eye pose of an eye.

DETAILED DESCRIPTION

Figure 1:
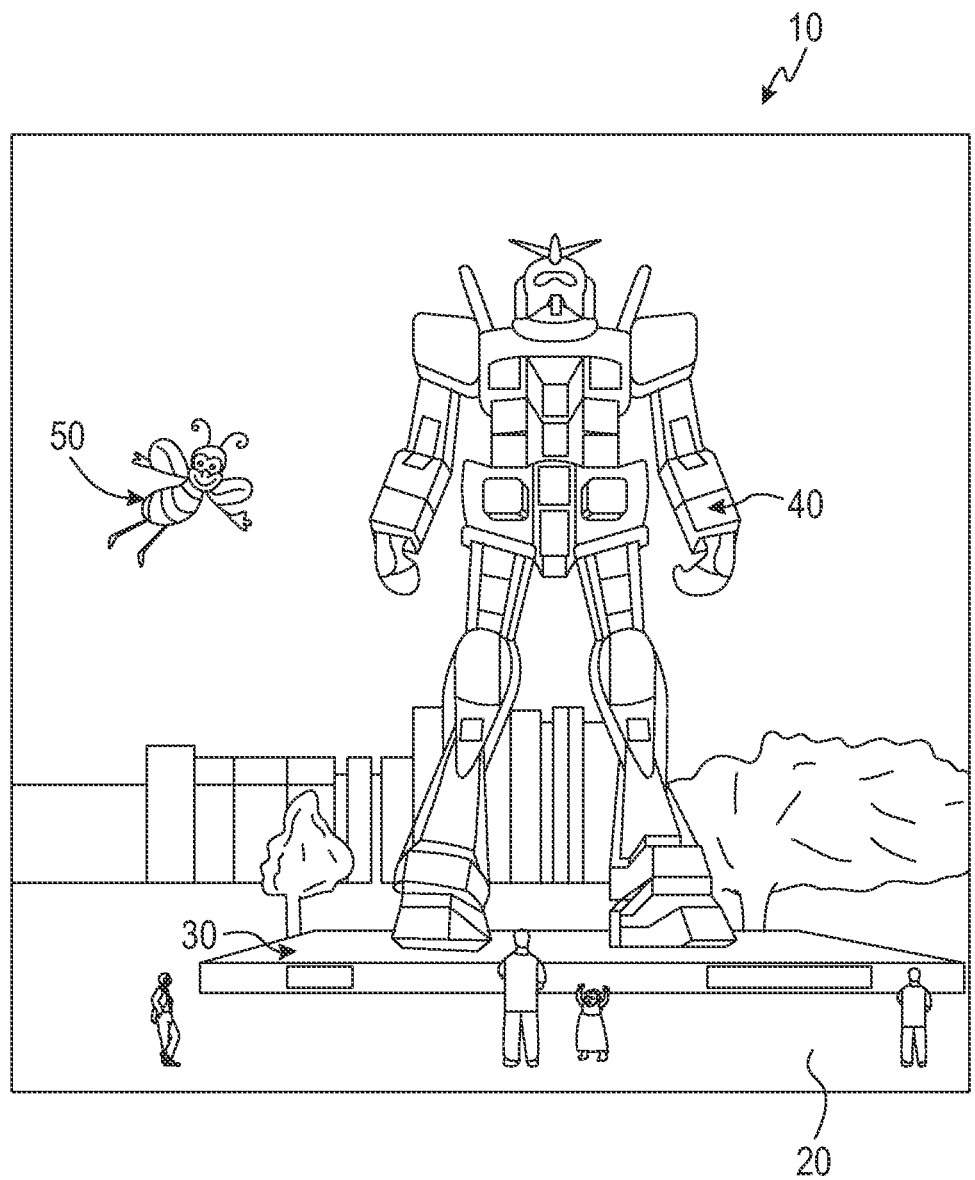
FIG. 1 illustrates a user's view of an augmented reality (AR) scene through an AR device.

AR and/or VR systems may display virtual content to a user, or viewer. For example, this content may be displayed on a head-mounted display, e.g., as part of eyewear, that projects image information to the user's eyes. In addition, where the system is an AR system, the display may also transmit light from the surrounding environment to the user's eyes, to allow a view of that surrounding environment. As used herein, it will be appreciated that a "head-mounted" or "head mountable" display is a display that may be mounted on the head of a viewer or user. Such displays may be understood to form parts of a display system.

In various augmented reality and virtual reality display systems, a waveguide may extend across an associated eye of the user. The waveguide may be configured to output image light with image information to form images in the eye. For example, the light may be outputted using out-coupling elements (which may be gratings) that redirect light out of the waveguide towards the eye.

It will be appreciated that the eye may move relative to the waveguide. To ensure that the eye continues to receive image light, even if it moves, the waveguide may output image light with similar image information across the entire expanse of a viewing area of the waveguide. This allows the eye to receive image light even if it moves and becomes aligned with different areas of the waveguide. While a portion of the light out-coupled by the out-coupling element may be usefully directed into the pupil of the eye, where it will enter the eye to form images, other light out-coupled by the out-coupling element may not be incident on the pupil of the eye and thus does not contribute to the images seen by the eye. Thus, while energy is used to generate all of the outputted light, only a small portion of that light reaches the eye to form images. Undesirably, the light not entering the pupil of the eye and the energy used to generate that light may be considered "wasted" to some extent, since it is not perceived by the viewer.

Advantageously, in some implementations, display systems disclosed herein allow light to be highly efficiently utilized. Rather than outputting light across the entirety of the viewing area of a waveguide, light is selectively outputted from regions of the waveguide aligned with the eye, thereby increasing the proportion of outputted light that enters the pupil of the eye. Preferably, these regions occupy an area that is less than the entirety of the viewing area of the waveguide and, in some implementations, greater than the area of an average eye pupil, which may result in dividing the viewing area into two or more, three or more, four or more, or nine or more distinct light out-coupling regions. Thus, light is not outputted and wasted across the entirety of the viewing area, while the output area is sufficiently large to provide a desired field of view and provide some tolerance for movement of the eyes.

In some implementations, out-coupling regions may have unique associated, or correlated, in-coupling regions. It will be appreciated that in-coupling regions receive image light (such as light modulated by a spatial light modulator), and in-couple this image light in the waveguide, such that it propagates towards and is incident on the out-coupling regions, where the light is out-coupled to propagate towards the eye of the user. In some implementations, light distributing features may also be utilized to distribute light from the in-coupling regions along an axis across a desired out-coupling region. Because the in-coupling regions selectively steer light towards associated, or correlated, out-coupling regions, the out-coupling region for outputting light may be selected by directing light into the associated in-coupling region or regions. Advantageously, in addition to energy efficiency, by associating particular in-coupling regions with particular out-coupling regions, flexibility in the placement of the in-coupling regions may be provided. For example, in-coupling regions may be distributed in a row across the waveguide and/or around the perimeter of the waveguide, which may have advantages for providing a slimmer form factor or wider range of waveguide shapes than in-coupling regions which must be localized in the same part of a waveguide.

It will be appreciated that the display system may include a light projection system configured to selectively direct light into one or more desired in-coupling regions. In some examples, a light projection system may include a projector or plurality of projectors and/or a projector may function as a light source in some implementations. Since the light projection system inputs light into in-coupling regions, it may also be referred to as a light injection system. The light projection system may include a single projection device or multiple projection devices (such as light projectors). In some implementations, the field of view (FOV) of the display system may be subdivided into multiple portions, and each of the light projection devices may be configured to project image content for an associated portion of the full FOV. Thus, in some implementations, each projector provides image content for no more than a subdivided portion of the field of view of the display system. It will be appreciated that, to provide acceptable image quality, the optics and related systems for forming the full FOV may be complicated and large in size, particularly where the projection system collimates light for input into a waveguide. On the other hand, the optics and related systems for a projector for forming only a portion of the FOV may be simpler, and in some implementations, the total size of a light projection system having multiple light projectors (each providing image content for a portion of the full field of view) may be smaller than the size of a single light projection system that provides image content for the full FOV. Thus, advantageously, the use of multiple light projectors may facilitate a smaller form factor than a system with a single light projector for the full field of view.

In some implementations, the light projection system may include a mechanically actuated structure to physically adjust the direction of outputted image light towards the desired in-coupling region. For example, the light projection system may include one or more switchable mirrors which may, for example rotate to direct light from one or more light sources into the desired in-coupling region(s). In some other implementations, the light projection system may include one or more scanning fibers which scan over the in-coupling regions and are configured to output light when the output end of the scanning fiber is aligned with a location corresponding to the desired in-coupling region.

In some other implementations, the light projection system may electrically switch light output onto different in-coupling regions without mechanical actuation. For example, the light projection system may include a plurality of individually-activated light sources arranged to provide unique light paths to individual corresponding ones of the in-coupling regions. As a result, activation of an appropriate light source may be utilized to direct light into a desired in-coupling region. In some implementations, a spatial light modulator may be provided in the light path between the light source and the in-coupling region, to encode light from the light source with image information to form images.

In some implementations, the appropriate out-coupling region for outputting light may be selected based upon a determination of the orientation of the eye, e.g., the orientation of the pupil of the eye. For example, the display system may include an inward-facing camera that images the eye to determine its orientation. In some implementations, the line of sight of the eye may be extrapolated to determine the intersection of the line of sight with the out-coupling regions. The intersecting light-out coupling region may be understood to be the desired region for receiving image light to be outputted to the eye.

In some implementations, in conjunction with eye pose, the location of a virtual object to be displayed may be utilized to select the out-coupling region to receive image light for output. For example, the virtual object may be understood to be located in a particular part of the user's field of view, which overlaps with a particular out-coupling region. As a result, that out-coupling region may be designated to receive image light. In some implementations, this out-coupling region may also intersect the line of sight of the eye, particularly in cases where the virtual object is an object expected to draw the user's attention (e.g., where the virtual object exhibits movement, and/or temporal changes to a visual property, such as changes in color, size, brightness, etc.).

Advantageously, the display systems according to some implementations may provide three-dimensional presentations of virtual objects with a high degree of viewing comfort. It will be appreciated that the left and right eyes of a user may be presented with different views of a virtual object to provide vergence cues to provide an impression of depth through stereoscopy. In addition, the display systems may be configured to output light with different levels of wavefront divergence, to elicit the appropriate accommodation response for a desired depth. As a result, accommodation-vergence matching may be achieved, which may provide a comfortable and realistic viewing experience.

In some implementations, different levels of wavefront divergence may be achieved using a plurality of waveguides forming a stack of waveguides. The out-coupling regions of each waveguide may include out-coupling features (e.g., a diffractive grating) configured to out-couple light with particular amounts of wavefront divergence. Thus, a desired amount of wavefront divergence may be selected by directing image light into the in-coupling regions of a waveguide having out-coupling regions with out-coupling features configured to output light with that desired amount of wavefront divergence. In some implementations, the in-coupling regions for different waveguides may be laterally displaced, as seen in a top-down plan view. Thus, different waveguides may be selected by directing light into different in-coupling regions. For example, a particular in-coupling region may be associated with a particular waveguide, and also a particular out-coupling region within that waveguide.

In some implementations, in addition to or as an alternative to a plurality of waveguides outputting light with different amounts of wavefront divergence, one or more variable focus lens elements may be provided to modify the wavefront divergence of light propagating to the eye from the waveguide. In some implementations, the variable focus lens elements may alternatively, or in addition, be used to provide refractive error correction for light propagating towards the eye.

In some other implementations, the light projection system may include in array of discrete light sources that direct light from different angles through projection optics to provide parallactically-disparate intra-pupil images for approximating different amounts of wavefront divergence. In some implementations, the selectable separation between the discrete light sources may be utilized to modulate the wavefront divergence. For example, a relatively large distance between individual light sources may provide wavefront divergence corresponding to a relatively close depth plane, while a relatively small distance between individual light sources may provide wavefront divergence corresponding to a relatively far depth plane. Image light for the parallactically-disparate intra-pupil images may be directed to the appropriate in-coupling region as noted here. For example, a mechanically actuated structure such as a scanning mirror or a scanning fiber may be utilized to direct the image light for the parallactically-disparate intra-pupil images to the appropriate in-coupling region.

Implementations of the present technology may provide various advantages. For example, implementations disclosed herein may advantageously improve display system efficiency by increasing the proportion of the light produced by a light projection system that is used to form images perceived by a user, while reducing the proportion of the light that falls on other portions of the user's eye or face, or that otherwise does not contribute to the images perceived by the user. By selectively out-coupling light toward the pupil, such systems may reduce the amount of light energy generated by the light projection system or other display light source in order to produce an image of a given brightness in the eye of a user. Moreover, because a larger proportion of generated light is directed into the eye, image brightness may be improved. In addition, less energy may be directed to light generation for a desired brightness, thereby allowing energy usage to be redistributed for other uses, such as for computational processes, which may have advantages for image rendering, reducing latency, etc.

It is of note that in-coupling elements may be referred to herein as input coupling elements, in-coupling gratings (or ICGs), diffractive input coupling elements, or the like. Similarly, out-coupling elements may be referred to herein as output coupling elements, diffractive output coupling elements, or the like.

Reference will now be made to the drawings, in which like reference numerals refer to like parts throughout. Unless indicated otherwise, the drawings are schematic and not necessarily drawn to scale.

Example Display Systems

Figure 2:
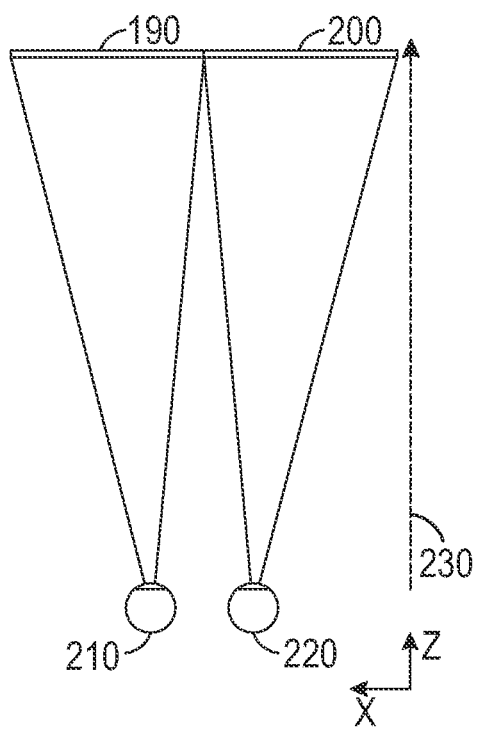
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
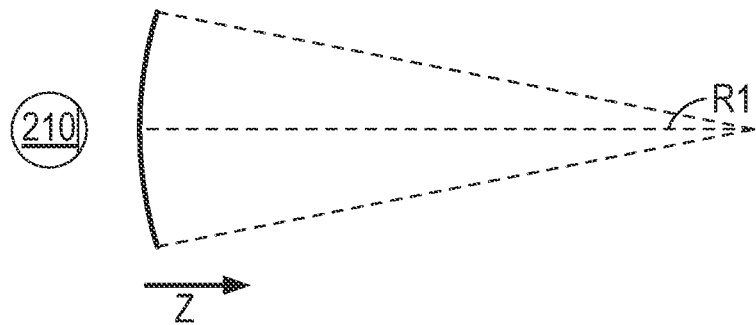
FIGS. 3A-3C illustrate relationships between radius of curvature and focal radius.
Figure 3B:
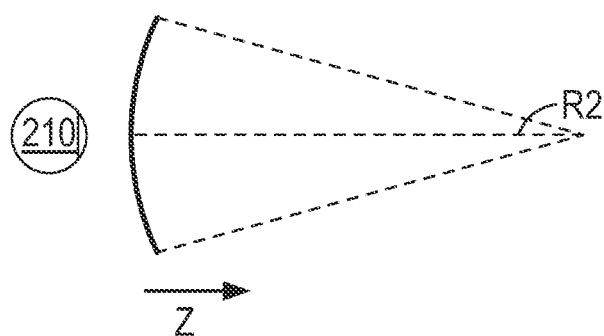
Figure 3C:
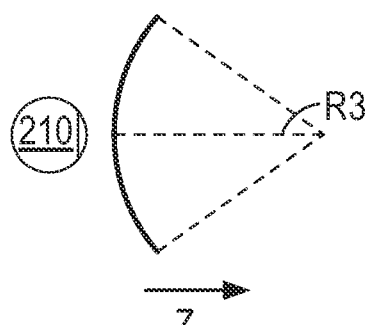

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it will be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
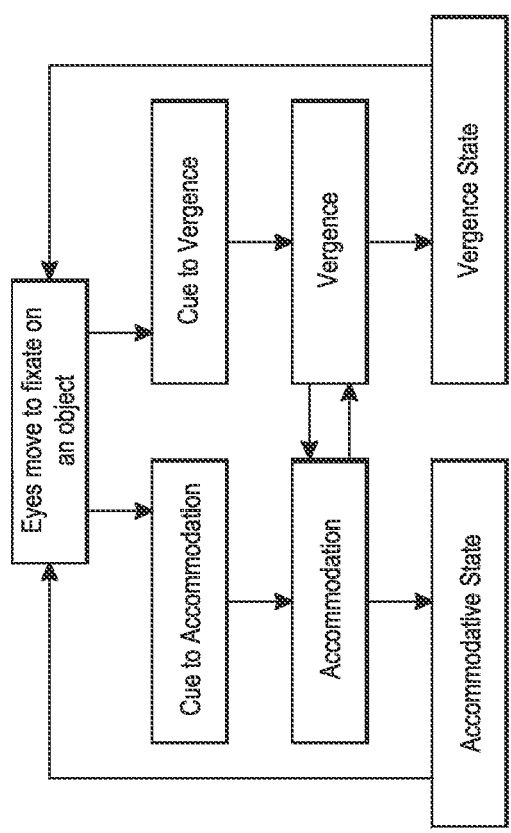
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
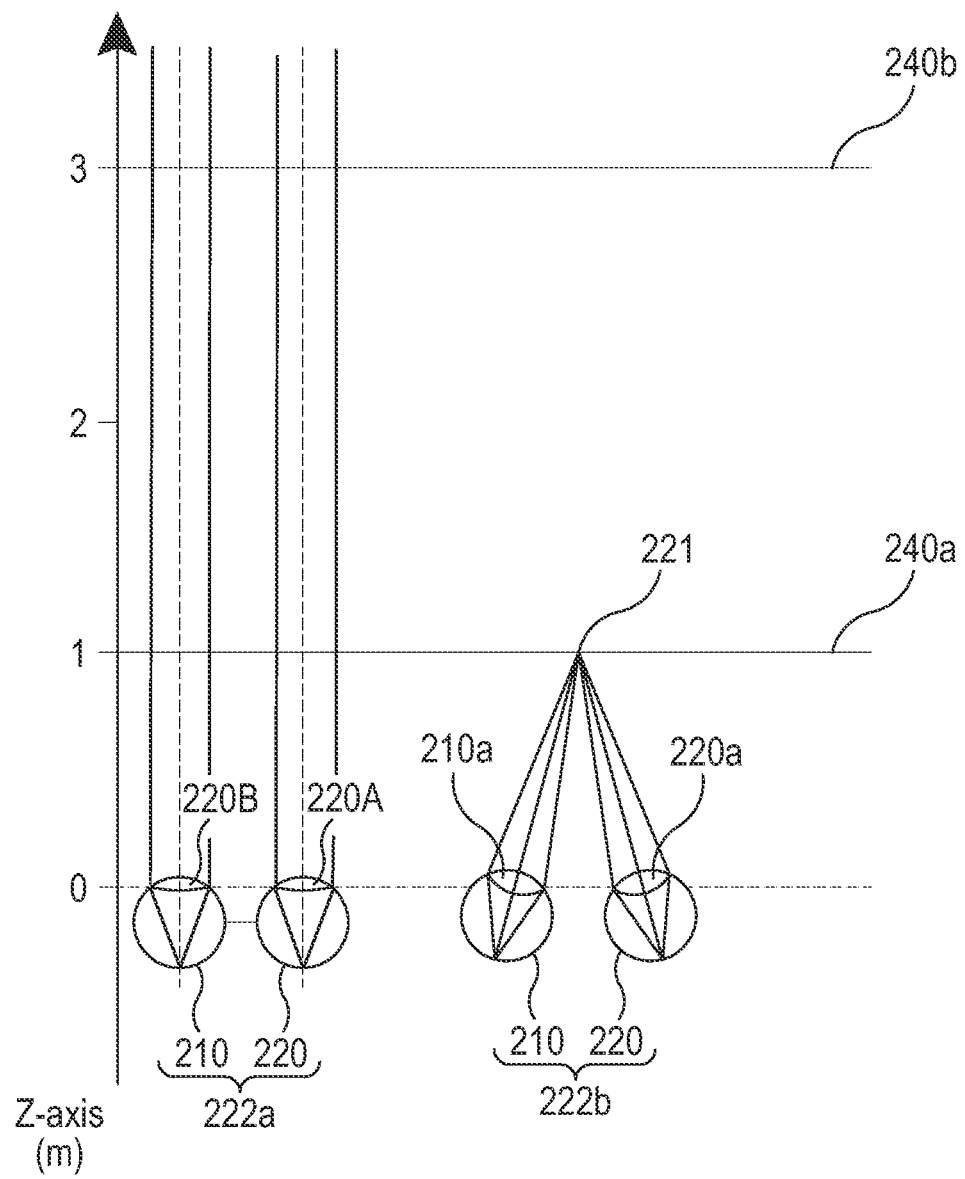
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a. 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some implementations, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated implementation, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
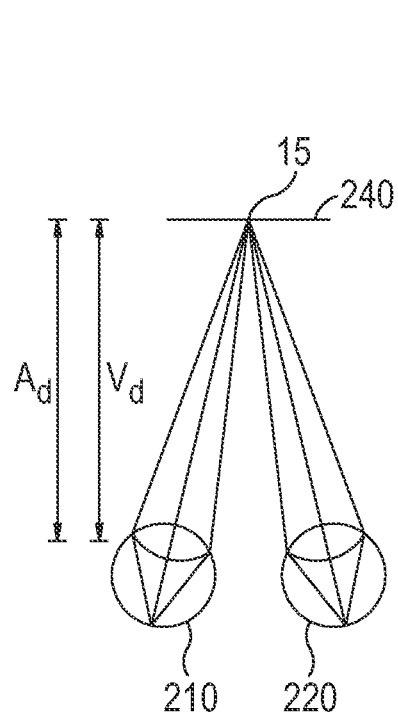
FIG. 4C illustrates an example of a representation of a top-down view of a user viewing content via a display system.
Figure 4D:
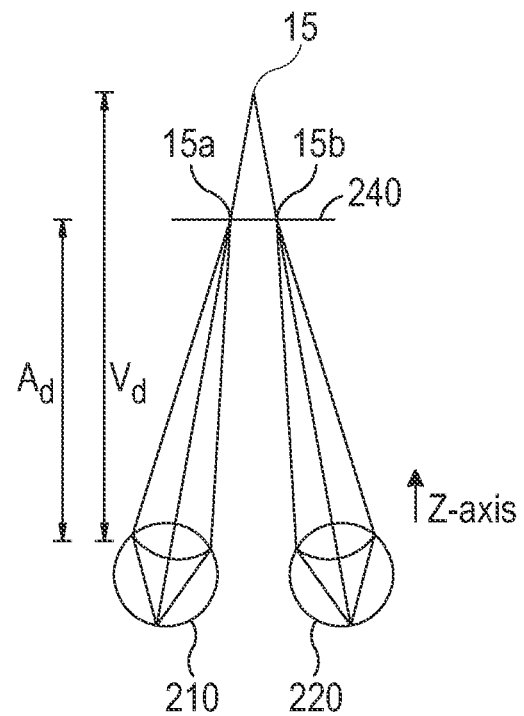
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some implementations. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some implementations, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some implementations, display systems disclosed herein (e.g., the display system 250, FIG. 6) present images to the viewer having accommodation-vergence mismatch of about 0.5 diopter or less. In some other implementations, the accommodation-vergence mismatch of the images provided by the display system is about 0.33 diopter or less. In yet other implementations, the accommodation-vergence mismatch of the images provided by the display system is about 0.25 diopter or less, including about 0.1 diopter or less.

Figure 5:
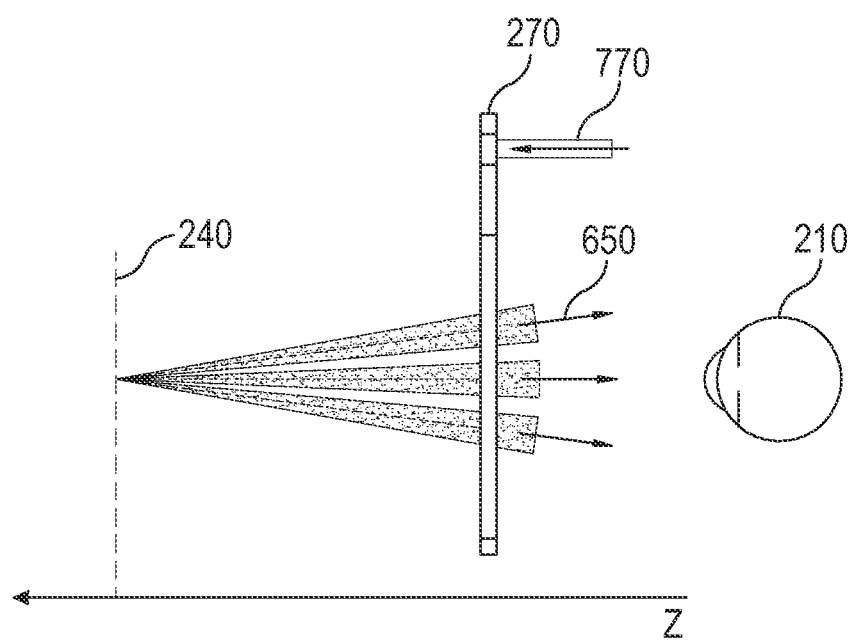
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some implementations, the same amount of wavefront divergence is provided for all objects presented on that depth plane. In addition, it will be illustrated that the other eye of the user may be provided with image information from a similar waveguide.

In some implementations, a single waveguide may be configured to output light with a set amount of wavefront divergence corresponding to a single or limited number of depth planes and/or the waveguide may be configured to output light of a limited range of wavelengths. Consequently, in some implementations, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
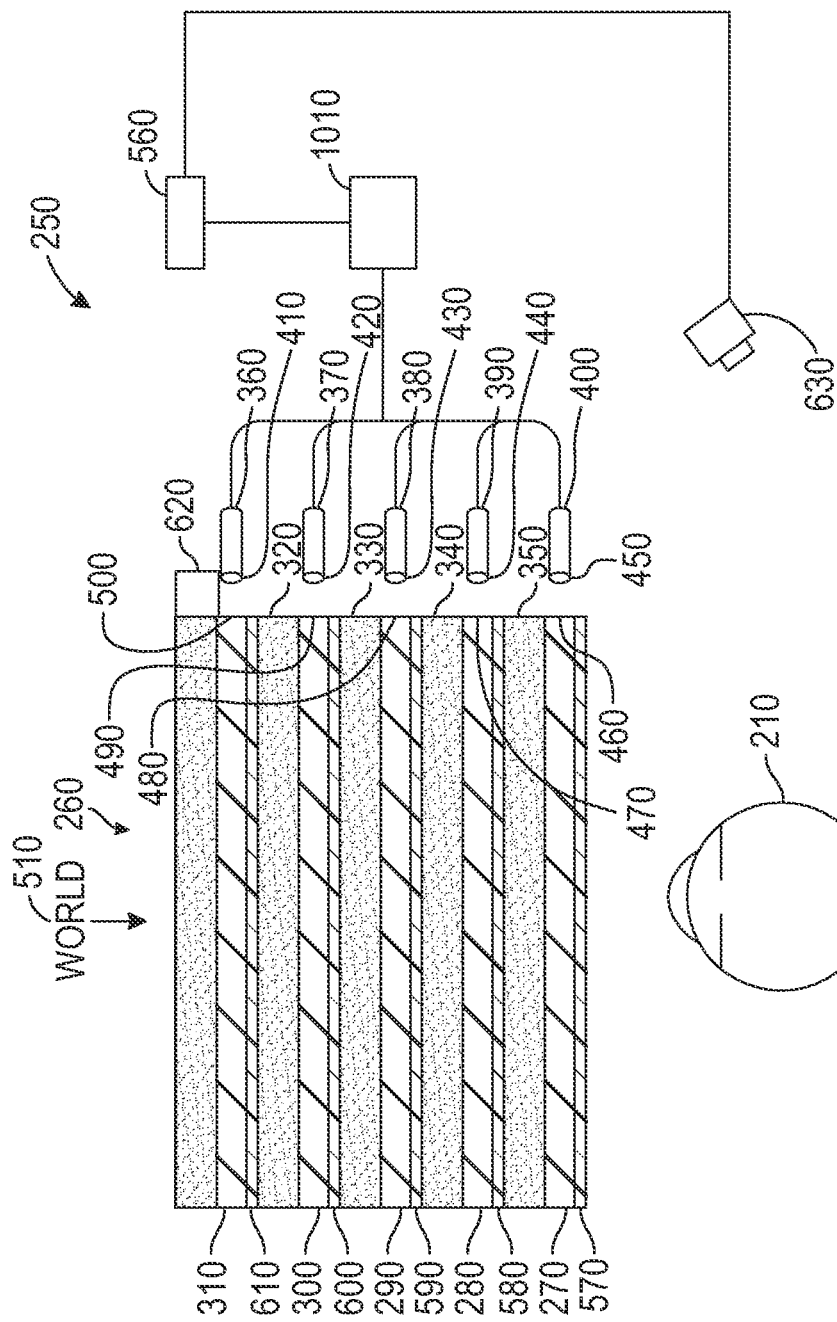
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some implementations. In addition, the waveguide assembly 260 may also be referred to as an eyepiece.

In some implementations, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some implementations, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some implementations, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some implementations, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some implementations, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some implementations, a single one of the image injection devices 360, 370, 380, 390, 400 may be associated with and inject light into a plurality (e.g., three) of the waveguides 270, 280, 290, 300, 310.

In some implementations, the image injection devices 360, 370, 380, 390, 400 are discrete displays that each produce image information for injection into a corresponding waveguide 270, 280, 290, 300, 310, respectively. In some other implementations, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some implementations, the light injected into the waveguides 270, 280, 290, 300, 310 is encoded with image information and provided by a light projection system 1010, as discussed further herein. In some implementations, the light projection system 1010 may comprise one or more emissive pixel arrays. It will be appreciated that the emissive pixel arrays may each comprise a plurality of light-emitting pixels, which may be configured to emit light of varying intensities and colors. It will be appreciated that the image injection devices 360, 370, 380, 390, 400 are illustrated schematically and, in some implementations, these image injection devices may represent different light paths and locations in a common projection system configured to output light into associated ones of the waveguides 270, 280, 290, 300, 310. In some implementations, the waveguides of the waveguide assembly 260 may function as ideal lens while relaying light injected into the waveguides out to the user's eyes. In this conception, the object may be the pixel array of the light projection system 1010 and the image may be the image on the depth plane.

A controller 560 controls the operation of one or more of the stacked waveguide assembly 260, including operation of the image injection devices 360, 370, 380, 390, 400, the light projection system 1010. In some implementations, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some implementations, the controller may be a single integral device, or a distributed system connected by wired or wireless communication channels. The controller 560 may be part of the processing modules 140 or 150 (FIG. 9D) in some implementations.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some implementations, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some implementations, the out-coupling optical elements 570, 580, 590, 600, 610 may be formed in a layer of material that is attached to a transparent substrate to form the waveguides 270, 280, 290, 300, 310. In some other implementations, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative implementations, either or both may be dynamic using electro-active features.

In some implementations, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some implementations, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some implementations, the features 320, 330, 340, 350 may not be lenses; rather, they may simply be spacers (e.g., cladding layers and/or structures for forming air gaps).

In some implementations, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some implementations, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some implementations, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some implementations, the camera assembly 630 may include an image capture device and a light source to project light (e.g., infrared light) to the eye, which may then be reflected by the eye and detected by the image capture device. In some implementations, the camera assembly 630 may be attached to the frame 80 (FIG. 9D) and may be in electrical communication with the processing modules 140 and/or 150, which may process image information from the camera assembly 630. In some implementations, one camera assembly 630 may be utilized for each eye, to separately monitor each eye.

Figure 7:
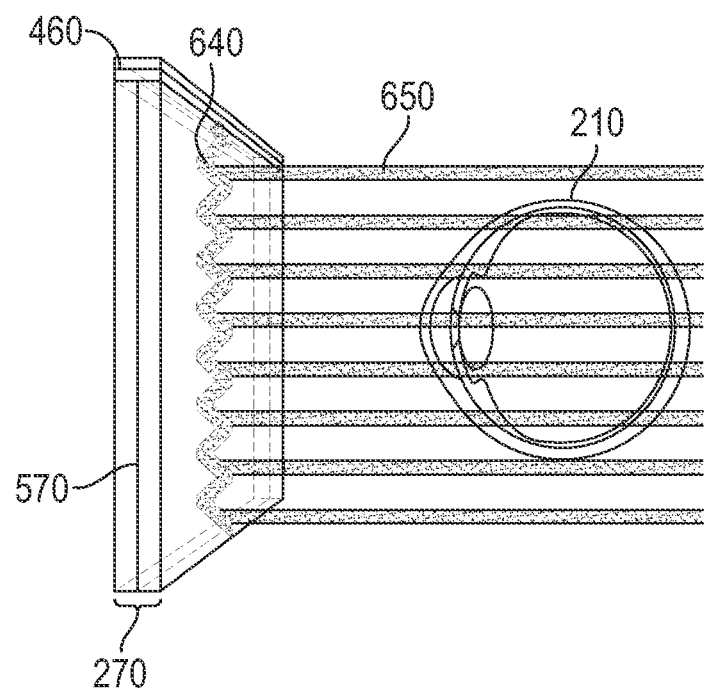
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
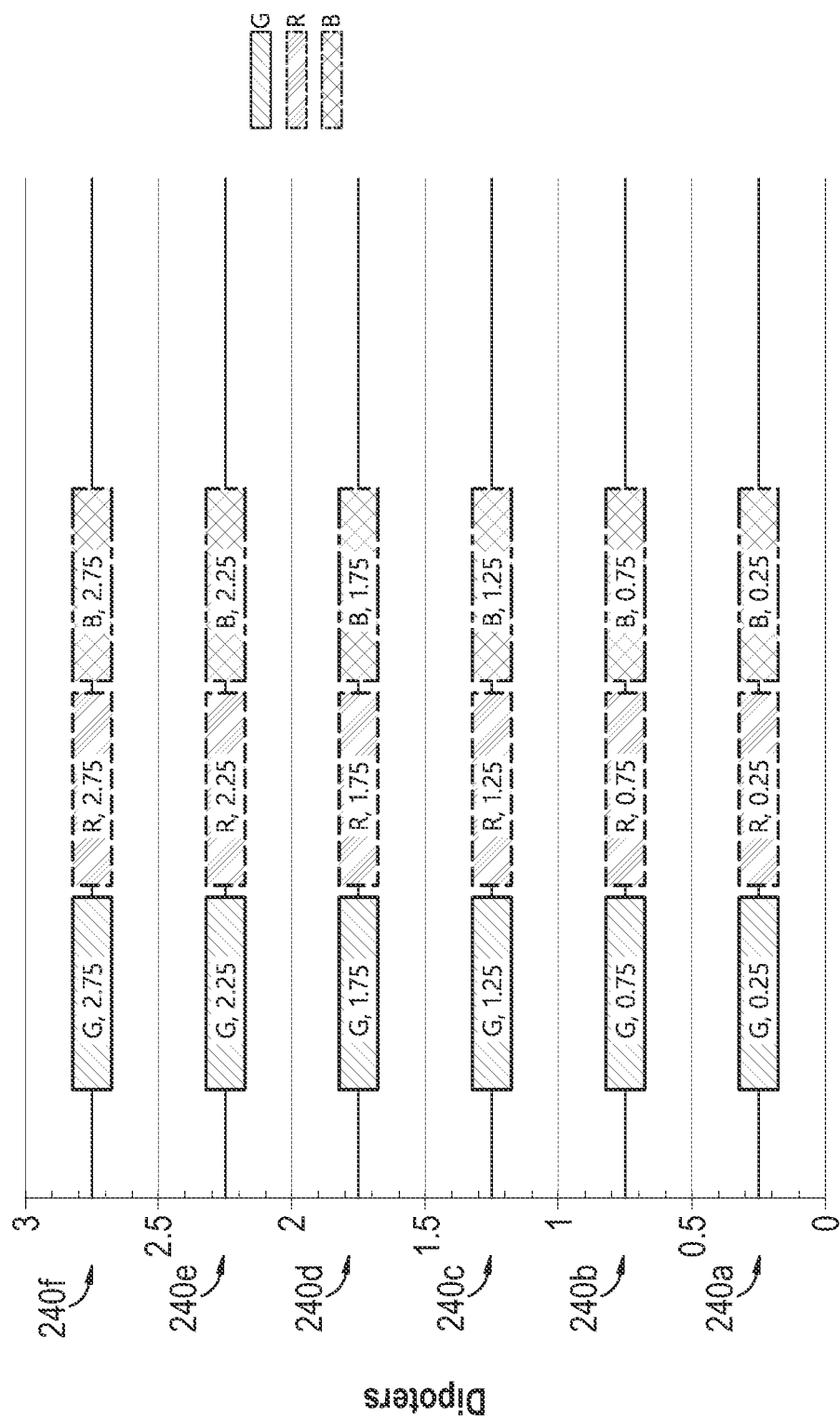
FIG. 8 illustrates an example of a stacked waveguide assembly in which each depth plane includes images formed using multiple different component colors.

In some implementations, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated implementation shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some implementations, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations. Without being limited by theory, it will be appreciated that not placing different component color images at the same physical focus may help to compensate for the human eye's natural longitudinal chromatic aberration (LCA), which may be significant. For example, the eyepiece may help compensate for the eye's LCA by biasing the focus levels of component color images such that they come to focus on the retina after being focused by the eye's high-LCA optics. In some implementations, a system may have a more sparse set of depth planes for one component color (e.g., 2× blue depth planes), and a more dense set of depth planes for another component color (e.g., 6× green depth planes). Advantageously, this approach may help reduce hardware cost and complexity while still providing the eye adequate depth information. For example, the eye may prioritize the focus of medium (for example, "green") wavelengths over short and long wavelengths and thus not require uniform sets of depth planes across all component color images. For example, in some implementations, a waveguide outputting component color images formed by short or long wavelength light (for example, blue or red component color images) may be utilized for forming full color images on multiple depth planes, while a waveguide outputting component color images formed by medium wavelength light (for example, green component color images) may be used to form full color images for only a single depth plane, under the assumption that the eye will prioritize the medium wavelength light (for example, for forming green component color images) in perceiving the depth plane for the full color image. Thus, there may be a one-to-one correspondence between the number of waveguides for the medium wavelength light and the total number of available depth planes, while the number of waveguides for component colors of another wavelength (such as red and/or or blue light) may be less than the total number of available depth planes.

In some implementations, light of each component color may be outputted by a single dedicated waveguide and, consequently, each depth plane may have multiple waveguides associated with it. In such implementations, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other implementations, multiple component colors may be outputted by the same waveguide, such that, e.g., only a single waveguide may be provided per depth plane.

With continued reference to FIG. 8, in some implementations, G is the color green, R is the color red, and B is the color blue. In some other implementations, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some implementations, the light projection system 1010 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
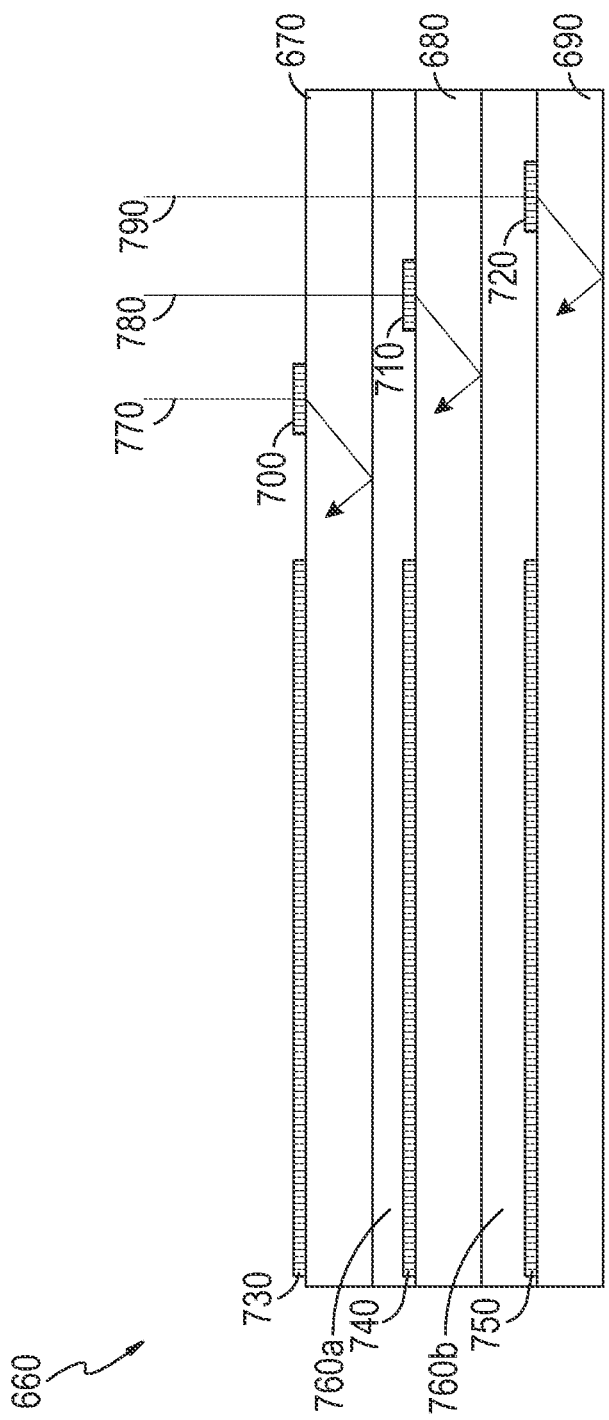
FIG. 9A illustrates a cross-sectional side view of an example of a set of stacked waveguides that each includes an in-coupling optical element.

With reference now to FIG. 9A, in some implementations, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations. It will be appreciated that the in-coupling optical elements 700, 710, 720 may be understood to be in-coupling regions, with each in-coupling element corresponding to an in-coupling region. In some other implementations, as discussed herein, the in-coupling optical elements of each waveguide may each be subdivided into a plurality of regions.

As illustrated, the in-coupling optical elements 700, 710, 720 may be laterally offset from one another. In some implementations, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some implementations, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some implementations, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some implementations, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some implementations, the light rays 770, 780, 790 are intended for different waveguides (e.g., waveguides configured to output light with different amounts of wavefront divergence, and/or configured to output light having different properties, such as different wavelengths or colors). Thus, in some implementations, the light rays 770, 780, 790 may have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
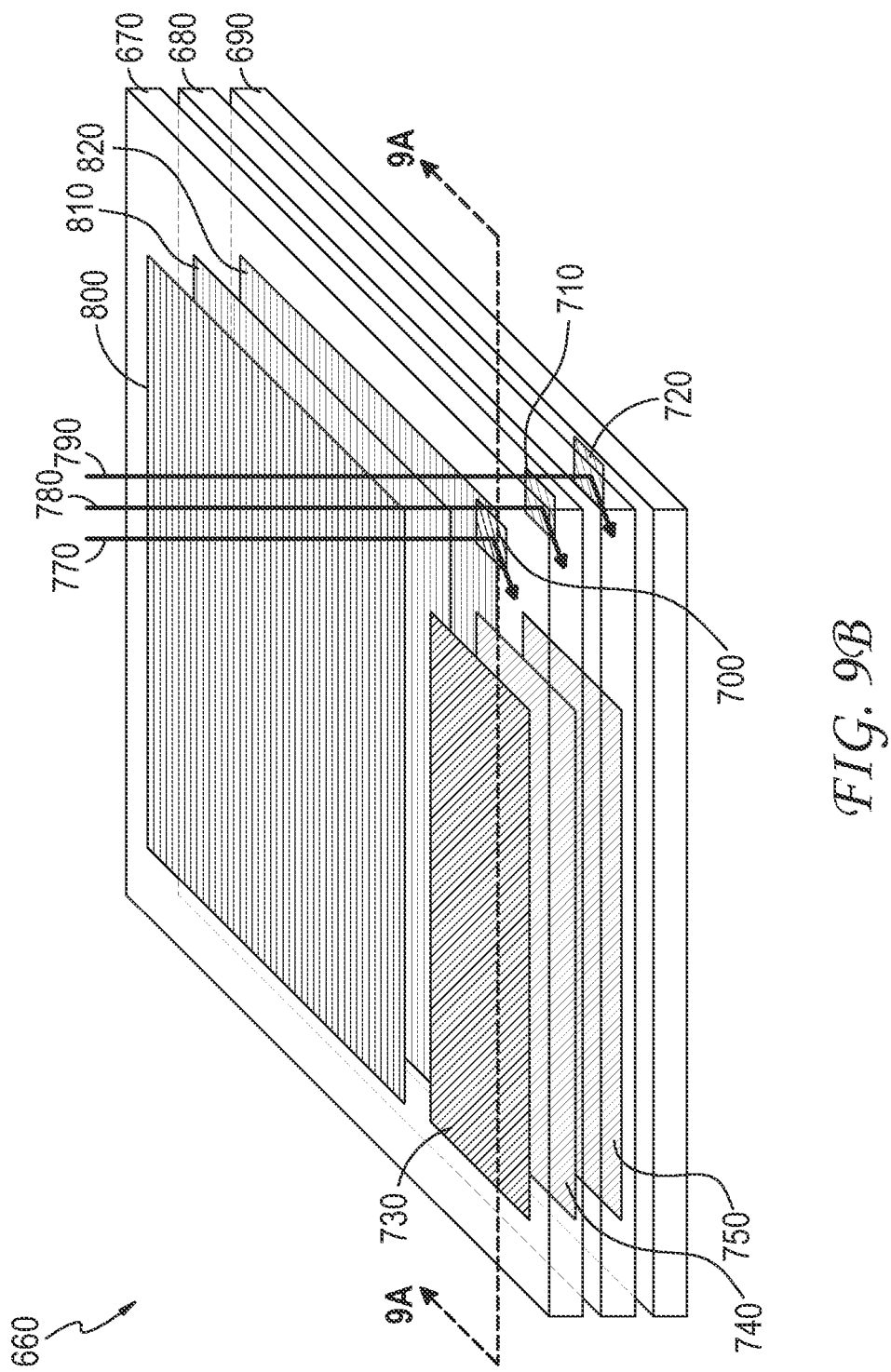
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some implementations, the OPE and/or EPE may be configured to modify a size of the beams of light.

Accordingly, with reference to FIGS. 9A and 9B, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
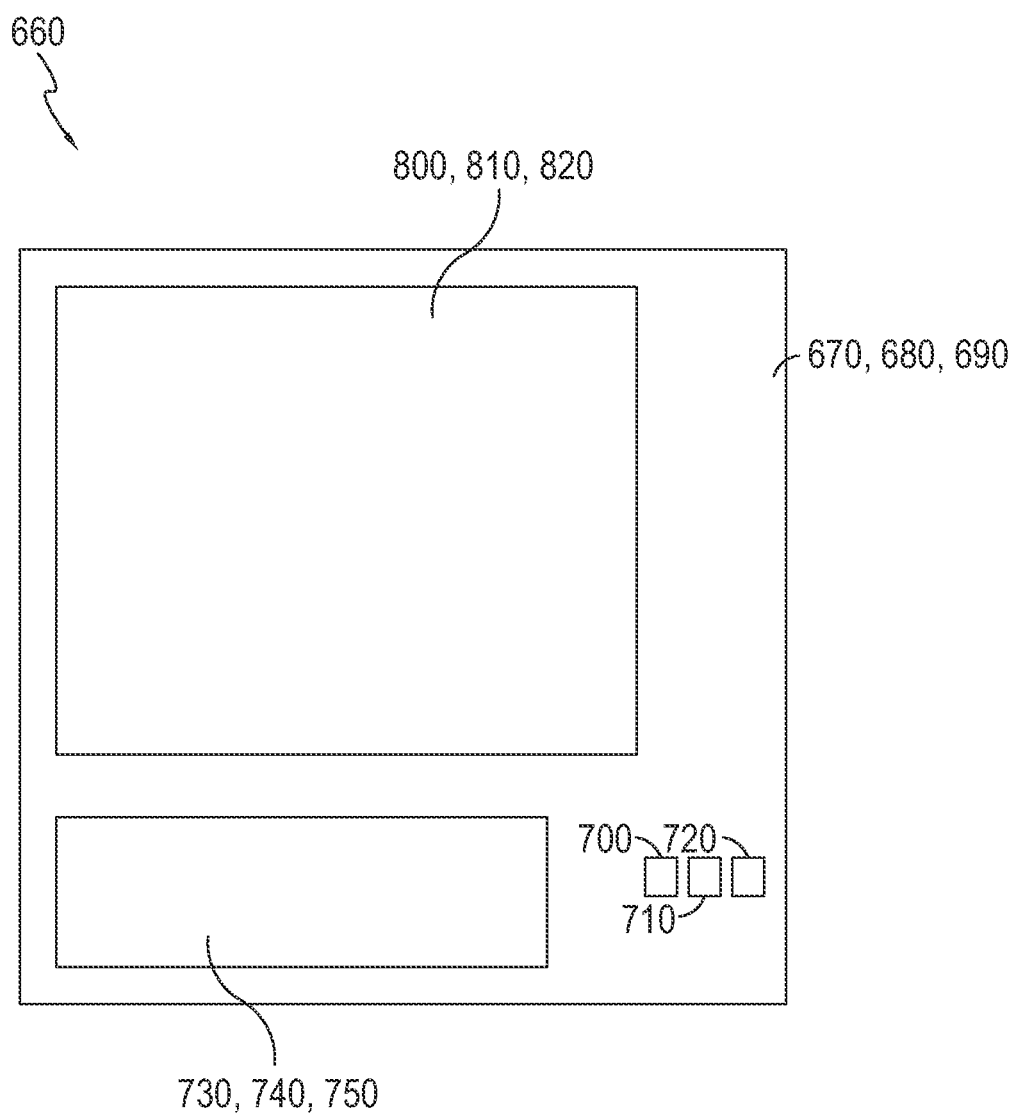
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub pupils. It will be appreciated that the illustrated top-down view may be understood to be a head-on plan view as viewed from a direction of in-coming beams of light (e.g., light 770, 780, 790 (FIG. 9B)) incident on the in-coupling elements 700, 710, 720, respectively.

Figure 9D:
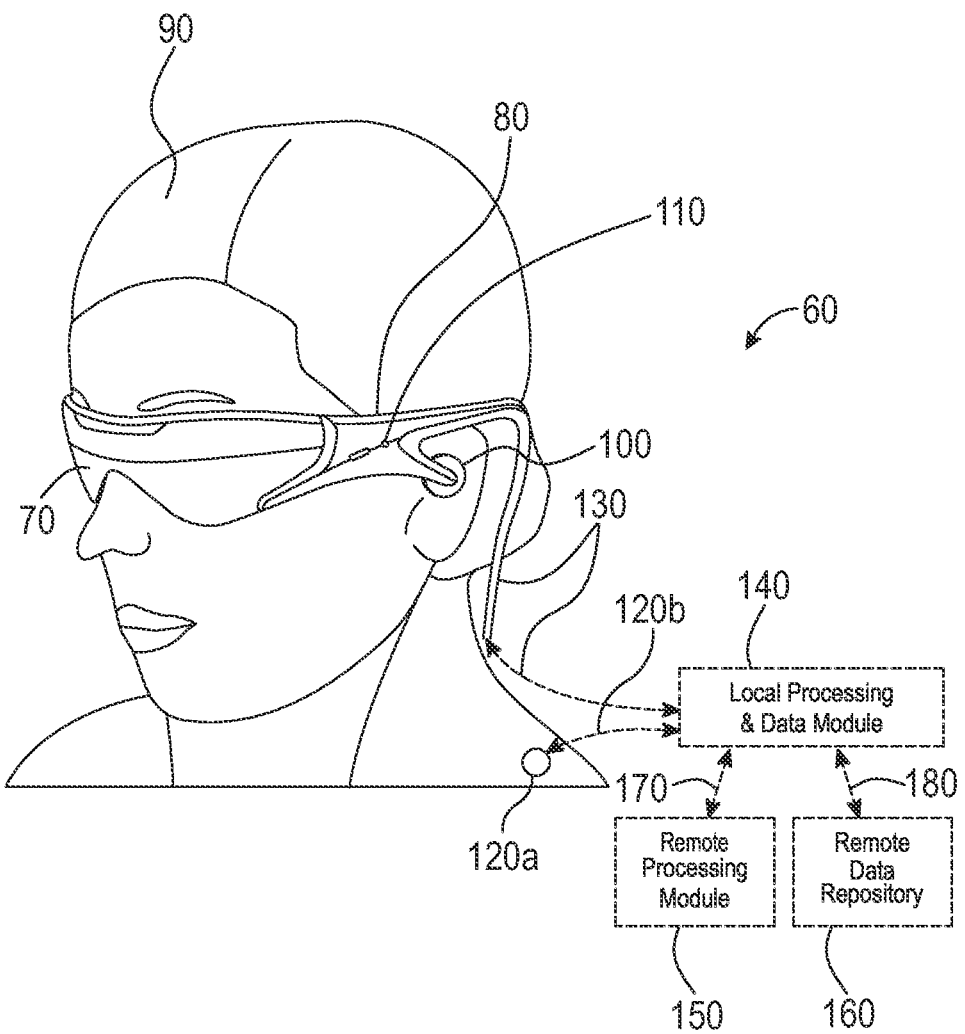
FIG. 9D illustrates an example of wearable display system.

FIG. 9D illustrates an example of wearable display system 60 into which the various waveguides and related systems disclosed herein may be integrated. In some implementations, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some implementations. In some implementations, a speaker 100 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing a physiological state of the user 90 in some implementations. For example, the sensor 120*a* may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some implementations, the local processing and data module 140 may include one or more of the image capture devices, microphones, inertial measurement units, accelerometers, compasses. GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 9D, in some implementations, the remote processing module 150 may comprise one or more processors configured to analyze and process data and/or image information, for instance including one or more central processing units (CPUs), graphics processing units (GPUs), dedicated processing hardware, and so on. In some implementations, the remote data repository 160 may comprise a digital data storage facility, which may be available through the internet or other networking configuration in a "cloud" resource configuration. In some implementations, the remote data repository 160 may include one or more remote servers, which provide information, e.g., information for generating augmented reality content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Display Systems with Multiple Out-Coupling Regions

A display system (e.g., display system 60, FIG. 9D) described herein may be used to present augmented or virtual reality content (referred to herein as virtual content). To present the virtual content, the display system may direct light out of one or more waveguides using one or more out-coupling elements, which out-couple that light in a direction such that the light propagates into the eye or eyes of a user, such as a wearer of a head-mounted display.

As shown in FIG. 10A, an example out-coupling element 830 out-couples light propagating (e.g., by total internal reflection) within a waveguide toward an eye 1010 of a user, as described herein. However, a typical out-coupling element may be structured so as to output light in a variety of directions at all regions across the area of the out-coupling optical element. Thus, a subset of the light out-coupled by the out-coupling optical element 830 may be usefully directed toward the pupil 1012 of the eye 1010 of the user where it will enter the eye 1010 to form images. The desirably directed light is illustrated by example beam 1015, which may extend normal or substantially normal to the out-coupling element 830 at locations near the center of the out-coupling element 830 (and may be angled inward for locations near the periphery of the out-coupling element 830). Other light out-coupled by the out-coupling element 830, such as beams 1017 out-coupled in a normal direction from the periphery of the out-coupling element 830 or at various angles that are not incident on the eye 1010 at or near the pupil 1012, may not contribute to the images formed in the eye 1010. Such light that is out-coupled from the out-coupling optical element 830 but is not incident at or near the pupil may be considered wasted energy. It will be understood that that the drawings are schematic and not necessarily to scale, such that the lateral distance between the light beams 115 and 117 may be large relative to the illustrated eye 1010.

Advantageously, some implementations increase the proportion of that is out-coupled toward the pupil 1012 of the eye 1010 of the user (e.g., the light out-coupled consistent with beam 1015), and reduce the amount of light out-coupled in other directions, which are not registered by the eye 1010 (e.g., the light out-coupled consistent with beam 1017). For example, such systems may increase the proportion of the in-coupled light that ultimately enters the pupil, and may accordingly reduce the amount of light energy that must be generated by the light projection system or other display light source in order to produce an image of a given brightness in the eye of a user. Various implementations of the present technology provide systems including out-coupling elements, in-coupling elements, and/or light projection systems configured to selectively direct image light toward the pupil 1012 of the eye 1010 of the user. Such systems may thereby advantageously improve the efficiency of the display systems disclosed herein, as they may increase the proportion of a given amount of light produced by a light projection system that reaches the eye 1010 to form images perceived by a user, and may reduce the proportion of the light that falls on other portions of the user's eye or face, or that otherwise does not contribute to the images perceived by the user.

Figure 10D:
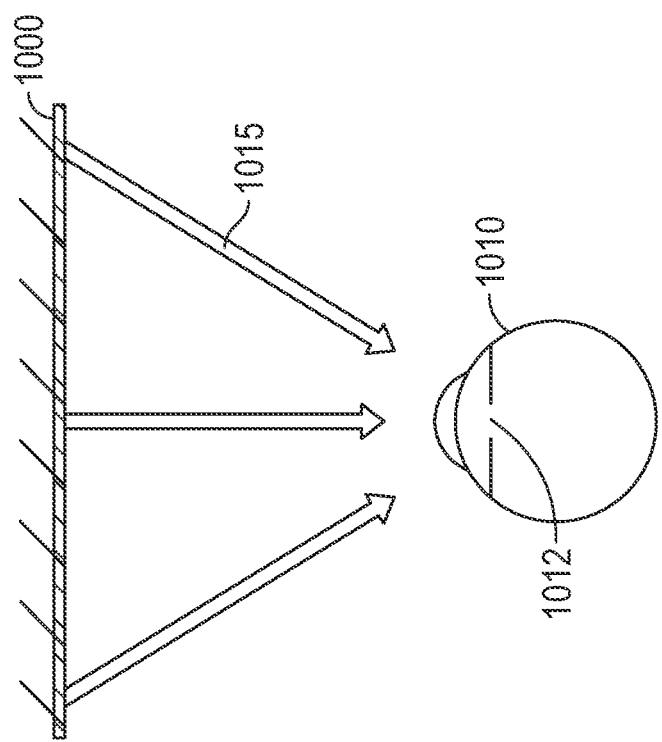
FIG. 10D illustrates example primary rays of light that may be out-coupled from a waveguide of an example wearable display system.
Figure 10C:
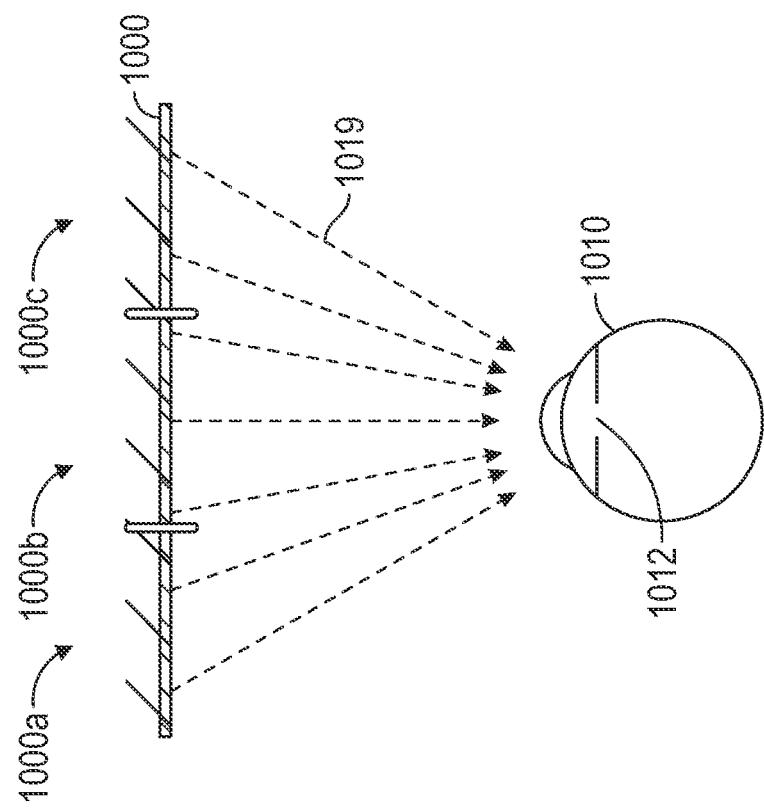
FIG. 10C illustrates example paths of light beams that may be out-coupled from a waveguide of an example wearable display system.

As schematically illustrated in FIGS. 10B and 10C, some implementations may include a segmentation of an out-coupling element 1000 of a waveguide 900 into different out-coupling regions 1000a, 1000b, 1000c. Different out-coupling regions may be configured to differently out-couple light. For example, an out-coupling region 1000b may direct an out-coupled ray 1015 with reduced or no out-coupled light 1017 being outputted from other out-coupling regions 1000a, 1000c. As a result, light 1017 that does not enter the eye and that is not perceived by the user is not "wasted" by being outputted from the out-coupling regions 1000a, 1000c.

It will be appreciated that different out-coupling regions may direct outputted light at angles other than normal to the out-coupling element 1000. FIG. 10C illustrates example light beam directions 1019 that may be associated with different out-coupling regions 1000a, 1000b, 1000c. In some implementations, different out-coupling regions may be utilized to out-couple light for different portions of the field of view. For example, it may be desirable for a central region 1000b of the out-coupling element 1000 to out-couple light along a set of angles generally disposed about a direction extending normally outward toward the eye 1010, while it may be desirable for peripheral regions 1000a, 1000c of the out-coupling element 1000 to out-couple light along a set of angles generally disposed about directions angled inward toward the eye 1010 and which also enter the pupil of the eye. Thus, in some implementations, the field of view provided by the display system and/or the virtual content available in different portions of the field of view may be changed as desired by appropriate selection of out-coupling regions 1000a, 1000b, 1000c as discussed herein. Advantageously, this ability to select different portions of the field of view (e.g., portions containing desired virtual content) facilitates high energy utilization efficiency by allowing light from certain other directions to not be emitted.

In some implementations, it will be appreciated that light projection systems may be utilized to direct light into the waveguide 900 and the light projected systems may utilize projection optics that collimate light for input into that waveguide 900. The image tiling approach disclosed herein advantageously allows the use of discrete light projectors for each or multiple ones of the different portions of the field of view, with each projector forming image content for associated portions of the field of view. It will be appreciated that collimating light for providing image content over the entire field of view may require large and complicated projection optics if a single light projector were utilized. On the other hand, projection optics for providing a relatively small field of view, for example, a portion of the field of view of the display system, is advantageously simpler and smaller than projection optics for collimating light for a larger field of view. As discussed herein, the use of a plurality of light projectors may thus occupy a smaller total volume than the use of a single light projector for the entire field of view.

FIG. 10D illustrates example primary rays 1015 of light that may be out-coupled from a waveguide of an example wearable display system. In some implementations, a single one of the out-coupling regions 1000a, 1000b, 1000c may be large enough to generate a desired field of view for the eye 1010. For example, rays 1015 that may be out-coupled out of the out-coupling region 1000b may be dispersed in an area up to and including the visual limit of the eye, or may provide a range of angles for light incident on the eye corresponding to the desired field of view.

Figures 11A, 11B:
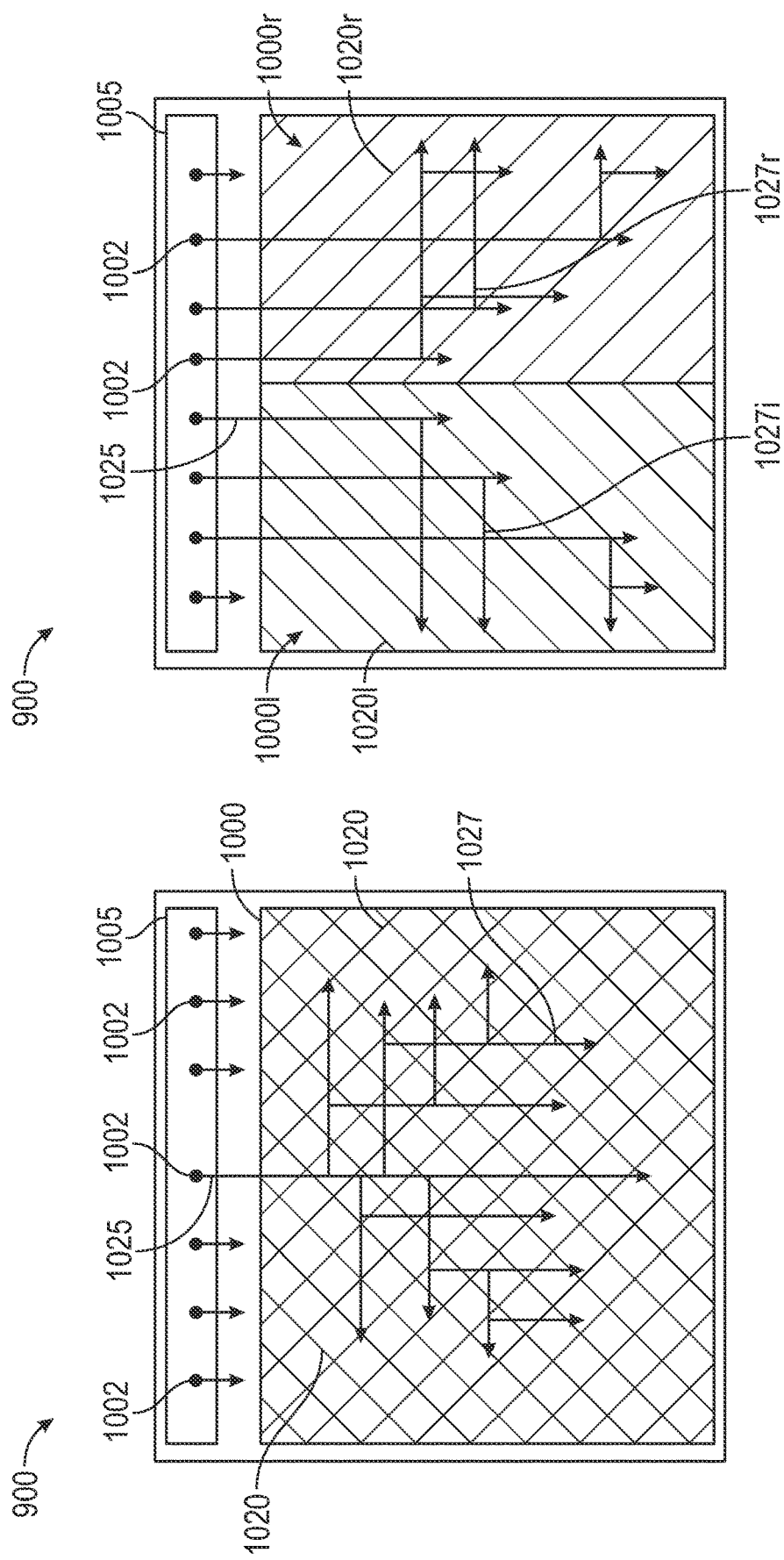
FIG. 11A illustrates an example out-coupling element having an array of light-distributing structures.
FIG. 11B illustrates an example segmentation configuration of an example out-coupling element.

Referring now to FIG. 11A, a waveguide 900 may have out-coupling elements such as out-coupling element 1000, which may include an array of diffractive or other light-distributing structures 1020 that cause diffraction and propagation of the light across the out-coupling element 1000. In some implementations, the light-distributing structures 1020 and out-coupling element 1000 may be disposed on the same side of the waveguide 900, e.g., on the same major surface of the waveguide 900. In such implementations, the area occupied by the out-coupling element 1000 may include structures (e.g., diffractive structures) that out-couple that light out of the waveguide and also structures (e.g., diffractive structures) that distribute incident light across the waveguide by total internal reflection.

In some other implementations, in the illustrated top-down view, the out-coupling element 1000 may be understood to be underneath the light-distributing element 1020. In such a configuration the out-coupling element 1000 and the light-distributing element 1020 may be disposed on different, opposing major surfaces of the waveguide 900.

With continued reference to FIG. 11A, when a light beam 1025 (e.g., corresponding to image light) impinges on an in-coupling element 1005, the beam 1025 is in-coupled into the waveguide 900, propagating in a propagation direction along one axis (e.g., the vertical axis) until it strikes the light-distributing structures 1020, which cause a portion of the beam 1025 to divide into beamlets 1027 which may generally cascade and propagate along a different axis (e.g., an orthogonal or horizontal axis as illustrated). Preferably, the in-coupling element 1005 redirects light into the waveguide 900 at angles such that light beam 1025 propagates within the waveguide by total internal reflection. It will be appreciated that the light distributing structures 1020 have sufficiently low light-redirecting efficiency to allow a majority of the beam 1025 to continue to propagate (e.g., downwards along the vertical axis). Thus, the beam 1025 may be replicated and fill substantially the entire area of the out-coupling element 1000. Although such an arrangement may provide uniform propagation and high coverage across the out-coupling element 1000, it may cause difficulty in targeting the propagation of the beamlets 1027 for efficient use of the light.

In some implementations, as shown in FIG. 11B, a waveguide 900 may have an out-coupling element 1000 that may be segmented into a left region 1000l and a right region 1000r. The left region 1000l may include only light-distributing structures 1020l configured to cause propagation of beamlets 1027l generally to the left and downward. Similarly, the right region 1000r may include only light-distributing structures 1020r configured to cause propagation of beamlets 1027r generally to the right and downward. Thus, each beam 1025 of light entering each region 1000l, 1000r is out-coupled only from the same one of the regions 1000l, 1000r and does not propagate to the other of the regions 1000l, 1000r. This configuration may thereby improve the efficiency of the out-coupling element 1000, as the amount of the area of the out-coupling element 1000 over which each beam 1025 propagates is reduced by approximately half. It will be understood that in various implementations, further segmentation may be implemented to provide for efficient use of in-coupled light, for example, by including additional segmented regions and/or differently shaped segmented regions. The boundary between the left region 1000l and the right region 1000r may correspond to a physical dividing structure (e.g., an optically opaque and/or absorptive partition), or may simply be an interface between regions of differently oriented light-distributing structures 1020r, 1020l.

Figure 11C:
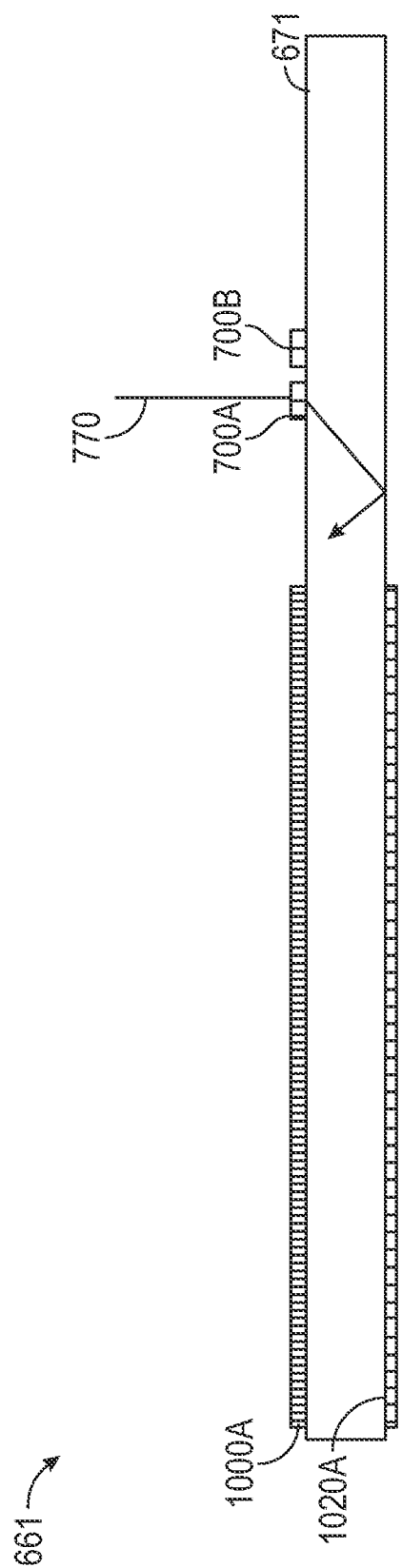
FIG. 11C illustrates an example cross-sectional side view of the waveguide of FIG. 11B.

FIG. 11C illustrates an example cross-sectional side view of the waveguide of FIG. 11B in implementations in which the out-coupling regions and the light-distributing structures may be on different sides of the waveguide. For example, out-coupling region 1000r may be disposed on a first major surface of the waveguide 900 and light-distributing structure 1020r may be disposed on a second, opposing major surface of the waveguide 900. In some implementations, as illustrated, light-distributing structure 1020r may be vertically aligned and occupy a similar area as the out-coupling region 1000r. As discussed herein, the out-coupling regions and the light-distributing structures may be diffractive structures, such as diffractive gratings in some implementations.

Figure 12B:
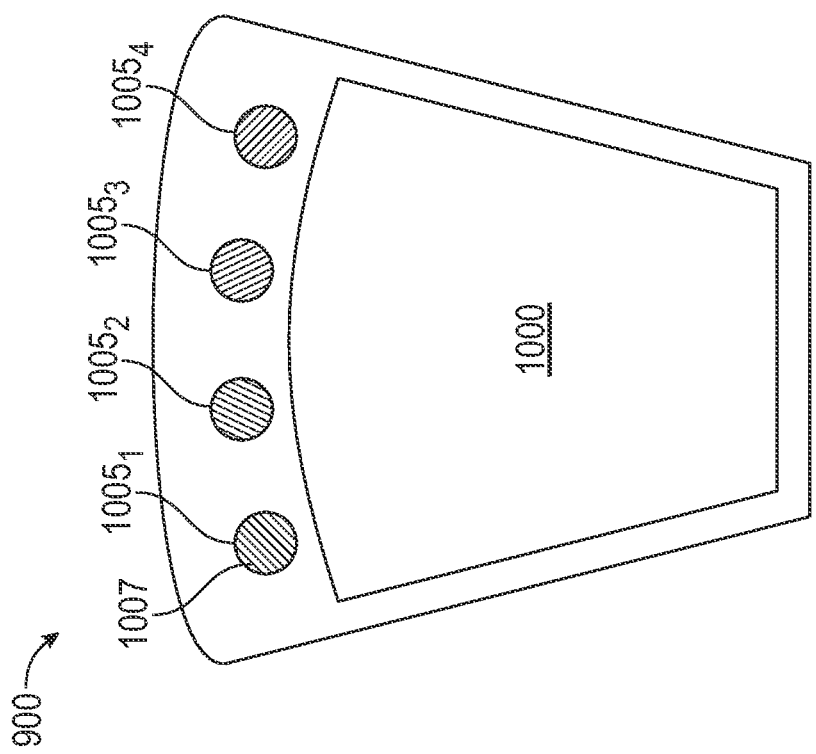
FIG. 12B illustrates an example arrangement of in-coupling elements in conjunction with an example non-rectangular out-coupling element.
Figure 12A:
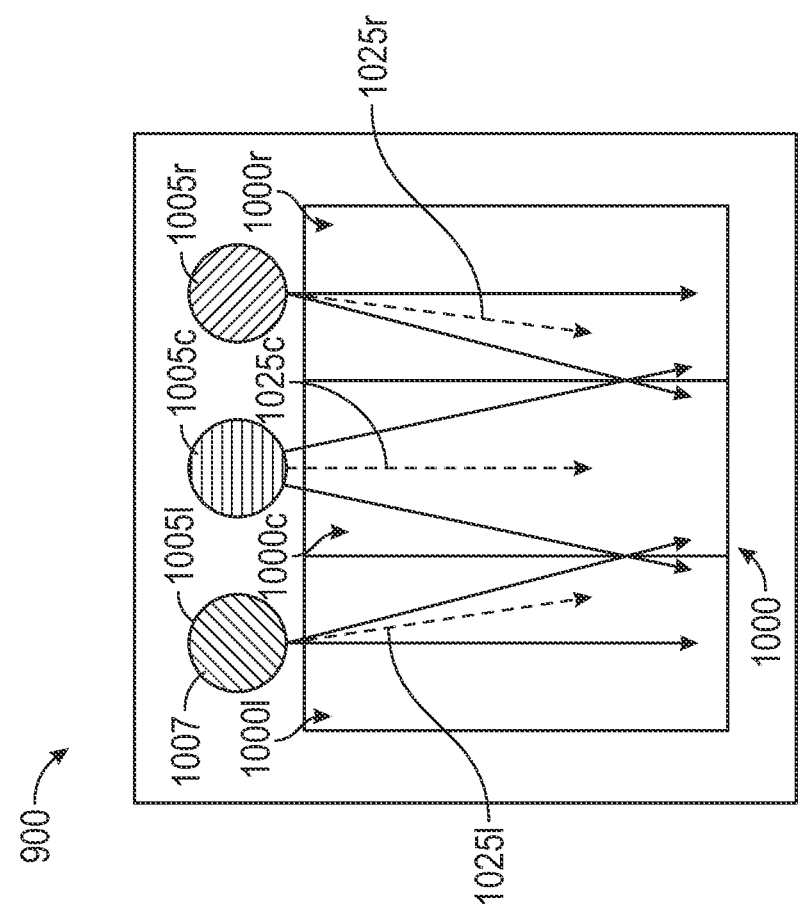
FIG. 12A illustrates an example display system including an out-coupling element having a plurality of segments.

FIGS. 12A and 12B illustrate example configurations by which aspects of in-coupling elements may be varied to improve efficiency of light use in the imaging systems described herein. In FIGS. 12A and 12B, the waveguide 900 includes a plurality of discrete in-coupling regions.

In FIG. 12A, an example waveguide 900 includes an out-coupling element 1000 including regions 1000l, 1000c, and 100r. Regions 1000l, 1000c, and 1000r may be physically segmented regions of the out-coupling element 1000 or may be regions of the out-coupling element 1000 that are not physically divided by any dividing structure, variation in light-distributing structures, or other physical structure.

The example display system further includes corresponding in-coupling elements 1005l, 1005c, 005r configured to in-couple light incident on the in-coupling elements 1005l, 1005c, 1005r toward the out-coupling element 1000. It will be appreciated that light-distributing structures, such as shown in FIG. 11C, may be disposed on an opposite major surface of the waveguide 900 from the major surface having the out-coupling element 1000. In some other implementations, the light-distributing structures and the light out-coupling element 1000 may be on the same major surface.

With continued reference to FIG. 12A, in-coupling element 1005c in-couples and directs light to a central region 1000c of the out-coupling element 1000 and it may be desirable for light to be distributed equally in both lateral directions. In some implementations, it may be desirable for the in-coupling element 1005c to direct the in-coupled light within a range of angles generally symmetrically distributed about an axis 1025c. In addition, as illustrated, in-coupling elements 1005l and 1005r may in-couple light to correlated regions 1000l, 1000r of the out-coupling element 1000, where it may be more desirable for light to be distributed inward toward the center of the out-coupling element 1000 than toward the lateral edges of the out-coupling element 1000 (e.g., because light that reaches a lateral edge of the out-coupling element 1000 may be absorbed, may be out-coupled away from the eye, or may otherwise not be effectively out-coupled). Thus, it may be desirable for the in-coupling elements 1005l and 1005r to direct the in-coupled light within a range of angles about inwardly biased axes 1025l, 1025r so as to reduce the amount of light reaching the lateral edges of the out-coupling element 1000. In some implementations, the regions 1000l, 1000c, and 1000r may be understood to be out-coupling regions defining stripes across the waveguide 900, with the stripes elongated along an axis which crosses a row defined by the in-coupling regions 1005l, 1005c, and 1005r.

In some implementations, such as in implementations in which the in-coupling elements 1005l, 1005c, 1005r include diffractive gratings, the in-coupling elements 1005l, 1005c, 1005r may achieve the desired directionality of in-coupling based on the orientation of in-coupling structures 1007. In the example implementation illustrated in FIG. 12A, the in-coupling structures 1007 of the lateral in-coupling elements 1005l and 1005r are angled or biased in a particular direction relative to the orientation of the in-coupling structures 1007 of the central in-coupling element 1005c.

With continued reference to FIG. 12A, the regions 1000l, 1000c, 1000r and/or the associated light-distributing structures 1020 (FIG. 11C) may be separated by optically opaque and/or absorptive partitions to limit the propagation of light between different ones of the correlated regions 1000l, 1000c, 1000r. In some other implementations, no partitions are provided between different regions or their associated light-distributing structures. Rather, light directed into one out-coupling region may be allowed to propagate freely to other out-company regions. Such a configuration nevertheless provides advantages for efficient utilization of light since the in-coupling regions directs light primarily to a particular out-coupling region, such that the entirety of the waveguide receives less light than that out-coupling region.

FIG. 12B illustrates a further example arrangement of in-coupling elements in conjunction with a non-rectangular out-coupling element 1000. In the example implementation of FIG. 12B, the waveguide 900 includes an even number of in-coupling elements $1005_1$, $1005_2$, $1005_3$, $1005_4$, which may be, in some implementations, disposed in a substantially symmetric distribution about the middle of the out-coupling element 1000. Thus, because none of the in-coupling elements $1005_1$, $1005_2$, $1005_3$, $1005_4$ is centered over the central portion of the out-coupling element 1000, all four in-coupling elements $1005_1$, $1005_2$, $1005_3$, $1005_4$ may be configured to have an inward bias. Because in-coupling elements $1005_2$ and $1005_3$ are more centrally located relative to in-coupling elements $1005_1$ and $1005_4$, in-coupling elements $1005_2$ and $1005_3$ may have in-coupling structures 1007 having less tilt relative to the in-coupling structures 1007 of in-coupling elements $1005_1$ and $1005_4$, such that in-coupling elements $1005_2$ and $1005_3$ in-couple light to a broader central area of the out-coupling element 1000. In-coupling elements $1005_1$ and $1005_4$ are located nearer the lateral edges of the out-coupling element 1000, and accordingly have more tilted in-coupling structures 1007 such that the light in-coupled by in-coupling elements $1005_1$ and $1005_4$ has a greater inward bias and is less likely to be incident on the lateral edges of the out-coupling element 1000.

Figure 13:
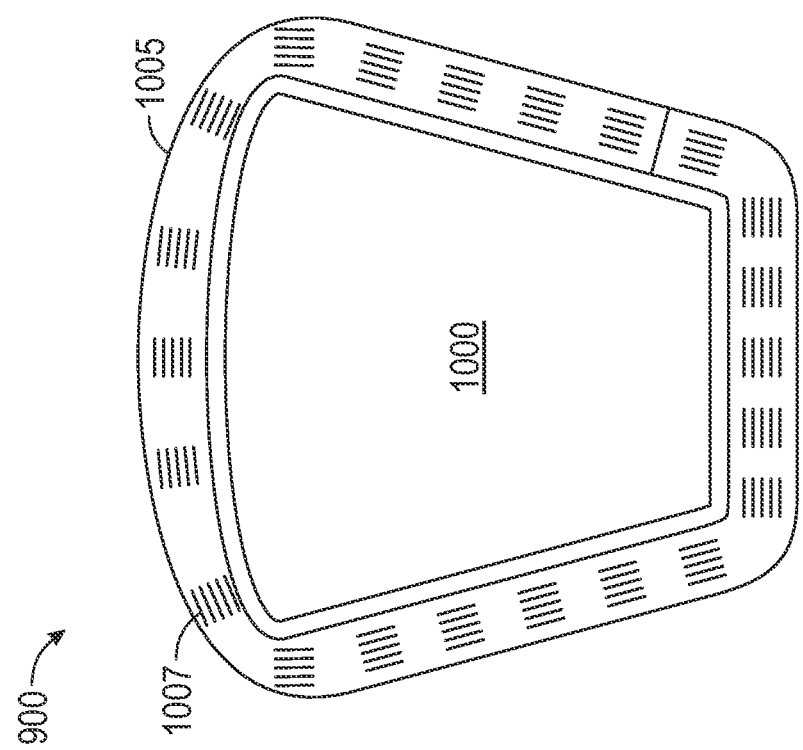
FIG. 13 illustrates an example in-coupling element configuration surrounding an example out-coupling element.

Although the implementations illustrated in FIGS. 12A and 12B illustrate a plurality of discrete, speed-apart in-coupling regions, the waveguides 900 disclosed herein may also be implemented using one or more in-coupling regions in which contiguous portions of an individual light in-coupling element have differently configured light-redirecting structures, which define the different in-coupling regions thereof. For example, FIG. 13 illustrates a waveguide having in-coupling elements extending along two or more sides, or lateral edges, of the waveguide. For example, as illustrated, in-coupling element 1005 may be disposed along multiple sides or edges of the waveguide to surround out-coupling element 1000. In some implementations, as illustrated, the in-coupling element 1005 substantially encircles the out-coupling element 1000. The in-coupling element 1005 includes in-coupling structures 1007 arranged so as to in-couple light and direct the light in a particular desired direction towards the out-coupling element 1000. For example, the in-coupling structures 1007 located near the top of the out-coupling element 1000 may be arranged to in-couple light generally downward, the in-coupling structures 1007 located near the bottom of the out-coupling element 1000 may be arranged to in-couple light generally upward, and the in-coupling structures 1007 located near the lateral sides of the out-coupling element 1000 may be arranged to in-couple light generally inward toward the center of the out-coupling element 1000. It will be appreciated that the different regions of the in-coupling element 1005 having differently configured in-coupling structures 1007 may be understood to constitute different in-coupling regions.

In some examples, a light injection system may be configured to project light towards the in-coupling element 1005. The light injection system may include multiple projectors, which may have advantages for simplifying the provision of light into in-coupling elements on different sides of the waveguide. As discussed herein, the full FOV of the display system may be subdivided into a plurality of portions, and a light injection system may include a plurality of projectors configured to provide image content for each associated portion by directing light to different areas of the in-coupling element 1005. In addition or alternatively, the projectors may be oriented to direct light to portions of the in-coupling element 1005 on different sides of the waveguide 900. In some examples, the light injection system may include a first projector configured to direct light into a portion of the in-coupling element 1005 along the top edge of the waveguide 900, a second projector configured to direct light into a portion of the in-coupling element 1005 along the right edge of the waveguide 900, a third projector configured to direct light into a portion of the in-coupling element 1005 along the bottom edge of the waveguide 900, and fourth projector configured to direct light into a portion of the in-coupling element 1005 along the left edge of the waveguide 900. It will be appreciated that each of the projectors may be configured to provide image content for different portions of the out-coupling element 1000, the different portions being associated with different portions of the in-coupling optical element 1005, as discussed herein.

Figure 14A:
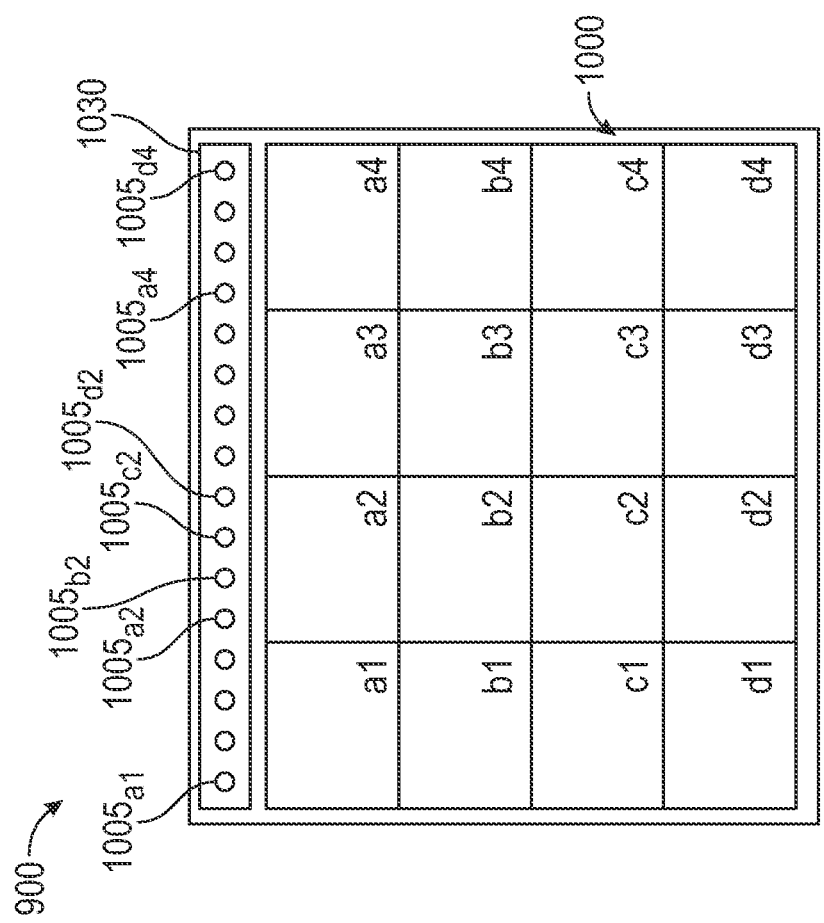
FIG. 14A illustrates another example in-coupling element configuration in conjunction with an example out-coupling element.

FIG. 14A illustrates a further example configuration of a waveguide 900 having an in-coupling element for in-coupling light into an out-coupling element 1000. In-coupling element 1005 may include individual in-coupling regions $1005_{a1}$ . . . $1005_{d4}$. Each in-coupling region $1005_{a1}$ . . . $1005_{d4}$ may be configured to in-couple light that will be out-coupled from a corresponding, or correlated, out-coupling region a1 . . . d4 of the out-coupling element 1000. The out-coupling regions a1 . . . d4 may define a grid pattern across the waveguide 900. Light in-coupled at each in-coupling region $1005_{a1}$ . . . $1005_{d4}$ may be directed to be out-coupled only or primarily from the corresponding out-coupling region a1 . . . d4 of the out-coupling element 1000 based on the techniques described above, such as based on one or more features such as a tilt, grating pitch, grating structure size (e.g., the sizes of protrusions on a surface forming the gratings), or other characteristic of the individual in-coupling regions $1005_{a1}$ . . . $1005_{d4}$. For example, in-coupling regions $1005_{a2}$, $1005_{b2}$, $1005_{c2}$, and $1005_{d2}$ may each differ relative to the others in tilt, grating pitch, grating structure size, or another characteristic such that the light in-coupled at each in-coupling region $1005_{a2}$, $1005_{b2}$, $1005_{c2}$, $1005_{d2}$ is selectively, or primarily, directed to a particular associated out-coupling region, to be out coupled by that out-coupling region. For example, the in-coupling element $1005_{a2}$ may be configured such that the light in-coupled therefrom has an angle of total internal reflection within the out-coupling element 1000 that causes the light to be incident on the region a2. Similarly, the in-coupling element $1005_{b2}$ may be configured such that the light in-coupled therefrom has a different angle of total internal reflection within the waveguide 900 that causes much of the light to travel further along the out-coupling element 1000 and to be incident on out-coupling region b2.

As discussed herein, a light injection system may be configured to project light towards different in-coupling regions $1005_{a1}$ . . . $1005_{d4}$. The light injection system may include multiple projectors configured to direct light into different in-coupling regions $1005_{a1}$ . . . $1005_{d4}$. In some examples, a light injection system may include different projectors configured to emit a subset of the FOV into different or overlapping subsets of the one or more in-coupling regions $1005_{a1}$ . . . $1005_{d4}$. For example, a first projector may be configured to emit light towards a subset of in-coupling regions closer to a first lateral edge of the waveguide and a second projector may be configured to emit light towards a subset of in-coupling regions closer to a second lateral edge of the waveguide.

Figure 14B:
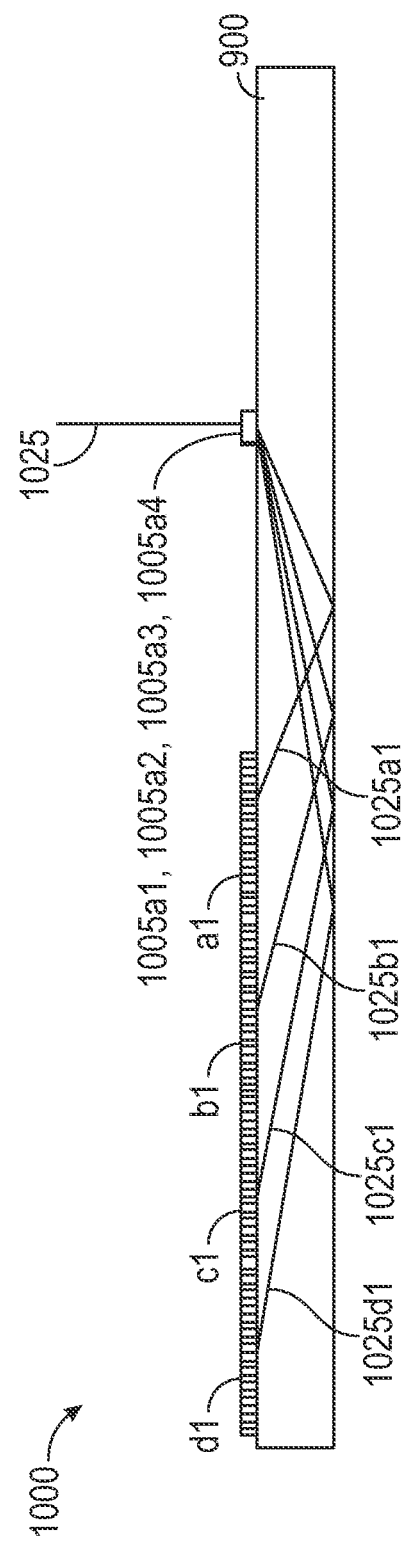
FIG. 14B is an example of a cross-sectional side view of the waveguide of FIG. 14A.

FIG. 14B is an example of a schematic cross-sectional side view of the waveguide of FIG. 14A, with the cross-section taken along the plane 14B (FIG. 14A). As illustrated, the in-coupling regions $1005_{a2}$, $1005_{b2}$, $1005_{c2}$, $1005_{d2}$ may receive incident light beam 1025, which may be in-coupled and redirected towards the out-coupling regions a1, b1, c1, d1 of the out-coupling element 1000. It will be appreciated that the in-coupling regions $1005_{a2}$, $1005_{b2}$, $1005_{c2}$, $1005_{d2}$ may be configured to in-couple light such that it propagates through the waveguide 900 by total internal reflection. In addition, when in-coupling light, the in-coupling regions $1005_{a2}$, $1005_{b2}$, $1005_{c2}$, $1005_{d2}$ may be configured to deflect the light at different angles, as illustrated. For example, the light beams 1025, may be deflected by the in-coupling regions $1005_{a2}$, $1005_{b2}$, $1005_{c2}$, $1005_{d2}$ to provide in-coupled light beams $1025_{a2}$, $1025_{b2}$, $1025_{c2}$, $1025_{d2}$, respectively. The in-coupled light beams $1025_{a2}$, $1025_{b2}$, $1025_{c2}$, $1025_{d2}$ propagate by total internal reflection at angles that cause them to subsequently impinge on the corresponding out-coupling regions a1, b1, c1, d1, respectively. In some implementations, the total internal reflection angle (the angle at which in-coupled light undergoes total internal reflection off the major surfaces of the waveguide) may be selected by appropriately selecting a grating pitch for in-coupling regions $1005_{a2}$, $1005_{b2}$, $1005_{c2}$, $1005_{d2}$ such that in-coupled light is deflected and enters the waveguide at the desired total internal reflection angle. In some implementations, the angles for some in-coupling regions may be shallower than other regions).

In some implementations, the selectivity of the correspondence between a particular in-coupling region and a particular out-coupling region may be increased by configuring the out-coupling regions such that they are most efficient at out-coupling light received from the associated in-coupling region. For example, an out-coupling region may be configured to most efficiently out-couple incident light that impinges on it from angles corresponding to the angles of in-coupled light propagating from the associated in-coupling region. For example, the out-coupling region may most efficiently out-couple light impinging on it at TIR angles provided by the associated in-coupling region, and/or the out-coupling region may most efficiently out-couple light impinging on it from lateral directions corresponding to the associated in-coupling region.

In some implementations, an image tiling approach may be utilized in conjunction with the example configuration of FIG. 14A. It will be appreciated that, in some context, virtual content may only be displayed in a portion of a user's field of view. In some implementations, the regions a1 . . . d4 may each be associated with a particular portion of the field of view and the image content to be outputted by a particular region a1 . . . d4 may correspond to the virtual content for that portion of the field of view. In some cases, an image may be span multiple regions a1 . . . d4. The image light projected onto each in-coupling element $1005_{a1}$ . . . $1005_{d4}$ may represent the section of the image that will appear at the corresponding region a1 . . . d4 of the out-coupling element 1000. Thus, when the individual image sections are projected onto the corresponding in-coupling elements $1005_{a1}$ . . . $1005_{d4}$, image light for each image section is out-coupled at its corresponding region a1 . . . d4 of the out-coupling element 1000 with greater intensity than light from other in-coupling regions $1005_{a1}$ . . . $1005_{d4}$. In some implementations, the image light may be temporally multiplexed (directed into different in-coupling regions at different times) such that a user viewing the out-coupling element 1000 perceives the full image. When temporally multiplexing, image light is preferably provided within a flicker fusion threshold to each out-coupling region which is desired to output image light.

It will be appreciated that the waveguide 900, as illustrated for example in FIGS. 11A-14B, may be one of a plurality of similar waveguides forming a waveguide stack. Such a waveguide stack may advantageously be utilized to provide virtual content on a plurality of depth planes, as discussed herein.

Figure 14C:
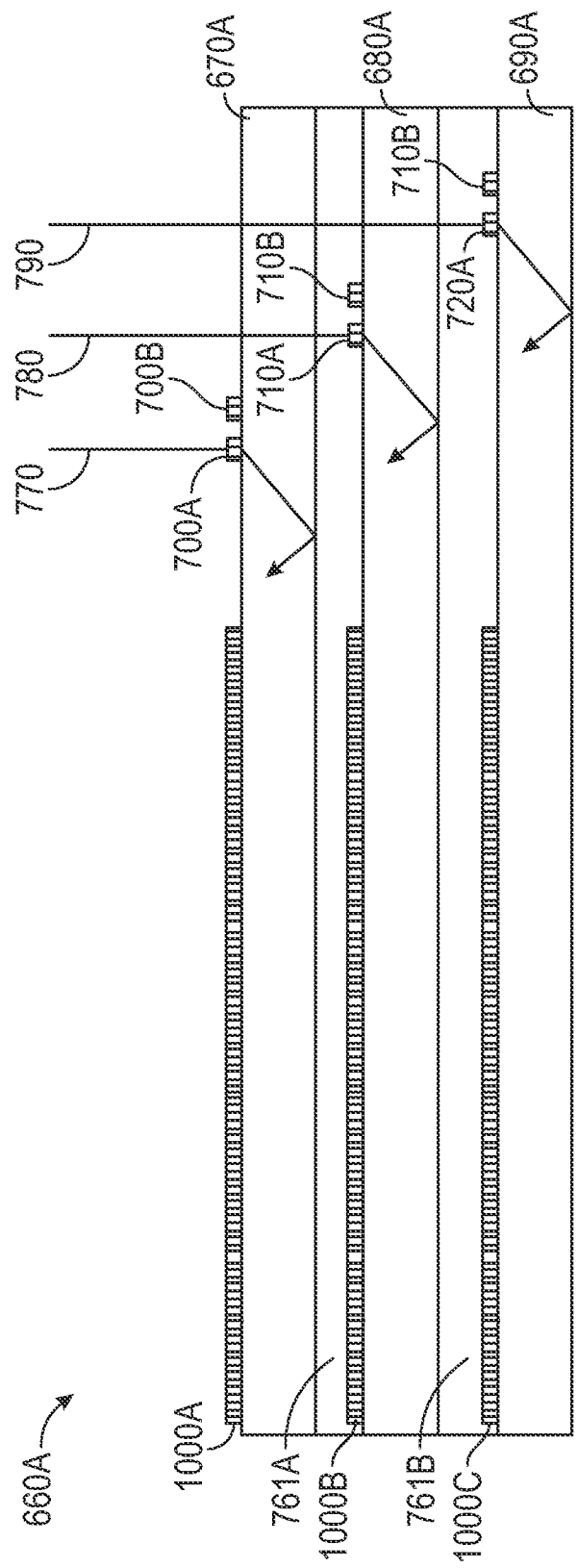
FIG. 14C illustrates a cross-sectional side view of an example of a set of stacked waveguides that each includes an in-coupling optical element configuration.

FIG. 14C illustrates a set 660A of stacked waveguides 670A, 680A, and 690A, each of which may be similar to the waveguide 900 (FIGS. 11A-14B). Each waveguide includes one or more associated in-coupling regions 700A, 700B, 710A. 710B, 720A, and 720B (which may also be referred to as light input areas on the waveguide, and may correspond to the light in-coupling regions discussed with reference to FIGS. 12A-14C). The one or more in-coupling regions may include one or more in-coupling optical elements and may be configured to direct light into one or more out-coupling elements 1000A, 1000B, and 1000C in their associated waveguide. The out-coupling elements may be segmented into different regions, as discussed herein. The configuration of the in-coupling regions and out-coupling regions in each of the stacked waveguides may correspond to any of the example waveguide configurations disclosed, such as the waveguide configuration discussed with reference to any one of FIGS. 11A-14A.

As illustrated, the in-coupling optical regions 700A, 700B, 710A, 710B, 720A, and 720B may be laterally offset from one another. In some implementations, each in-coupling optical regions may be offset such that it receives light without that light passing through another in-coupling optical region. For example, each in-coupling region 700A, 700B, 710A, 710B, 720A, and 720B may be separated (e.g., laterally spaced apart) from other in-coupling optical regions 700A, 700B, 710A, 710B. 720A, and 720B such that it substantially does not receive light passing through the other ones of the in-coupling optical elements 700A, 700B, 710A, 710B, 720A, and 720B. In some examples, one or more of the in-coupling optical regions may share an image injection device, or may receive light from different image injection devices.

The waveguides may be spaced apart or separated in a manner similar to the waveguide stack discussed with reference to FIG. 9A. In some implementations, the light beams 770, 780, 790 are intended for different waveguides (e.g., waveguides configured to output light with different amounts of wavefront divergence, and/or configured to output light having different properties, such as different wavelengths or colors). Advantageously, different waveguides may be selected by directing light into different in-coupling regions, thereby providing image light output with different amounts of wavefront divergence. Thus, in some implementations, a particular in-coupling region may be associated with a particular waveguide (to in-couple light into that waveguide), and also a particular out-coupling region within that waveguide (to directed in-couple light towards an associated out-coupling region).

Directing Light to an Out-Coupling Region

Figure 15:
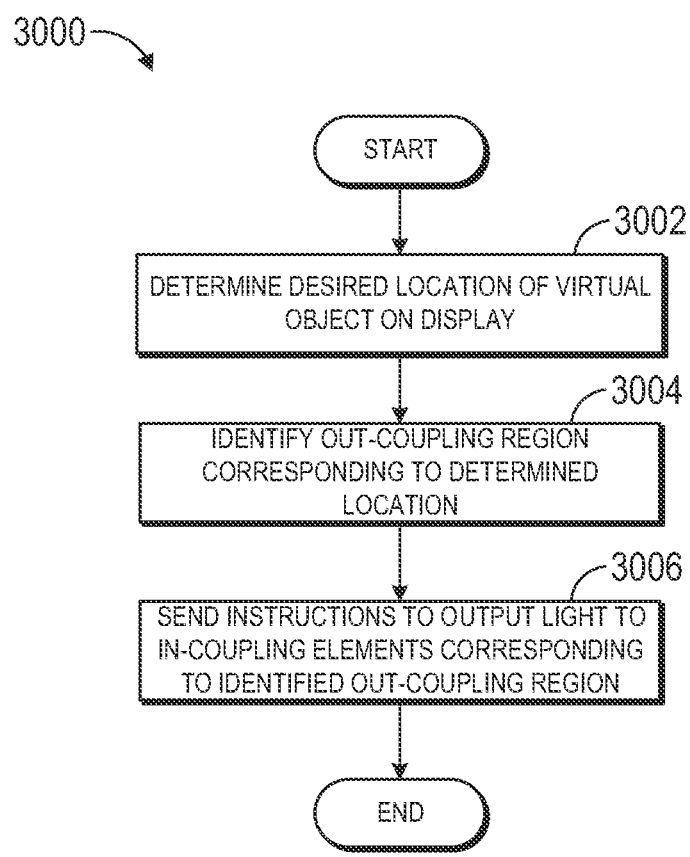
FIG. 15 illustrates a flowchart of an example of a process for selection of out-coupling regions based upon the direction of light to a user's eye.

A display system may selectively direct light to one or more out-coupling regions of a display by identifying the region to output image light and directing the image light to that out-coupling region. FIG. 15 illustrates an example light direction process 3000 for directing light to an out-coupling region of a display.

With continued reference to FIG. 15, at block 3002, a display system may determine a desired location of a virtual object on the display, which may include a waveguide having a viewing area, which may include an out-coupling element segmented into a plurality of out-coupling regions. Where the display system is an AR or VR system, the system may identify a desired and/or perceived location in the user's 3D environment to display the virtual object and determine an associated location in the area of the display. For example, an application of the display system may send instructions to the display system to display a virtual object, such as a butterfly, in a designated location in the user's physical environment. The display system may determine that that the designated location corresponds to a projected location of the virtual object on the display, such as an upper right hand corner of the display. For example, the region of the display providing image light for forming a virtual object may correspond to the expected intersection between the viewing area of the display and an expected path of light from the virtual object to the pupil of the eye.

The projected location on a display may include an entire area of the display over which a virtual object may be projected. For example, if a virtual object is a large object, such as a tree, which may take up a large portion of the field of view of the user, the desired location may include a large percentage area of the display. In another example, if the virtual object is a small object, such as a butterfly that will take up a small portion of the field of view of the user, the desired location may include a small percentage area of the display. In another example, the display system may display more than one virtual object. In examples with more than one virtual object, the display system may determine multiple locations, areas, or regions of the display to display the virtual objects.

It will be appreciated that a representation of the virtual object in 3D space may take into account a user's eye pose, and the region of the display for displaying a virtual object may change over time, as the user's eye pose changes. For example, the location of the virtual object may be anchored to a physical object, and the location of the virtual object within the user's field of view may change as the user's eyes move relative to the physical object serving as the anchor, which may cause a corresponding change in the region of the display utilized to output image light. The display system may identify the user's eye pose based on one or more eye tracking processes, as discussed herein. In some implementations, as discussed herein, in order to provide the perception of a virtual object as being at a location in the 3D environment of the user, the display may output light from a position on the out-coupling element associated with that location, such that the light propagates to the eye from a direction corresponding with that location.

At block 3004, the display system may identify one or more out-coupling regions associated with the determined location. For example, the display may include a plurality of out-coupling regions. The one or more determined locations or areas of the display may fall across the one or more out-coupling regions. The display system may identify which out-coupling regions are associated with the locations or areas of the display correlating to the one or more displayed virtual objects.

At block 3006, a display system may send instructions to output light to the identified one or more out-coupling regions. For example, the display system may send instructions to a controller to project light to an in-coupling region associated with the identified out-coupling region. For example, the in-coupling regions may include one or more light redirecting structures, such as one or more diffractive gratings. The display system may selectively direct light to the in-coupling region using a light injection system, such as discussed with reference to FIGS. 20-22.

In some other implementations, the display system may display a different representation of the virtual object depending on the user's eye pose. For example, the display system may utilize a foveated rendering technique to reduce a resolution of the virtual content, to reduce a computational workload involved in displaying the virtual content, based upon. e.g., the distance of the virtual object from a center (e.g., a fixation point) of the user's field of view. For example, the display system may be configured to display the virtual object at a relatively high (e.g., a maximum) resolution, when the virtual object coincides with the fixation point of the user's eyes, and to display the virtual object at a relatively low resolution when the virtual object is in a periphery of the user's field of view. Foveated rendering techniques are discussed in U.S. Patent App. Pub. No. 2018/0275410, published Sep. 27, 2018, entitled "DEPTH BASED FOVEATED RENDERING FOR DISPLAY SYSTEMS", the entire disclosure of which is incorporated by reference herein.

Examples of Region Determination Using Eye Pose Determinations

As discussed above with reference to FIG. 15, a desired location of a display to output image light may be determined based, at least in part, on a user's eye pose. For example, as discussed above, the desired location may correspond to an intersection point in the display's viewing area (e.g., on a waveguide) of light from the 3D location of a virtual object in the user's environment to the pupil of the user's eye.

Alternatively, for at least some content (e.g., display system menu items and alerts, or other content not anchored to a location in the physical world), the region of the display to output image light may be selected simply based upon the eye pose of the user. For example, a display system menu may simply be tied to the user's eye pose, such that the menu stays within the user's field of view irrespective of the eye pose.

Figure 16:
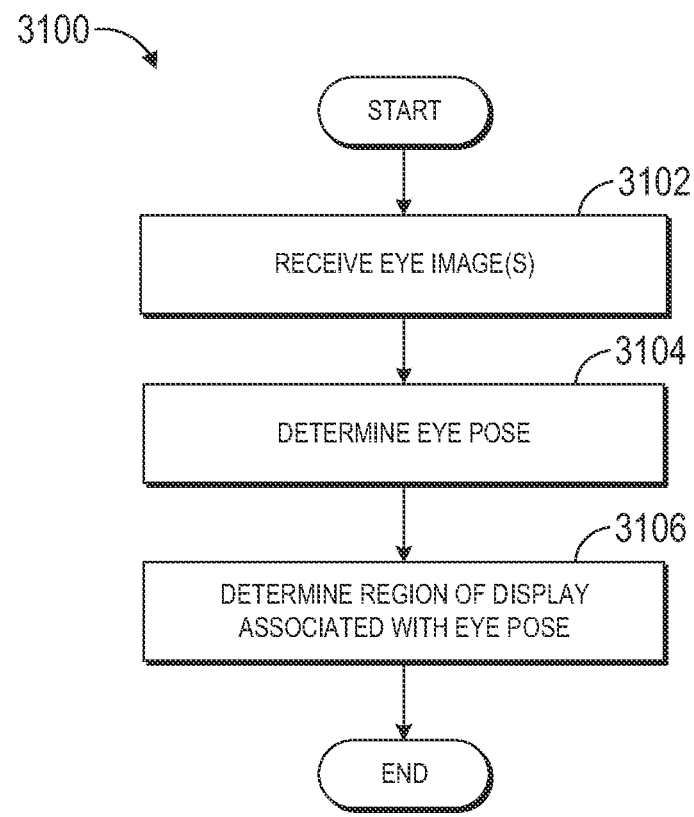
FIG. 16 illustrates a flowchart of an example of a process for selection of out-coupling regions based upon eye pose.

FIG. 16 is an example a flow chart of an out-coupling location determination process 3100 using eye pose. At a block 3102, the display system may receive one or more eye images from an imaging system. The imaging system may include an inward-facing imaging system, such as one or more cameras associated with a display of the display system. The imaging system may be configured to image the left and/or right eye of the user. As described in detail with reference to FIG. 17A below, an eye image may include an image of an eye including one or more features of the eye, such as eyelids, sclera, iris, and pupil.

At block 3104, the display system may determine an eye pose of the user's eye. For example, the display system may analyze the one or more eye images to determine an eye pose. In some examples, the eye pose may include a center of rotation of a user's eye, a gaze direction, other orientation of the user's eye, or some combination thereof. As described in detail with reference to FIGS. 17B and 32C, a display system may utilize one or more eye tracking modules to analyze the image to identify an eye pose.

At block 3106, the display system may apply utilize the eye pose to determine a region of display associated with the eye pose to render virtual content. For example, the display system may utilize one or more engines to calculate a display position on the display to render virtual content at various locations relative to pupil of the eye, e.g., along vectors intersecting with the center of rotation or center of perspective of the user's eye, as described in detail with reference to FIGS. 17B and 32C.

Example Eye Image for Use in Eye Tracking

Figures 1, 17A:
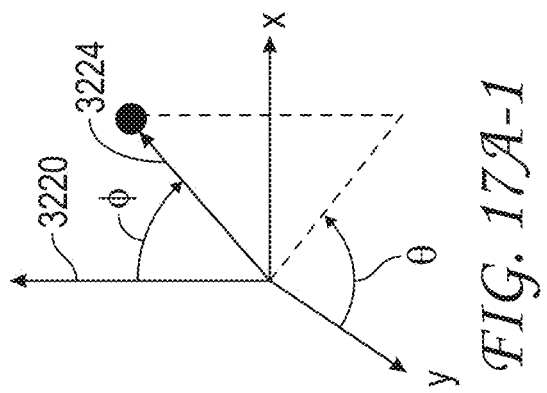
FIG. 17A schematically illustrates an example of an eye.
Figure 17A:
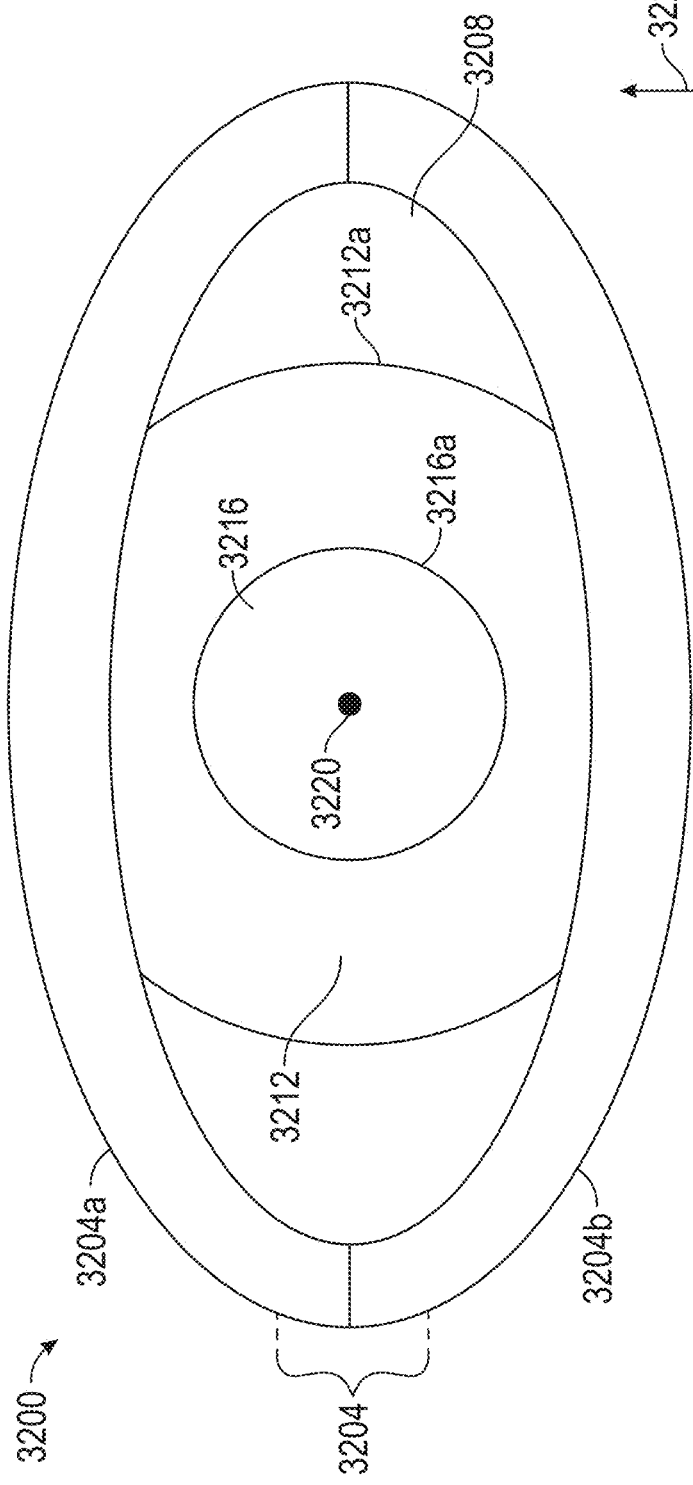

FIG. 17A illustrates an image of an eye 3200 with eyelids 3204, sclera 3208 (the "white" of the eye), iris 3212, and pupil 3216. Curve 3216a shows the pupillary boundary between the pupil 3216 and the iris 3212, and curve 3212a shows the limbic boundary between the iris 3212 and the sclera 3208. The eyelids 3204 include an upper eyelid 3204a and a lower eyelid 3204b. The eye 3200 is illustrated in a natural resting pose (e.g., in which the user's face and gaze are both oriented as they would be toward a distant object directly ahead of the user). The natural resting pose of the eye 3200 may be indicated by a natural resting direction 3200, which is a direction orthogonal to the surface of the eye 3200 when in the natural resting pose (e.g., directly out of the plane for the eye 3200 shown in FIG. 17A) and in this example, centered within the pupil 3216.

As the eye 3200 moves to look toward different objects, the eye pose will change relative to the natural resting direction 3220. The current eye pose may be determined with reference to an eye pose direction 3224, which is a direction orthogonal to the surface of the eye (and centered within the pupil 3216) but oriented toward the object at which the eye is currently directed. With reference to an example coordinate system shown in FIG. 17A-1, the pose 3224 of the eye 3200 may be expressed as two angular parameters indicating an azimuthal deflection and a zenithal deflection of the eye pose direction 3224 of the eye, both relative to the natural resting direction 3220 of the eye. For purposes of illustration, these angular parameters may be represented as $\theta$ (azimuthal deflection, determined from a fiducial azimuth) and $\phi$ (zenithal deflection, sometimes also referred to as a polar deflection). In some implementations, angular roll of the eye around the eye pose direction 3224 may be included in the determination of eye pose, and angular roll may be included in the following analysis, in other implementations, other techniques for determining the eye pose may be used, for example, a pitch, yaw, and optionally roll system.

An eye image may be obtained from a video using any appropriate process, for example, using a video processing algorithm that may extract an image from one or more sequential frames. The pose of the eye may be determined from the eye image using a variety of eye-tracking techniques. For example, an eye pose may be determined by considering the lensing effects of the cornea on light sources that are provided. Any suitable eye tracking technique may be used for determining eye pose.

Example of an Eye Tracking System

Figure 17B:
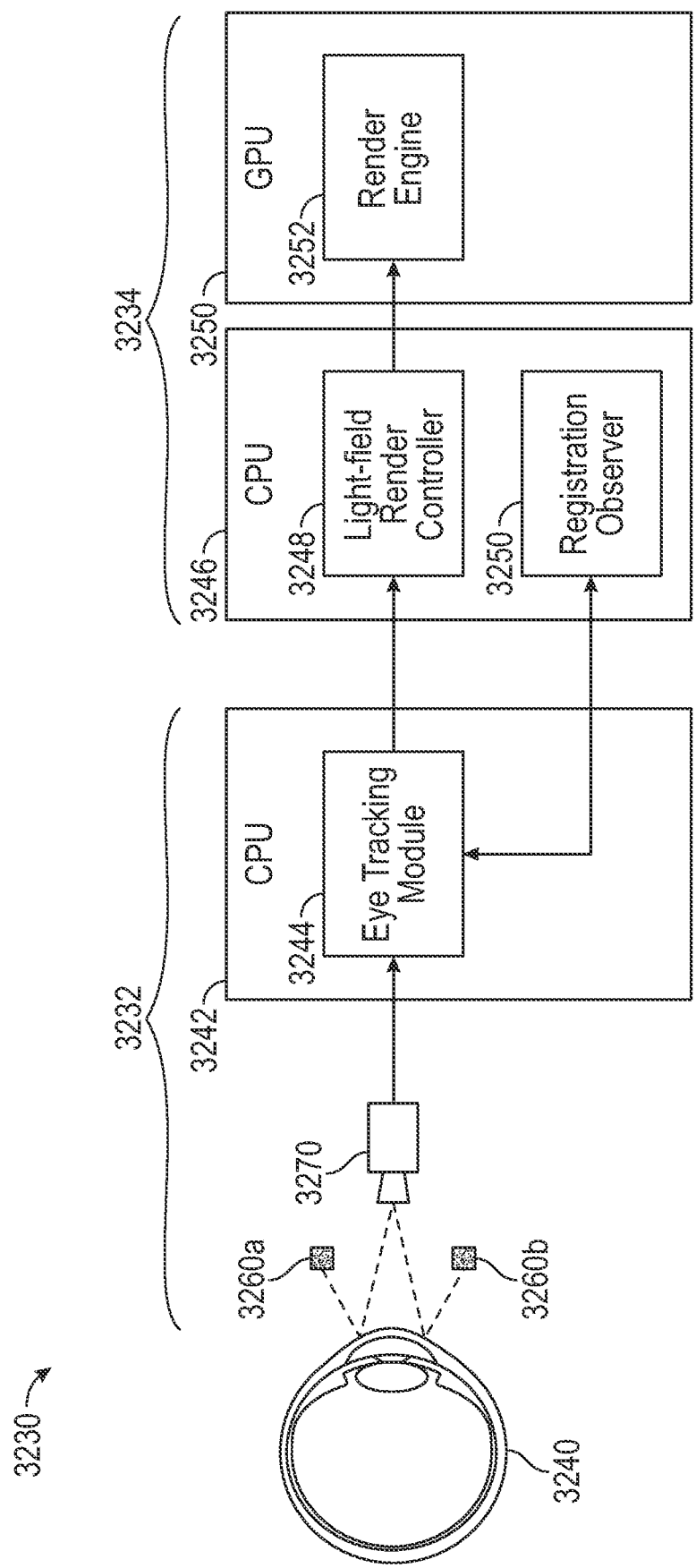
FIG. 17B is a schematic diagram of a wearable system that includes an eye tracking system.

FIG. 17B illustrates a schematic diagram of a wearable system 3230 that includes an eye tracking system. The wearable system 3230 may, in at least some implementations, include components located in a head-mounted unit 3232 and components located in a non-head-mounted unit 3234. Non-head mounted unit 3234 may be, as examples, a belt-mounted component, a hand-held component, a component in a backpack, a remote component, etc. Incorporating some of the components of the wearable system 3230 in non-head-mounted unit 3234 may help to reduce the size, weight, complexity, and cost of the head-mounted unit 3232. In some implementations, some or all of the functionality described as being performed by one or more components of head-mounted unit 3232 and/or non-head mounted 3234 may be provided by way of one or more components included elsewhere in the wearable system 3230. For example, some or all of the functionality described below in association with a CPU 3242 of head-mounted unit 3232 may be provided by way of a CPU 3246 of non-head mounted unit 3234, and vice versa. In some examples, some or all of such functionality may be provided by way of peripheral devices of wearable system 3230. Furthermore, in some implementations, some or all of such functionality may be provided by way of one or more cloud computing devices or other remotely-located computing devices in a manner similar to that which has been described above with reference to FIG. 9D. In addition, it will be appreciated that the wearable system 3230 may correspond to the display system 60 (FIG. 9D) and, in some implementations, the head-mounted unit 3232 and non-head-mounted unit 3234 may correspond to the local data processing module 140 and remote processing module 150, respectively.

As shown in FIG. 17B, wearable system 3230 may include an eye tracking system including a camera 3270 that captures images of a user's eye 3240. If desired, the eye tracking system may also include light sources 3260a and 3260b (such as light emitting diodes "LED"s, which may emit visible in some implementations or non-visible light. e.g., infrared light, in other implementations). The light sources 3260a and 3260b may generate glints (e.g., reflections off of the user's eyes that appear in images of the eye captured by camera 3270). The positions of the light sources 3260a and 3260b relative to the camera 3270 may be known and, as a consequence, the positions of the glints within images captured by camera 3270 may be used in tracking the user's eyes (as will be discussed in more detail below). In at least one implementation, there may be one light source 326 and one camera 3270 associated with a single one of the user's eyes 3240. In another implementation, there may be one light source 326 and one camera 3270 associated with both of a user's eyes, 3240. In yet other implementations, there may be one or more cameras 3270 and one or more light sources 326 associated with one or each of a user's eyes 3240. As a specific example, there may be two light sources 3260a and 3260b and one or more cameras 3270 associated with each of a user's eyes 3240. As another example, there may be three or more light sources such as light sources 3260a and 3260b and one or more cameras 3270 associated with each of a user's eyes 3240. In some implementations described herein, two or more cameras may be employed for imaging a given eye.

Eye tracking module 3244 may receive images from eye tracking camera(s) 324 and may analyze the images to extract various pieces of information. As examples, the eye tracking module 3244 may detect the user's eye poses, a three-dimensional position of the user's eye relative to the eye tracking camera 3270 (and to the head-mounted unit 3232), the direction that one or both of the user's eyes 3240 are focused, the user's vergence depth (e.g., the depth from the user at which the user is focusing on), the positions of the user's pupils, the positions of the user's cornea and/or cornea sphere, the center of rotation of one or each of the user's eyes, and the center of perspective of one or each of the user's eyes or any combination thereof. The eye tracking module 3244 may extract such information using techniques described below in connection with FIG. 17C below. As shown in FIG. 17B, eye tracking module 3244 may be a software module implemented using a CPU 3242 in a head-mounted unit 3232 in some implementations.

Although one camera 3270 is shown in FIG. 17B imaging an eye, in some implementation such as discussed herein a plurality of cameras may image an eye and be used for measurements such as corneal center and/or center of rotation measurements or otherwise used for eye tracking or other purposes.

Data from eye tracking module 3244 may be provided to other components in the wearable system. As example, such data may be transmitted to components in a non-head-mounted unit 3234 such as CPU 3246 including software modules for a light-field render controller 3248 and a registration observer 3250.

Render controller 3248 may use information from eye tracking module 3244 to adjust images displayed to the user by render engine 3252 (e.g., a render engine that may be a software module in GPU 3250 and that may provide images to display 220). As an example, the render controller 3248 may adjust images displayed to the user based on the user's center of rotation or center of perspective. In particular, the render controller 3248 may use information on the user's center of perspective to simulate a render camera (e.g., to simulate collecting images from the user's perspective) and may adjust images displayed to the user based on the simulated render camera.

A "render camera," which is sometimes also referred to as a "pinhole perspective camera" (or simply "perspective camera") or "virtual pinhole camera" (or simply "virtual camera"), is a simulated camera for use in rendering virtual image content possibly from a database of objects in a virtual world. The objects may have locations and orientations relative to the user or wearer and possibly relative to real objects in the environment surrounding the user or wearer. In other words, the render camera may represent a perspective within render space from which the user or wearer is to view 3D virtual contents of the render space (e.g., virtual objects). The render camera may be managed by a render engine to render virtual images based on the database of virtual objects to be presented to said eye. The virtual images may be rendered as if taken from the perspective the user or wearer. For example, the virtual images may be rendered as if captured by a pinhole camera (corresponding to the "render camera") having a specific set of intrinsic parameters (e.g., focal length, camera pixel size, principal point coordinates, skew/distortion parameters, etc.), and a specific set of extrinsic parameters (e.g., translational components and rotational components relative to the virtual world). The virtual images are taken from the perspective of such a camera having a position and orientation of the render camera (e.g., extrinsic parameters of the render camera). It follows that the system may define and/or adjust intrinsic and extrinsic render camera parameters. For example, the system may define a particular set of extrinsic render camera parameters such that virtual images may be rendered as if captured from the perspective of a camera having a specific location with respect to the user's or wearer's eye so as to provide images that appear to be from the perspective of the user or wearer. The system may later dynamically adjust extrinsic render camera parameters on-the-fly so as to maintain registration with said specific location. Similarly, intrinsic render camera parameters may be defined and dynamically adjusted over time. In some implementations, the images are rendered as if captured from the perspective of a camera having an aperture (e.g., pinhole) at a specific location with respect to the user's or wearer's eye (such as the center of perspective or center of rotation, or elsewhere).

In some implementations, the system may create or dynamically reposition and/or reorient one render camera for the user's left eye, and another render camera for the user's right eye, as the user's eyes are physically separated from one another and thus consistently positioned at different locations. It follows that, in at least some implementations, virtual content rendered from the perspective of a render camera associated with the viewer's left eye may be presented to the user through an eyepiece on the left side of a head-mounted display (e.g., head-mounted unit 3232), and that virtual content rendered from the perspective of a render camera associated with the user's right eye may be presented to the user through an eyepiece on the right side of such a head-mounted display. Further details discussing the creation, adjustment, and use of render cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

In some examples, one or more modules (or components) of the system 3230 (e.g., light-field render controller 3248, render engine 3250, etc.) may determine the position and orientation of the render camera within render space based on the position and orientation of the user's head and eyes (e.g., as determined based on head pose and eye tracking data, respectively). That is, the system 3230 may effectively map the position and orientation of the user's head and eyes to particular locations and angular positions within a 3D virtual environment, place and orient render cameras at the particular locations and angular positions within the 3D virtual environment, and render virtual content for the user as it would be captured by the render camera. Further details discussing real world to virtual world mapping processes are provided in U.S. patent application Ser. No. 15/296,869, entitled "SELECTING VIRTUAL OBJECTS IN A THREE-DIMENSIONAL SPACE." which is expressly incorporated herein by reference in its entirety for all purposes. As an example, the render controller 3248 may adjust the depths at which images are displayed by selecting which depth plane (or depth planes) are utilized at any given time to display the images. In some implementations, such a depth plane switch may be carried out through an adjustment of one or more intrinsic render camera parameters. For example, the light-field render controller 3248 may adjust the focal lengths of render cameras when executing a depth plane switch or adjustment. As described in further detail below, depth planes may be switched based on the user's determined vergence or fixation depth.

Registration observer 3250 may use information from eye tracking module 3244 to identify whether the head-mounted unit 3232 is properly positioned on a user's head. As an example, the eye tracking module 3244 may provide eye location information, such as the positions of the centers of rotation of the user's eyes, indicative of the three-dimensional position of the user's eyes relative to camera 3270 and head-mounted unit 3232 and the eye tracking module 3244 may use the location information to determine if display 220 is properly aligned in the user's field of view, or if the head-mounted unit 3232 (or headset) has slipped or is otherwise misaligned with the user's eyes. As examples, the registration observer 3250 may be able to determine if the head-mounted unit 3232 has slipped down the user's nose bridge, thus moving display 220 away and down from the user's eyes (which may be undesirable), if the head-mounted unit 3232 has been moved up the user's nose bridge, thus moving display 220 closer and up from the user's eyes, if the head-mounted unit 3232 has been shifted left or right relative the user's nose bridge, if the head-mounted unit 3232 has been lifted above the user's nose bridge, or if the head-mounted unit 3232 has been moved in these or other ways away from a desired position or range of positions. In general, registration observer 3250 may be able to determine if head-mounted unit 3232, in general, and displays 220, in particular, are properly positioned in front of the user's eyes. In other words, the registration observer 3250 may determine if a left display in display system 220 is appropriately aligned with the user's left eye and a right display in display system 220 is appropriately aligned with the user's right eye. The registration observer 3250 may determine if the head-mounted unit 3232 is properly positioned by determining if the head-mounted unit 3232 is positioned and oriented within a desired range of positions and/or orientations relative to the user's eyes.

In at least some implementations, registration observer 3250 may generate user feedback in the form of alerts, messages, or other content. Such feedback may be provided to the user to inform the user of any misalignment of the head-mounted unit 3232, along with optional feedback on how to correct the misalignment (such as a suggestion to adjust the head-mounted unit 3232 in a particular manner).

Example registration observation and feedback techniques, which may be utilized by registration observer 3250, are described in U.S. patent Ser. No. 10/573,042, entitled "PERIOCULAR TEST FOR MIXED REALITY CALIBRATION", issued Feb. 25, 2020, and U.S. Patent App. Pub. No. 2019/0222830, entitled "DISPLAY SYSTEMS AND METHODS FOR DETERMINING REGISTRATION BETWEEN A DISPLAY AND A USER'S EYES", published Jul. 18, 2019, both of which are incorporated by reference herein in their entirety.

Example of an Eye Tracking Module for Eye Pose Determination

Figure 17C:
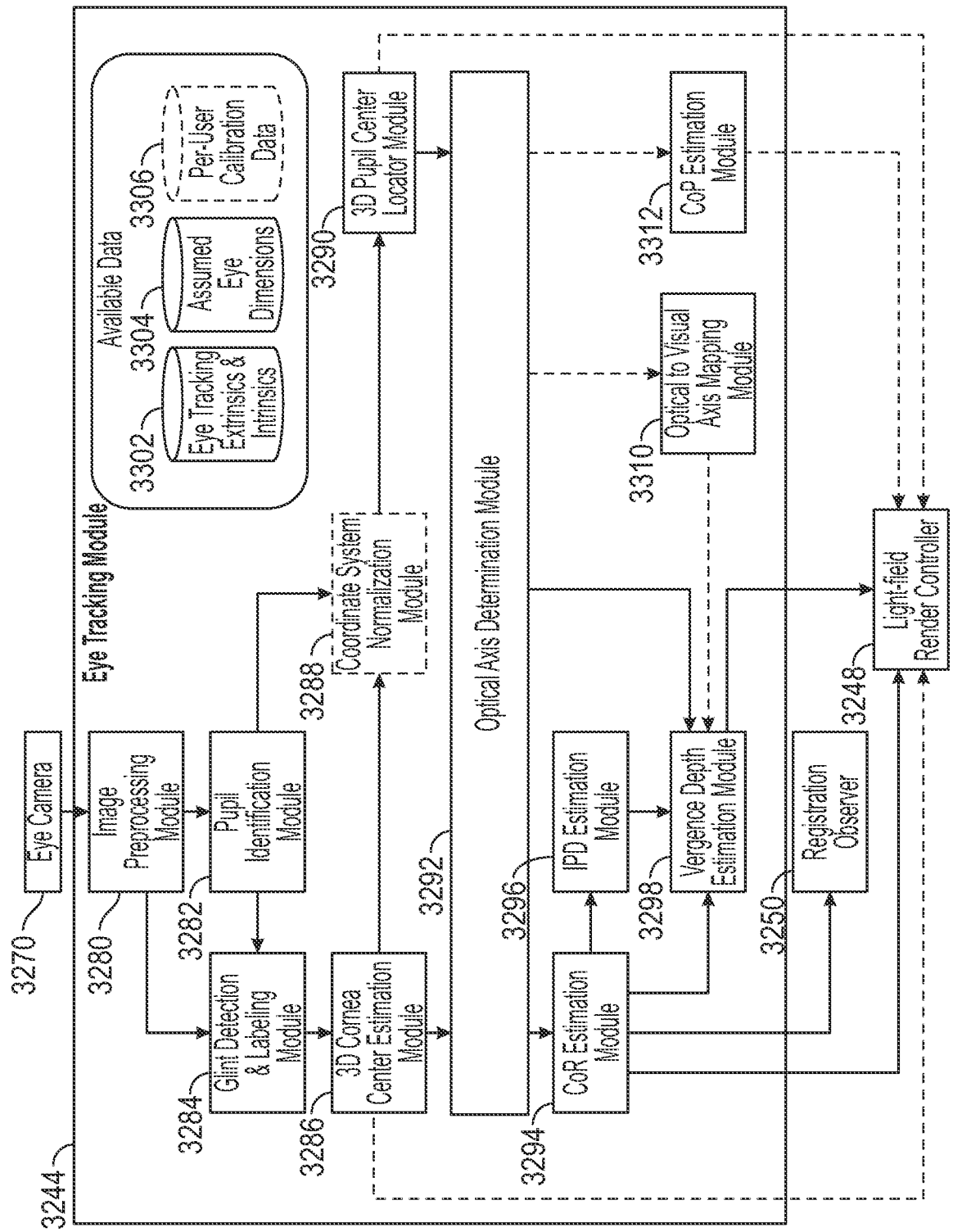
FIG. 17C is a block diagram of a wearable system that may include an eye tracking system.

A block diagram of an example eye tracking module 614, which may be utilized to determine eye pose, is shown in FIG. 17C. As shown in FIG. 17C, eye tracking module 614 may include a variety of different submodules, may provide a variety of different outputs, and may utilize a variety of available data in tracking the user's eyes. As examples, eye tracking module 614 may utilize available data including eye tracking extrinsics and intrinsics, such as the geometric arrangements of the eye tracking camera 3270 relative to the light sources 326 and the head-mounted-unit 602; assumed eye dimensions 3304 such as a typical distance of approximately 4.7 mm between a user's center of cornea curvature and the average center of rotation of the user's eye or typical distances between a user's center of rotation and center of perspective; and per-user calibration data 3306 such as a particular user's interpupillary distance. Additional examples of extrinsics, intrinsics, and other information that may be employed by the eye tracking module 614 are described in U.S. patent application Ser. No. 15/497,726, filed Apr. 26, 2017, issued as U.S. Pat. No. 10,296,792, on May 21, 2019, entitled "IRIS BOUNDARY ESTIMATION USING CORNEA CURVATURE", which is incorporated by reference herein in its entirety.

Image preprocessing module 3280 may receive images from an eye camera such as eye camera 3270 and may perform one or more preprocessing (e.g., conditioning) operations on the received images. As examples, image preprocessing module 3280 may apply a Gaussian blur to the images, may down sample the images to a lower resolution, may applying an unsharp mask, may apply an edge sharpening algorithm, or may apply other suitable filters that assist with the later detection, localization, and labelling of glints, a pupil, or other features in the images from eye camera 3270. The image preprocessing module 3280 may apply a low-pass filter or a morphological filter such as an open filter, which may remove high-frequency noise such as from the pupillary boundary 516a (see FIG. 5), thereby removing noise that may hinder pupil and glint determination. The image preprocessing module 3280 may output preprocessed images to the pupil identification module 3282 and to the glint detection and labeling module 3284.

Pupil identification module 3282 may receive preprocessed images from the image preprocessing module 3280 and may identify regions of those images that include the user's pupil. The pupil identification module 3282 may, in some implementations, determine the coordinates of the position, or coordinates, of the center, or centroid, of the user's pupil in the eye tracking images from camera 3270. In at least some implementations, pupil identification module 3282 may identify contours in eye tracking images (e.g., contours of pupil iris boundary), identify contour moments (e.g., centers of mass), apply a starburst pupil detection and/or a canny edge detection algorithm, reject outliers based on intensity values, identify sub-pixel boundary points, correct for eye-camera distortion (e.g., distortion in images captured by eye camera 3270), apply a random sample consensus (RANSAC) iterative algorithm to fit an ellipse to boundaries in the eye tracking images, apply a tracking filter to the images, and identify sub-pixel image coordinates of the user's pupil centroid. The pupil identification module 3282 may output pupil identification data (which may indicate which regions of the preprocessing images module 3282 identified as showing the user's pupil) to glint detection and labeling module 3284. The pupil identification module 3282 may provide the 2D coordinates of the user's pupil (e.g., the 2D coordinates of the centroid of the user's pupil) within each eye tracking image to glint detection module 3284. In at least some implementations, pupil identification module 3282 may also provide pupil identification data of the same sort to coordinate system normalization module 3288.

Pupil detection techniques, which may be utilized by pupil identification module 3282, are described in U.S. Patent Publication No. 2017/0053165, published Feb. 23, 2017 and in U.S. Patent Publication No. 2017/0053166, published Feb. 23, 2017, each of which is incorporated by reference herein in its entirety.

Glint detection and labeling module 3284 may receive preprocessed images from module 3280 and pupil identification data from module 3282. Glint detection module 3284 may use this data to detect and/or identify glints (e.g., reflections off of the user's eye of the light from light sources 326) within regions of the preprocessed images that show the user's pupil. As an example, the glint detection module 3284 may search for bright regions within the eye tracking image, sometimes referred to herein as "blobs" or local intensity maxima, that are in the vicinity of the user's pupil. In at least some implementations, the glint detection module 3284 may rescale (e.g., enlarge) the pupil ellipse to encompass additional glints. The glint detection module 3284 may filter glints by size and/or by intensity. The glint detection module 3284 may also determine the 2D positions of each of the glints within the eye tracking image. In at least some examples, the glint detection module 3284 may determine the 2D positions of the glints relative to the user's pupil, which may also be referred to as the pupil-glint vectors. Glint detection and labeling module 3284 may label the glints and output the preprocessing images with labeled glints to the 3D cornea center estimation module 3286. Glint detection and labeling module 3284 may also pass along data such as preprocessed images from module 3280 and pupil identification data from module 3282. In some implementations, the glint detection and labeling module 3284 may determine which light source (e.g., from among a plurality of light sources of the system including infrared light sources 326a and 326b) produced each identified glint. In these examples, the glint detection and labeling module 3284 may label the glints with information identifying the associated light source and output the preprocessing images with labeled glints to the 3D cornea center estimation module 3286.

Pupil and glint detection, as performed by modules such as modules 3282 and 3284, may use any suitable techniques. As examples, edge detection may be applied to the eye image to identify glints and pupils. Edge detection may be applied by various edge detectors, edge detection algorithms, or filters. For example, a Canny Edge detector may be applied to the image to detect edges such as in lines of the image. Edges may include points located along a line that correspond to the local maximum derivative. For example, the pupillary boundary 516a (see FIG. 5) may be located using a Canny edge detector. With the location of the pupil determined, various image processing techniques may be used to detect the "pose" of the pupil 116. Determining an eye pose of an eye image may also be referred to as detecting an eye pose of the eye image. The pose may also be referred to as the gaze, pointing direction, or the orientation of the eye. For example, the pupil may be looking leftwards towards an object, and the pose of the pupil could be classified as a leftwards pose. Other methods may be used to detect the location of the pupil or glints. For example, a concentric ring may be located in an eye image using a Canny Edge detector. As another example, an integro-differential operator may be used to find the pupillary or limbus boundaries of the iris. For example, the Daugman integro-differential operator, the Hough transform, or other iris segmentation techniques may be used to return a curve that estimates the boundary of the pupil or the iris.

3D cornea center estimation module 3286 may receive preprocessed images including detected glint data and pupil identification data from modules 3280, 3282, 3284, 3D cornea center estimation module 3286 may use these data to estimate the 3D position of the user's cornea. In some implementations, the 3D cornea center estimation module 3286 may estimate the 3D position of an eye's center of cornea curvature or a user's corneal sphere, e.g., the center of an imaginary sphere having a surface portion generally coextensive with the user's cornea. The 3D cornea center estimation module 3286 may provide data indicating the estimated 3D coordinates of the corneal sphere and/or user's cornea to the coordinate system normalization module 3288, the optical axis determination module 3292, and/or the light-field render controller 618. Further details of the operation of the 3D cornea center estimation module 3286 are provided herein in connection with FIGS. 11-16C. Example techniques for estimating the positions of eye features such as a cornea or corneal sphere, which may be utilized by 3D cornea center estimation module 3286 and other modules in the wearable systems of the present disclosure are discussed in U.S. patent application Ser. No. 15/497,3296, filed Apr. 26, 2017, which is incorporated by reference herein in its entirety.

Coordinate system normalization module 3288 may optionally (as indicated by its dashed outline) be included in eye tracking module 614. Coordinate system normalization module 3288 may receive data indicating the estimated 3D coordinates of the center of the user's cornea (and/or the center of the user's corneal sphere) from the 3D cornea center estimation module 3286 and may also receive data from other modules. Coordinate system normalization module 3288 may normalize the eye camera coordinate system, which may help to compensate for slippages of the wearable device (e.g., slippages of the head-mounted component from its normal resting position on the user's head, which may be identified by registration observer 620). Coordinate system normalization module 3288 may rotate the coordinate system to align the z-axis (e.g., the vergence depth axis) of the coordinate system with the cornea center (e.g., as indicated by the 3D cornea center estimation module 3286) and may translate the camera center (e.g., the origin of the coordinate system) to a predetermined distance away from the cornea center such as 30 mm (e.g., module 3288 may enlarge or shrink the eye tracking image depending on whether the eye camera 3270 was determined to be nearer or further than the predetermined distance). With this normalization process, the eye tracking module 614 may be able to establish a consistent orientation and distance in the eye tracking data, relatively independent of variations of headset positioning on the user's head. Coordinate system normalization module 3288 may provide 3D coordinates of the center of the cornea (and/or corneal sphere), pupil identification data, and pre-processed eye tracking images to the 3D pupil center locator module 3290.

3D pupil center locator module 3290 may receive data, in the normalized or the unnormalized coordinate system, including the 3D coordinates of the center of the user's cornea (and/or corneal sphere), pupil location data, and preprocessed eye tracking images. 3D pupil center locator module 3290 may analyze such data to determine the 3D coordinates of the center of the user's pupil in the normalized or unnormalized eye camera coordinate system. The 3D pupil center locator module 3290 may determine the location of the user's pupil in three-dimensions based on the 2D position of the pupil centroid (as determined by module 3282), the 3D position of the cornea center (as determined by module 3286), assumed eye dimensions 3304 such as the size of the a typical user's corneal sphere and the typical distance from the cornea center to the pupil center, and optical properties of eyes such as the index of refraction of the cornea (relative to the index of refraction of air) or any combination of these. Techniques for estimating the positions of eye features such as a pupil, which may be utilized by 3D pupil center locator module 3290 and other modules in the wearable systems of the present disclosure are discussed in U.S. patent application Ser. No. 15/497,3296, filed Apr. 26, 2017, which is incorporated by reference herein in its entirety.

Optical axis determination module 3292 may receive data from modules 3286 and 3290 indicating the 3D coordinates of the center of the user's cornea and the user's pupil. Based on such data, the optical axis determination module 3292 may identify a vector from the position of the cornea center (e.g., from the center of the corneal sphere) to the center of the user's pupil, which may define the optical axis of the user's eye. Optical axis determination module 3292 may provide outputs specifying the user's optical axis to modules 3294, 3298, 3310, and 3312, as examples.

Center of rotation (CoR) estimation module 3294 may receive data from module 3292 including parameters of the optical axis of the user's eye (e.g., data indicating the direction of the optical axis in a coordinate system with a known relation to the head-mounted unit 602). For example, CoR estimation module 3294 may estimate the center of rotation of a user's eye. The center of rotation may indicate a point around which the user's eye rotates when the user eye rotates left, right, up, and/or down. While eyes may not rotate perfectly around a singular point, assuming a singular point may be sufficient. In at least some implementations. CoR estimation module 3294 may estimate an eye's center of rotation by moving from the center of the pupil (identified by module 3290) or the center of curvature of the cornea (as identified by module 3286) toward the retina along the optical axis (identified by module 3292) a particular distance. This particular distance may be an assumed eye dimension 3304. As one example, the particular distance between the center of curvature of the cornea and the CoR may be approximately 4.7 mm. This distance may be varied for a particular user based on any relevant data including the user's age, sex, vision prescription, other relevant characteristics, etc.

In at least some implementations, the CoR estimation module 3294 may refine its estimate of the center of rotation of each of the user's eyes over time. As an example, as time passes, the user will eventually rotate their eyes (to look somewhere else, at something closer, further, or sometime left, right, up, or down) causing a shift in the optical axis of each of their eyes. CoR estimation module 3294 may then analyze two (or more) optical axes identified by module 3292 and locate the 3D point of intersection of those optical axes. The CoR estimation module 3294 may then determine the center of rotation lies at that 3D point of intersection. Such a technique may provide for an estimate of the center of rotation, with an accuracy that improves over time.

Various techniques may be employed to increase the accuracy of the CoR estimation module 3294 and the determined CoR positions of the left and right eyes. As an example, the CoR estimation module 3294 may estimate the CoR by finding the average point of intersection of optical axes determined for various different eye poses over time. As additional examples, module 3294 may filter or average estimated CoR positions over time, may calculate a moving average of estimated CoR positions over time, and/or may apply a Kalman filter and known dynamics of the eyes and eye tracking system to estimate the CoR positions over time. In some implementations, a least-squares approach may be taken to determine one or more points of intersection of optical axes. In such implementations, the system may, at a given point in time, identify a location at which the sum of the squared distances to a given set of optical axes is reduced or minimized as the point of optical axes intersection. As a specific example, module 3294 may calculate a weighted average of determined points of optical axes intersection and assumed CoR positions (such as 4.7 mm from an eye's center of cornea curvature), such that the determined CoR may slowly drift from an assumed CoR position (e.g., 4.7 mm behind an eye's center of cornea curvature) to a slightly different location within the user's eye over time as eye tracking data for the user is obtain and thereby enables per-user refinement of the CoR position.

Under ideal conditions, the 3D position of the true CoR of a user's eye relative to the HMD should change a negligible or minimal amount over time as the user moves their eye (e.g., as the user's eye rotates around its center of rotation). In other words, for a given set of eye movements, the 3D position of the true CoR of the user's eye (relative to the HMD) should hypothetically vary less over time than any other point along the optical axis of the user's eye. As such, it follows that the further away a point along the optical axis is from the true CoR of the user's eye, the more variation or variance its 3D position will exhibit over time as the user moves their eye. In some implementations, the CoR estimation module 3294 and/or other submodules of eye tracking module 614 may make use of this statistical relationship to improve CoR estimation accuracy. In such implementations, the CoR estimation module 3294 and/or other submodules of eye tracking module 614 may refine their estimates of the CoR 3D position over time by identifying variations of its CoR estimates having a low variation (e.g., low variance or standard deviation).

As a first example and in implementations where the CoR estimation module 3294 estimates CoR based on intersection of multiple different optical axes (each associated with the user looking in a different direction), the CoR estimation module 3294 may make use of this statistical relationship (that the true CoR should have a low variance) by introducing common offsets to the direction of each of the optical axes (e.g., shifting each axis by some uniform amount) and determining if the offset optical axes intersect with each other in an intersection point having a low variation, e.g., low variance or standard deviation. This may correct for minor systemic errors in calculating the directions of the optical axes and help to refine the estimated position of the CoR to be closer to the true CoR.

As a second example and in implementations where the CoR estimation module 3294 estimates CoR by moving along an optical axis (or other axis) by a particular distance (e.g., such as the distance between the center of curvature of the cornea and the CoR), the system may vary, optimize, tune, or otherwise adjust the particular distance between the center of curvature of the cornea and the CoR over time (for example, for a large group of images of the eye captured at different times) in a manner so as to reduce or minimize the variation, for example, variance and/or standard deviation of the estimated CoR position. For example, if the CoR estimation module 3294 initially uses a particular distance value of 4.7 mm (from the center of curvature of the cornea and along the optical axis) to obtain CoR position estimates, but the true CoR of a given user's eye may be positioned 4.9 mm behind the eye's center of cornea curvature (along the optical axis), then an initial set of CoR position estimates obtained by the CoR estimation module 3294 may exhibit a relatively high amount of variation, e.g., variance or standard deviation. In response to detecting such a relatively high amount of variation (e.g., variance or standard deviation), the CoR estimation module 3294 may look for and identify one or more points along the optical axis having a lower amount of variation (e.g., variance or standard deviation), may identify the 4.9 mm distance as having the lowest variation (e.g., variance or standard deviation), and may thus adjust the particular distance value utilized to 4.9 mm.

The CoR estimation module 3294 may look for alternative CoR estimations having lower variation (e.g., variance and/or standard deviation) in response to detecting that a current CoR estimate has a relatively high amount of variation (e.g., variance or standard deviation) or may look for alternative CoR estimations having lower variation (e.g. variance or standard deviation) as a matter of course after obtaining initial CoR estimates. In some examples, such an optimization/adjustment may happen gradually over time, while in other examples, such an optimization/adjustment may be made during an initial user calibration session. In examples where such a procedure is conducted during a calibration procedure, the CoR estimation module 3294 may not initially subscribe/adhere to any assumed particular distance, but may rather collect a set of eye tracking data over time, perform statistical analysis on the set of eye tracking data, and determine the particular distance value yielding CoR position estimates with the least possible amount (e.g., global minima) of variation (e.g. variance or standard deviation) based on the statistical analysis.

Interpupillary distance (IPD) estimation module 3296 may receive data from CoR estimation module 3294 indicating the estimated 3D positions of the centers of rotation of the user's left and right eyes. IPD estimation module 3296 may then estimate a user's IPD by measuring the 3D distance between the centers of rotation of the user's left and right eyes. In general, the distance between the estimated CoR of the user's left eye and the estimated CoR of the user's right eye may be roughly equal to the distance between the centers of a user's pupils, when the user is looking at optical infinity (e.g., the optical axes of the user's eyes are substantially parallel to one another), which is the typical definition of interpupillary distance (IPD). A user's IPD may be used by various components and modules in the wearable system. As example, a user's IPD may be provided to registration observer 620 and used in assessing how well the wearable device is aligned with the user's eyes (e.g., whether the left and right display lenses are properly spaced in accordance with the user's IPD). As another example, a user's IPD may be provided to vergence depth estimation module 3298 and be used in determining a user's vergence depth. Module 3296 may employ various techniques, such as those discussed in connection with CoR estimation module 3294, to increase the accuracy of the estimated IPD. As examples, IPD estimation module 3294 may apply filtering, averaging over time, weighted averaging including assumed IPD distances. Kalman filters. etc. as part of estimating a user's IPD in an accurate manner.

Vergence depth estimation module 3298 may receive data from various modules and submodules in the eye tracking module 614 (as shown in connection with FIG. 17C). In particular, vergence depth estimation module 3298 may employ data indicating estimated 3D positions of pupil centers (e.g., as provided by module 3290 described above), one or more determined parameters of optical axes (e.g., as provided by module 3292 described above), estimated 3D positions of centers of rotation (e.g., as provided by module 3294 described above), estimated IPD (e.g., Euclidean distance(s) between estimated 3D positions of centers of rotations) (e.g., as provided by module 3296 described above), and/or one or more determined parameters of optical and/or visual axes (e.g., as provided by module 3292 and/or module 3310 described below). Vergence depth estimation module 3298 may detect or otherwise obtain a measure of a user's vergence depth, which may be the distance from the user at which the user's eyes are focused. As examples, when the user is looking at an object three feet in front of them, the user's left and right eyes have a vergence depth of three feet; and, while when the user is looking at a distant landscape (e.g., the optical axes of the user's eyes are substantially parallel to one another such that the distance between the centers of the user's pupils may be roughly equal to the distance between the centers of rotation of the user's left and right eyes), the user's left and right eyes have a vergence depth of infinity. In some implementations, the vergence depth estimation module 3298 may utilize data indicating the estimated centers of the user's pupils (e.g., as provided by module 3290) to determine the 3D distance between the estimated centers of the user's pupils. The vergence depth estimation module 3298 may obtain a measure of vergence depth by comparing such a determined 3D distance between pupil centers to estimated IPD (e.g., Euclidean distance(s) between estimated 3D positions of centers of rotations) (e.g., as indicated by module 3296 described above). In addition to the 3D distance between pupil centers and estimated IPD, the vergence depth estimation module 3298 may utilize known, assumed, estimated, and/or determined geometries to calculate vergence depth. As an example, module 3298 may combine 3D distance between pupil centers, estimated IPD, and 3D CoR positions in a trigonometric calculation to estimate (e.g., determine) a user's vergence depth. Indeed, an evaluation of such a determined 3D distance between pupil centers against estimated IPD may serve to indicate a measure of the user's current vergence depth relative to optical infinity. In some examples, the vergence depth estimation module 3298 may simply receive or access data indicating an estimated 3D distance between the estimated centers of the user's pupils for purposes of obtaining such a measure of vergence depth. In some implementations, the vergence depth estimation module 3298 may estimate vergence depth by comparing a user's left and right optical axis.

In particular, vergence depth estimation module 3298 may estimate vergence depth by locating the distance from a user at which the user's left and right optical axes intersect (or where projections of the user's left and right optical axes on a plane such as a horizontal plane intersect). Module 3298 may utilize a user's IPD in this calculation, by setting the zero depth to be the depth at which the user's left and right optical axes are separated by the user's IPD. In at least some implementations, vergence depth estimation module 3298 may determine vergence depth by triangulating eye tracking data together with known or derived spatial relationships.

In some implementations, vergence depth estimation module 3298 may estimate a user's vergence depth based on the intersection of the user's visual axes (instead of their optical axes), which may provide a more accurate indication of the distance at which the user is focused on. In at least some implementations, eye tracking module 614 may include optical to visual axis mapping module 3310. As discussed in further detail in connection with FIG. 10, a user's optical and visual axes are generally not aligned. A visual axis is the axis along which a person is looking, while an optical axis is defined by the center of that person's lens and pupil, and may go through the center of the person's retina. In particular, a user's visual axis is generally defined by the location of the user's fovea, which may be offset from the center of a user's retina, thereby resulting in different optical and visual axis. In at least some of these implementations, eye tracking module 614 may include optical to visual axis mapping module 3310. Optical to visual axis mapping module 3310 may correct for the differences between a user's optical and visual axis and provide information on the user's visual axis to other components in the wearable system, such as vergence depth estimation module 3298 and light-field render controller 618. In some examples, module 3310 may use assumed eye dimensions 3304 including a typical offset of approximately 5.2° inwards (nasally, towards a user's nose) between an optical axis and a visual axis. In other words, module 3310 may shift a user's left optical axis (nasally) rightwards by 5.2° towards the nose and a user's right optical axis (nasally) leftwards by 5.2° towards the nose in order to estimate the directions of the user's left and right optical axes. In other examples, module 3310 may utilize per-user calibration data 3306 in mapping optical axes (e.g., as indicated by module 3292 described above) to visual axes. As additional examples, module 3310 may shift a user's optical axes nasally by between 4.0° and 6.5°, by between 4.5° and 6.0°, by between 5.0° and 5.4°, etc., or any ranges formed by any of these values. In some arrangements, the module 3310 may apply a shift based at least in part upon characteristics of a particular user such as their age, sex, vision prescription, or other relevant characteristics and/or may apply a shift based at least in part upon a calibration process for a particular user (e.g., to determine a particular user's optical-visual axis offset). In at least some implementations, module 3310 may also shift the origins of the left and right optical axes to correspond with the user's CoP (as determined by module 3312) instead of the user's CoR.

Optional center of perspective (CoP) estimation module 3312, when provided, may estimate the location of the user's left and right centers of perspective (CoP). A CoP may be a useful location for the wearable system and, in at least some implementations, is a position just in front of a pupil. In at least some implementations, CoP estimation module 3312 may estimate the locations of a user's left and right centers of perspective based on the 3D location of a user's pupil center, the 3D location of a user's center of cornea curvature, or such suitable data or any combination thereof. As an example, a user's CoP may be approximately 5.01 mm in front of the center of cornea curvature (e.g., 5.01 mm from the corneal sphere center in a direction that is towards the eye's cornea and that is along the optical axis) and may be approximately 2.97 mm behind the outer surface of a user's cornea, along the optical or visual axis. A user's center of perspective may be just in front of the center of their pupil. As examples, a user's CoP may be less than approximately 2.0 mm from the user's pupil, less than approximately 1.0 mm from the user's pupil, or less than approximately 0.5 mm from the user's pupil or any ranges between any of these values. As another example, the center of perspective may correspond to a location within the anterior chamber of the eye. As other examples, the CoP may be between 1.0 mm and 2.0 mm, about 1.0 mm, between 0.25 mm and 1.0 mm, between 0.5 mm and 1.0 mm, or between 0.25 mm and 0.5 mm from the user's pupil.

The center of perspective described herein (as a potentially desirable position for a pinhole of a render camera and an anatomical position in a user's eye) may be a position that serves to reduce and/or eliminate undesired parallax shifts. In particular, the optical system of a user's eye is very roughly equivalent to theoretical system formed by a pinhole in front of a lens, projecting onto a screen, with the pinhole, lens, and screen roughly corresponding to a user's pupil/iris, lens, and retina, respectively. Moreover, it may be desirable for there to be little or no parallax shift when two point light sources (or objects) at different distances from the user's eye are rigidly rotated about the opening of the pinhole (e.g., rotated along radii of curvature equal to their respective distance from the opening of the pinhole). Thus, it would seem that the CoP should be located at the center of the pupil of an eye (and such a CoP may be used in some implementations). However, the human eye includes, in addition to the lens and pinhole of the pupil, a cornea that imparts additional optical power to light propagating toward the retina). Thus, the anatomical equivalent of the pinhole in the theoretical system described in this paragraph may be a region of the user's eye positioned between the outer surface of the cornea of the user's eye and the center of the pupil or iris of the user's eye. For instance, the anatomical equivalent of the pinhole may correspond to a region within the anterior chamber of a user's eye. For various reasons discussed herein, it may be desired to set the CoP to such a position within the anterior chamber of the user's eye.

As discussed above, eye tracking module 614 may provide data, such as estimated 3D positions of left and right eye centers of rotation (CoR), vergence depth, left and right eye optical axis, 3D positions of a user's eye, 3D positions of a user's left and right centers of cornea curvature, 3D positions of a user's left and right pupil centers, 3D positions of a user's left and right center of perspective, a user's IPD, etc., to other components, such as light-field render controller 618 and registration observer 620, in the wearable system. Eye tracking module 614 may also include other submodules that detect and generate data associated with other aspects of a user's eye. As examples, eye tracking module 614 may include a blink detection module that provides a flag or other alert whenever a user blinks and a saccade detection module that provides a flag or other alert whenever a user's eye saccades (e.g., quickly shifts focus to another point).

Other methods of eye tracking and determining the center of rotation are possible. Accordingly, the eye tracking module 614 may be different. In various implementations of eye tracking modules described below, for example, estimates of center of rotation are determined based on a plurality of center of corneal curvature values. In some implementations, for example, as discussed with reference to FIGS. 17A-19, the eye tracking module 614 may estimate an eye's center of rotation by determining an convergence or intersection among surface normal vectors of a surface fitted to a plurality of center of curvatures of the cornea possibly for different eye poses. Nevertheless, one or more features from the eye tracking module 614 described above or elsewhere herein may be included in other implementations of eye tracking modules.

Eye tracking techniques are discussed in U.S. Patent App. Pub. No. 2019/0243558, published Aug. 8, 2019, entitled "EYE CENTER OF ROTATION DETERMINATION, DEPTH PLANE SELECTION, AND RENDER CAMERA POSITIONING IN DISPLAY SYSTEMS", and International Pub. No. WO 2021/01166, published Jan. 21, 2021; priority to U.S. Prov. App. No. 62/874,867, filed Jul. 16, 2019) entitled "EYE CENTER OF ROTATION DETERMINATION WITH ONE OR MORE EYE TRACKING CAMERAS," the entire disclosure of each of which are incorporated by reference herein.

Example Light Injection System

As discussed above with reference to FIG. 15, a display system may identify one or more out-coupling regions for receiving image light to be outputted. In addition, as discussed above, eye pose may be determined in order to facilitate determination of the appropriate out-coupling region to select of out-coupling image light. Once the appropriate out-coupling region or regions is determined, the display system may be configured to determine the appropriate routing of light to the out-coupling region or regions. For example, functionally directing light to a particular light out-coupling region or regions may involve directing image light into the in-couplings uniquely associated with those out-coupling regions.

Figure 18:
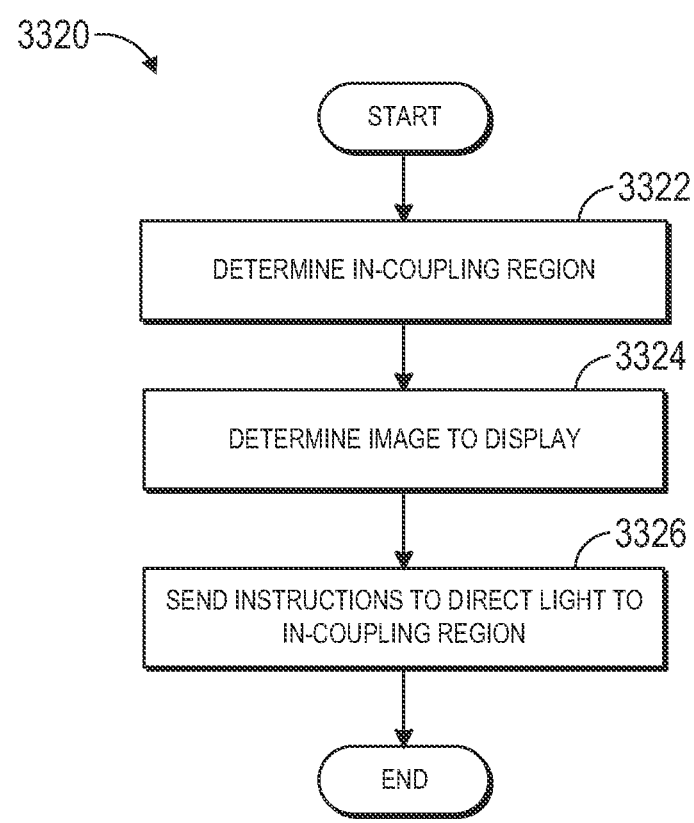
FIG. 18 illustrates a flow chart of an example process for operating a display system having a plurality of in-coupling regions.
Figure 19:
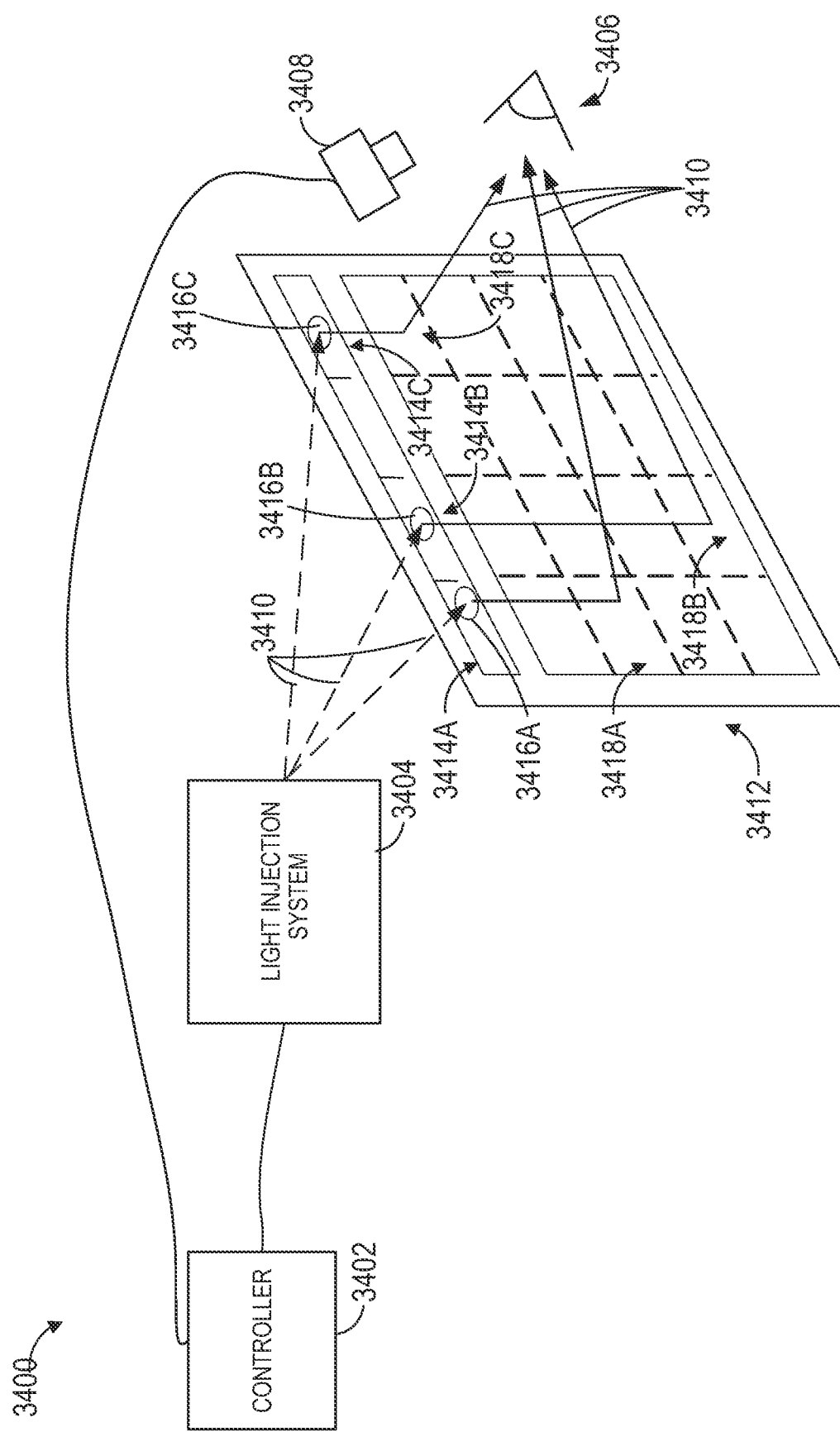
FIG. 19 illustrates an example display with an array of in-coupling regions and a light injection system for directing light to selected regions.

FIG. 18 is a flow diagram of an example light direction process 3320 that may be used to direct light to a determined out-coupling region of a display. At a block 3322, the display system may determine an in-coupling region to direct light towards on a display. For example, an in-coupling region may include an in-coupling region associated with a desired rendering location on a display. The desired rendering location may be determined based on a determination process such as described with reference to FIG. 16. In some examples, the in-coupling region may be an area, group, array, or other combination of in-coupling optical features, such as an in-coupling grating. As illustrated in FIG. 19, an in-coupling region of a display may include an arrangement of in-coupling features arranged along a portion of the display. At the block 3322, the display system may determine to direct light to an in-coupling region such that the light is directed to the appropriate associated out-coupling region to form at least a portion of a perceived image on the display.

At a block 3324, the display system may determine an image to display to the user. The image may include a representation of virtual content to be displayed in the user's environment, and image may include a portion of the virtual content or all of the virtual content. For example, the display system may receive an indication to display a tree. The display system may determine the representation of the tree to project to the determined in-coupling region or a portion of the tree to project to the determined in-coupling region. In some examples, the display system may break up an image or representation of a virtual object that may fall across multiple out-coupling regions of the viewing area of the display. To display the full effect of the virtual object in such a case, the display system may break up the image so that light projected to a portion of the image in a first region of the display contains an image of the portion associated with that region during rendering. In some examples, the image may contain parts of the representation of the virtual object overlapping an amount so as to prevent gaps in rendering when displaying a large object across regions of the display.

At a block 3326, the display system may send instructions to direct light to the in-coupling region. As discussed above, the directed light may include image information for forming an image to display from an out-coupling region of the display associated with that in-coupling region. The display system may utilize one or more light injection systems to direct light to an in-coupling region. For example, as illustrated in FIG. 19, a display system may include a controller 3402, a light injection system 3404, a waveguide 3412, and a camera 3408. The controller 3402 may communicate instructions to the light injection system 3404 to direct or inject light 3410 to a selected in-coupling region, such as in-coupling region 3414A. 3414B, or 3414C on a waveguide 3412. As discussed above, with reference to FIGS. 16-17C, the display system may determine which in-coupling region 3414A. 3414B, 3414C or in-coupling optical element 3416A, 3416B, 3416C associated with an in-coupling region to inject light into based on, for example, an eye pose of a user. The eye pose of the user may be determined by the display system using images from one or more cameras 3408 configured to image at least one eye of the user. Injected light may propagate through one or more waveguides associated with the display towards an associated out-coupling region 3418A, 3418B, 3418C. One or more out-coupling optical elements in an out-coupling region 3418A, 3418B, 3418C may output light towards a user's eye 3406. It will be appreciated that the in-coupling regions 3414A, 3414B, 3414C may correspond to any of the in-coupling regions identified with the reference numerals 1005, 700, 710, and 720 and various suffixes (see, e.g., FIGS. 11A and 14B).

The controller 3402 may include one or more software engines for performing the process and functions described herein. The software engines may include programmed instructions for performing processes as discussed herein (and illustrated in flowcharts) for directing a light injection system to inject light towards regions of a display. The engines may be executed by the one or more hardware processors associated with the display system. The programming instructions may be stored in a memory associated with the display system. The programming instructions may be implemented in C, C++, JAVA, or any other suitable programming languages. In some implementations, some or all of the portions of the controller 3402 including the engines may be implemented in application specific circuitry such as ASICs and FPGAs. Some aspects of the functionality of the controller 3402 may be executed remotely on a server over a network. Accordingly, the controller 3402 may be implemented with the hardware components (e.g., the controller 560, processing module 140 and/or processing module 150) described above with reference to FIGS. 6 and 9D.

The light injection system may be any suitable system for selectively directing light towards a desired region. For example, as illustrated in FIGS. 20A-20D, the light injection system may include a movable injection mechanism, such as a scanning fiber injector. In another example, as illustrated in FIGS. 21A-21D, the light injection system may include one or more movable mirrors to direct light. Additionally or alternatively, the light injection system may utilize one or more stationary injection systems, such as those forming images for different in-coupling regions at different locations of an SLM such as described in detail with reference to FIG. 22. However, while specifics of example light injection systems may be discussed, a display system may utilize any number or combination of light injection systems to direct light to a determined in-coupling region.

Example Mechanically Actuated Light Injection Systems

The light injection system 3404 (FIG. 19) may take the form of a movable injector system in some implementations. The movable injector system may include one or more components configured to physically move an optical component in order to direct light towards a desired location, such as an in-coupling region 3414A, 3414B, 3414C on a waveguide 3412. FIGS. 20A-20D and 21A-21B illustrate two example movable injection systems.

Figure 20A:
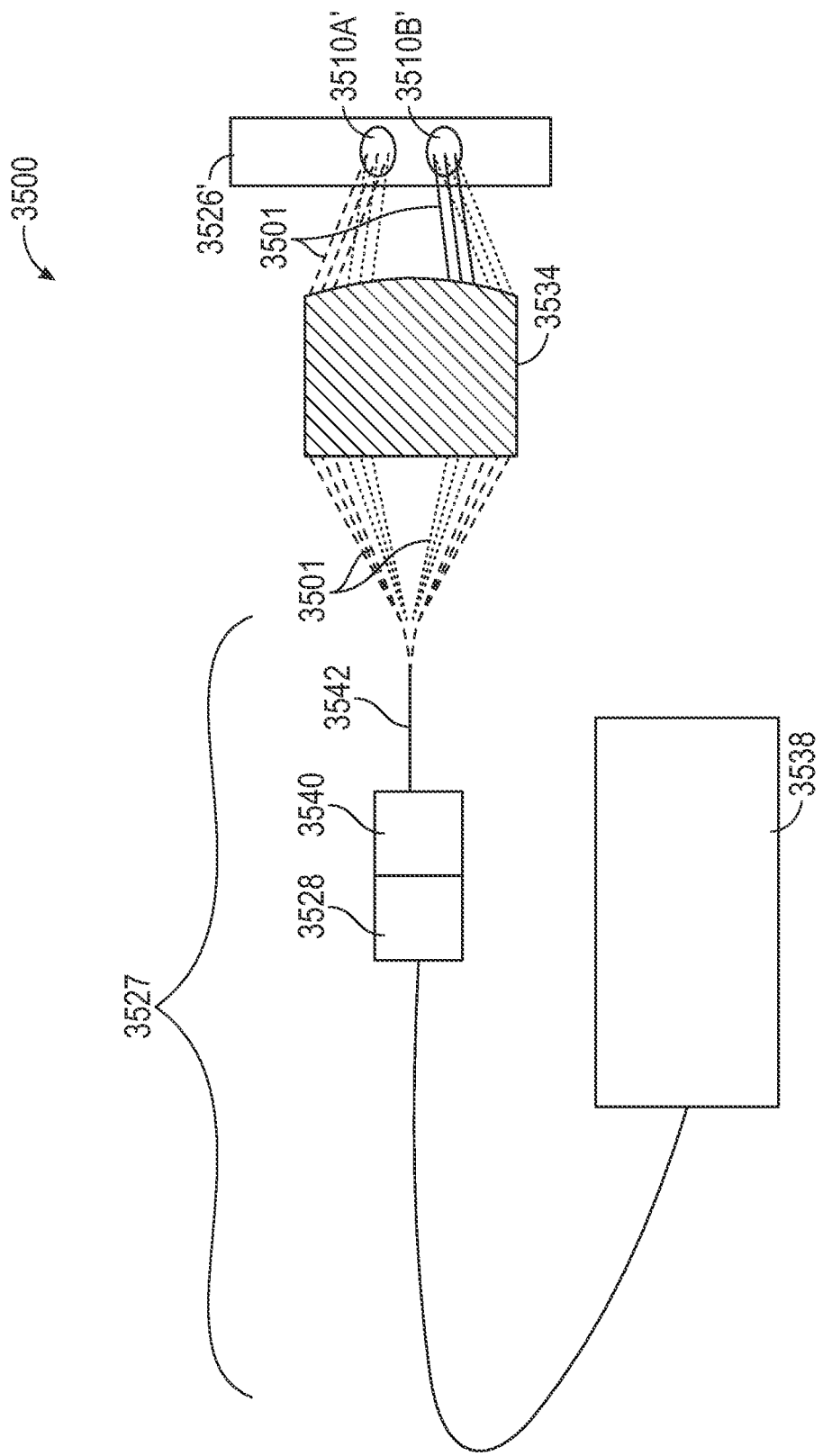
FIGS. 20A-20D illustrates example movable light injection systems that include a scanning fiber injector.

FIGS. 20A-20D illustrate implementations of an example movable injection system 3500 that includes at least one scanning fiber injector 3527. It will be appreciated that the movable injection system 3500 may correspond to the light injection system 3404 (FIG. 19). A scanning fiber injector 3527 may include at least one light emitter 3528 and at least one actuator 3540 which causes a fiber 3542 to move. Light 3501 from the end of the fiber 3542 may be propagated through optics 3534 towards an in-coupling region 3510A' or 3510B' in a waveguide 3526'. In some examples, as illustrated in FIG. 20A, the optics 3534 may be collimating optics that is configured to receive light, fanning out from the fiber 3542, and collimate the light before the light propagates to the in-coupling region 3510A' or 3510B'.

Figure 20B:
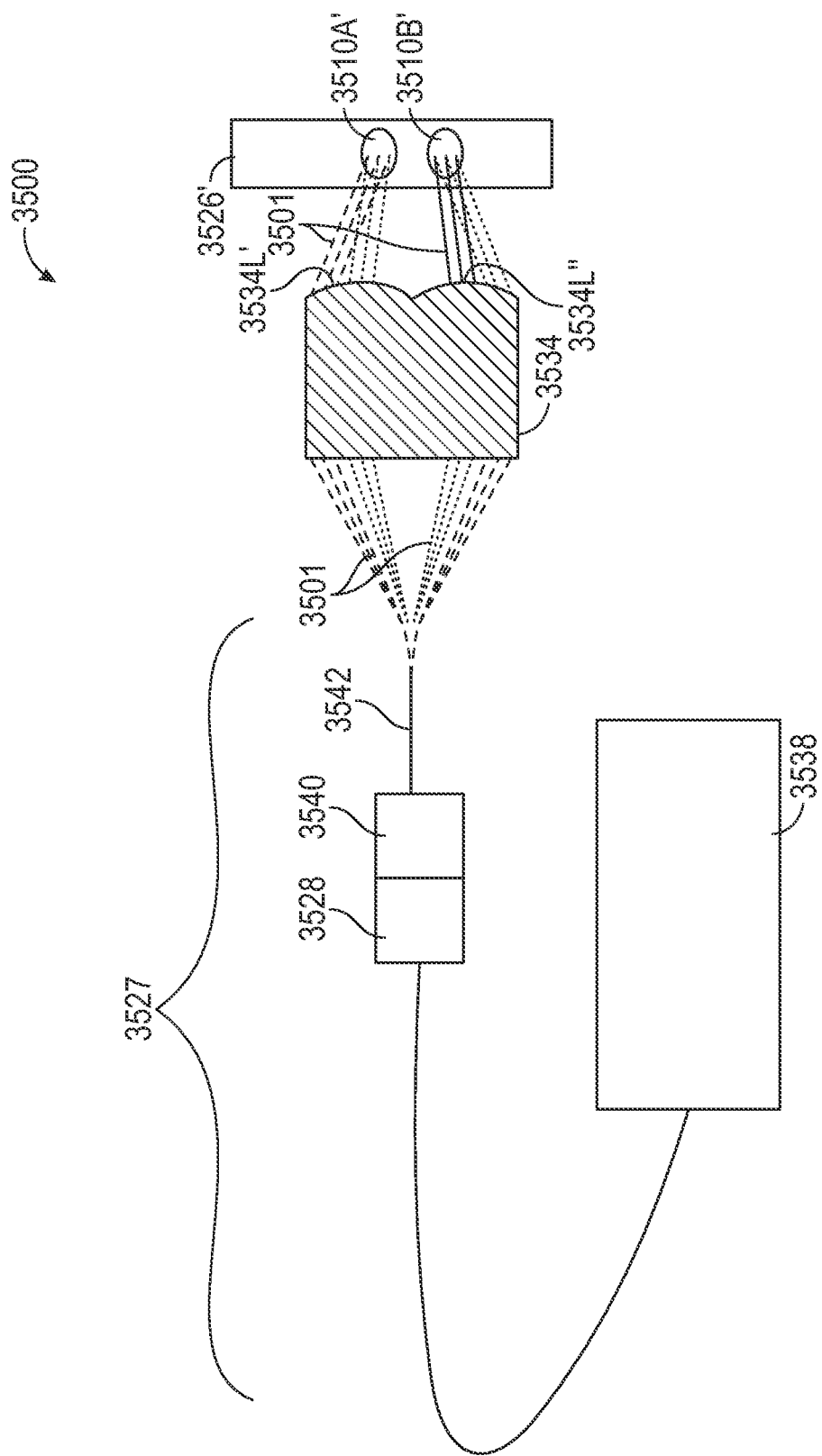
Figure 20C:
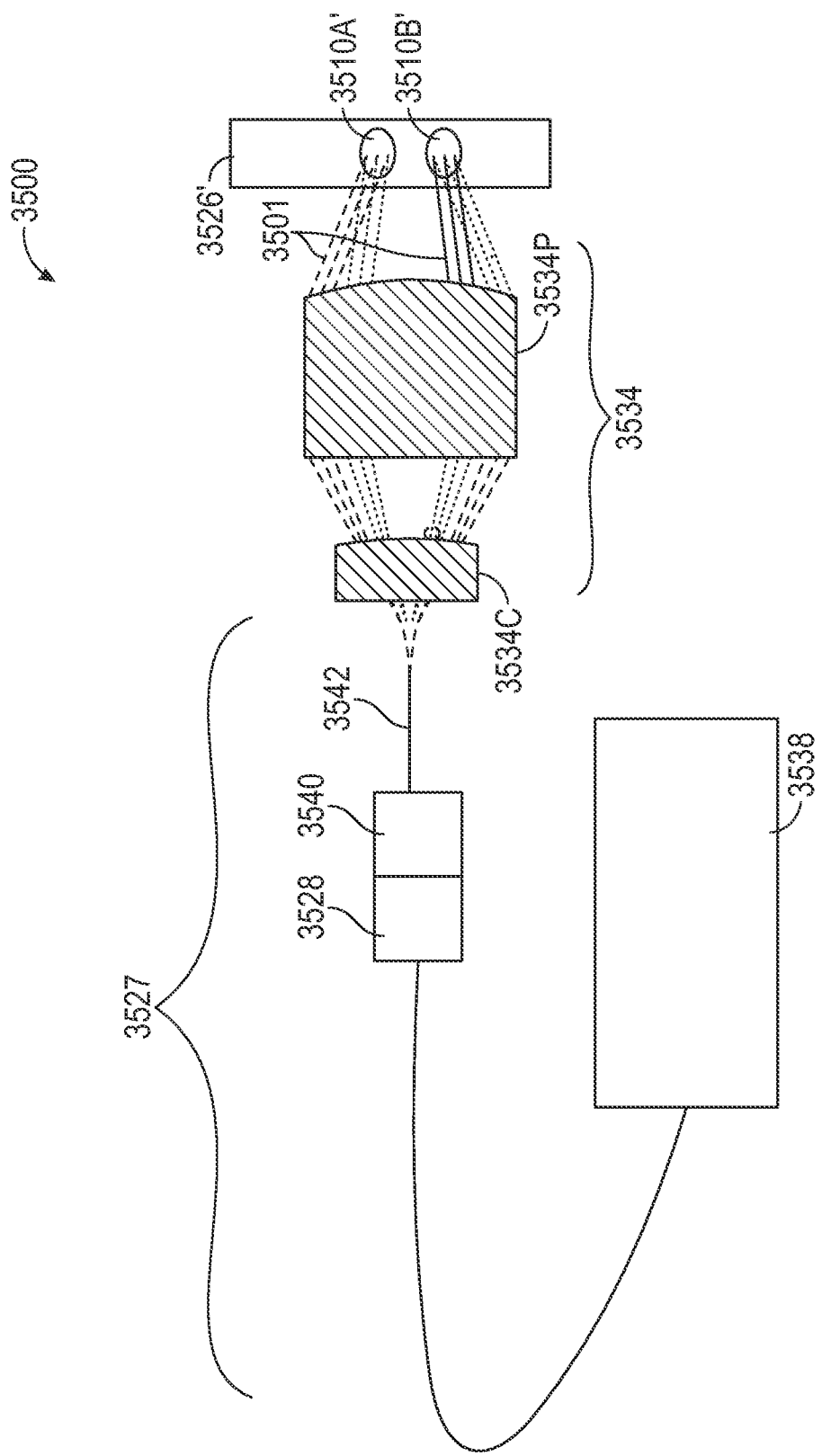
Figure 20D:
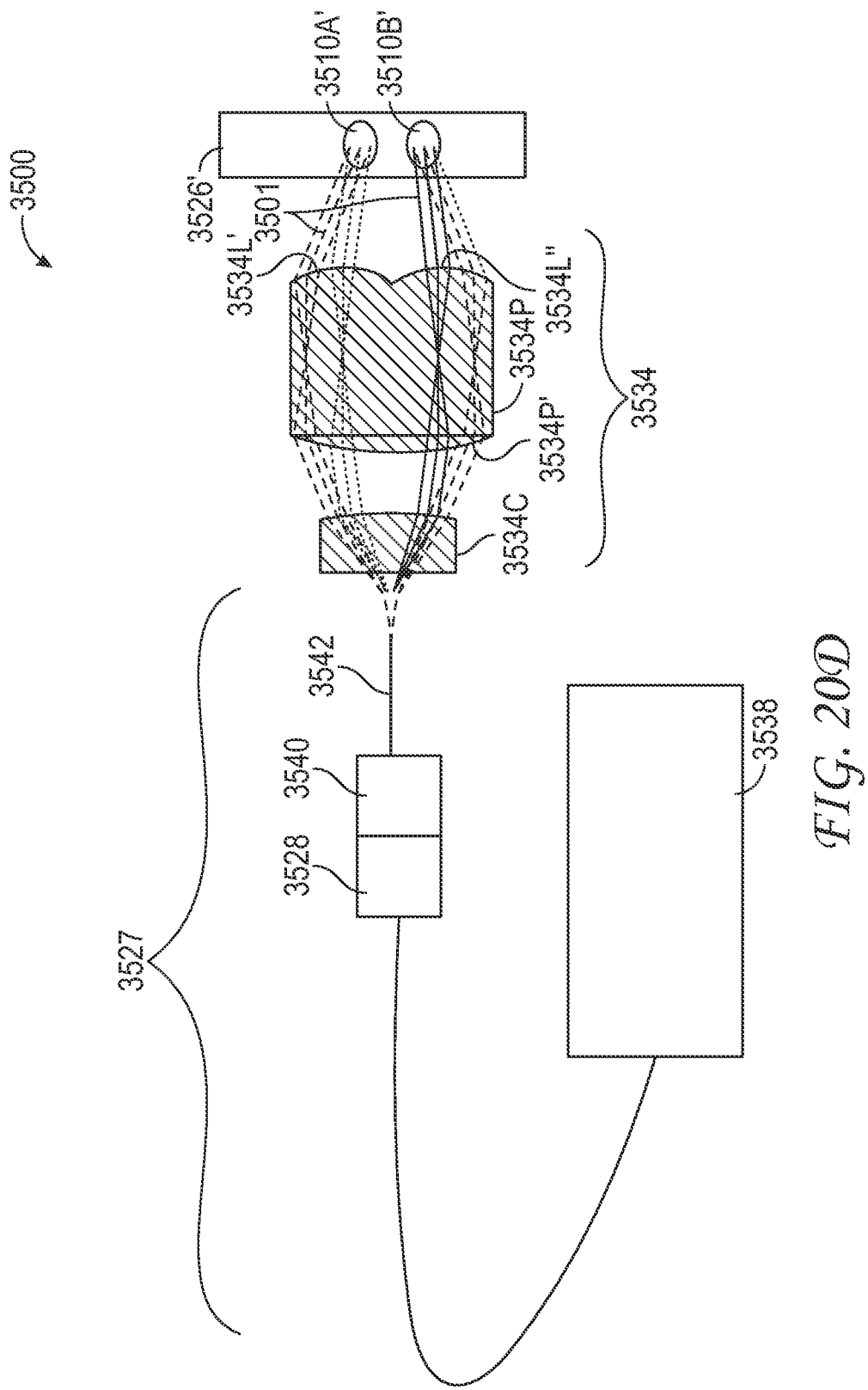

The collimating optics may take various forms and may include one or more lens structures. In some examples, as illustrated in FIG. 20B, the optics 3534 may include a lenticular lens, comprising a plurality of lens 3534L', 3534L" (for example, a lenslet array). Each of the plurality of lens may be configured to provide collimated light to an associated in-coupling region 3510A' or 3510B'. In some examples, as illustrated in FIG. 20C, the optics 3534 may include a collimating lens structure 3534C, for collimating incident light, and a projection lens structure 3534P, for propagating the collimated light to the in-coupling region 3510A' or 3510B'. More generally, it will be appreciated that the optics 3534 may include combinations of various lens structures to perform the function of providing collimated light to a plurality of in-coupling regions such as the in-coupling regions 3510A' or 3510B'. In some examples, as illustrated in FIG. 20D, the projection optics 3534 may include collimating lens structure 3534C and a projection lens structure 3534P comprising a convex lens 3534P' and a lenticular lens, comprising a plurality of lens 3534L', 3534L". It will be appreciated that other combinations of lenses are also contemplated.

With reference again to FIGS. 20A-20D, the actuator 3540 may cause the fiber 3542 to move along a predefined path (e.g., a circular path) at a known speed. Consequently, the processing module 3638 may be configured to synchronize the propagation of light out of the end of the fiber 3542 with the movement of the fiber 3542 such that image light propagates out of the fiber 3542 at a desired light output location, which is in turn synchronized with the image to be displayed.

In some implementations, the light source 3528 may be replaced with a virtual light source formed on the image plane of a light projection system. The light projection system may include an actuator capable of causing a beam of light to scan across an area on the image plane corresponding to the virtual light source. As discussed herein, to mimic the ability to activate the discrete light-emitting areas of the light source 3528, the output of light by the projection system is synchronized with the movement of the actuator to cause light to be outputted to desired locations on the image plane at particular times. Preferably, the rate at which the actuator is able to scan the beam of light across the image plane is sufficiently high that all desired light output locations on the image plane may be accessed during the timeframe in which any given intra-pupil image is displayed. For example, during the amount of time that a particular image is displayed, the actuator is preferably able to scan a beam of light at least once, and preferably a plurality of times, across the area of the image plane corresponding to the virtual 2D light source.

Figure 21A:
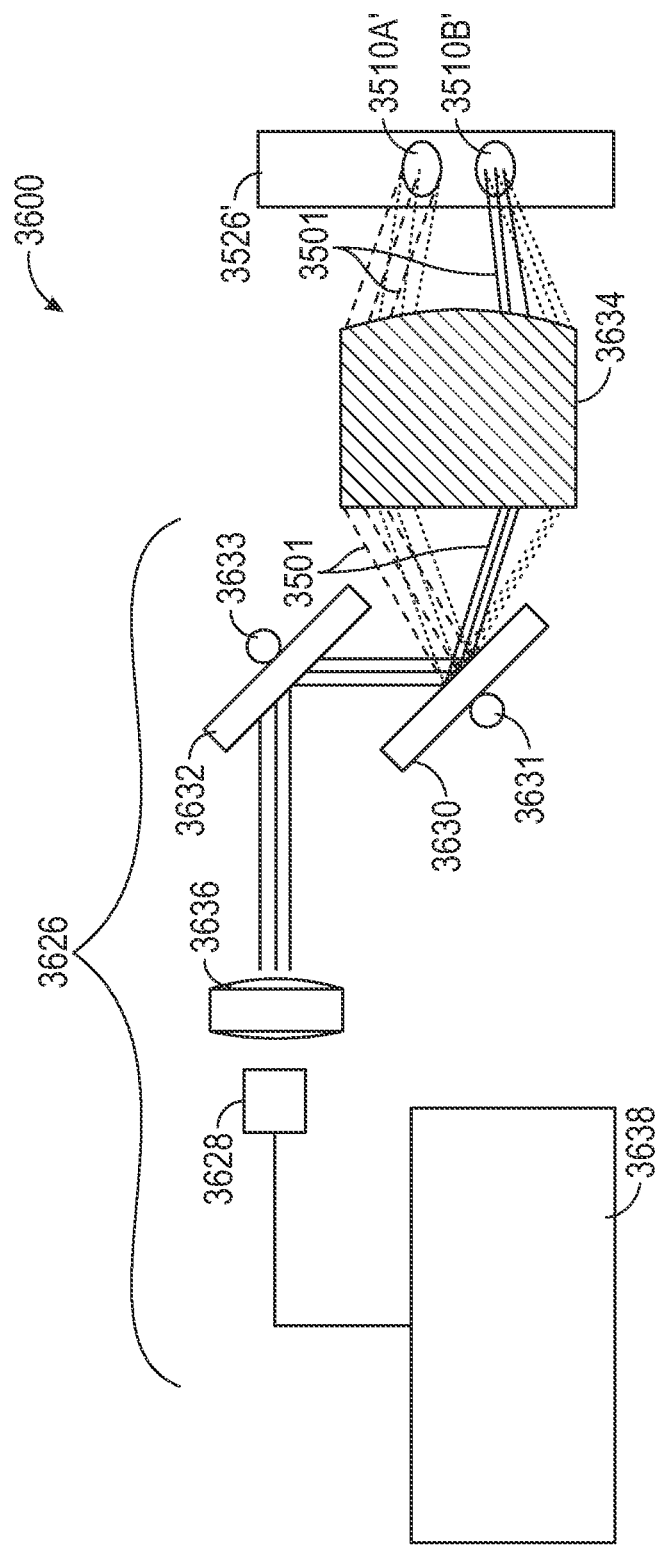
FIGS. 21A-21B illustrates an example movable light injection system that includes a scanning mirror.
Figure 21B:
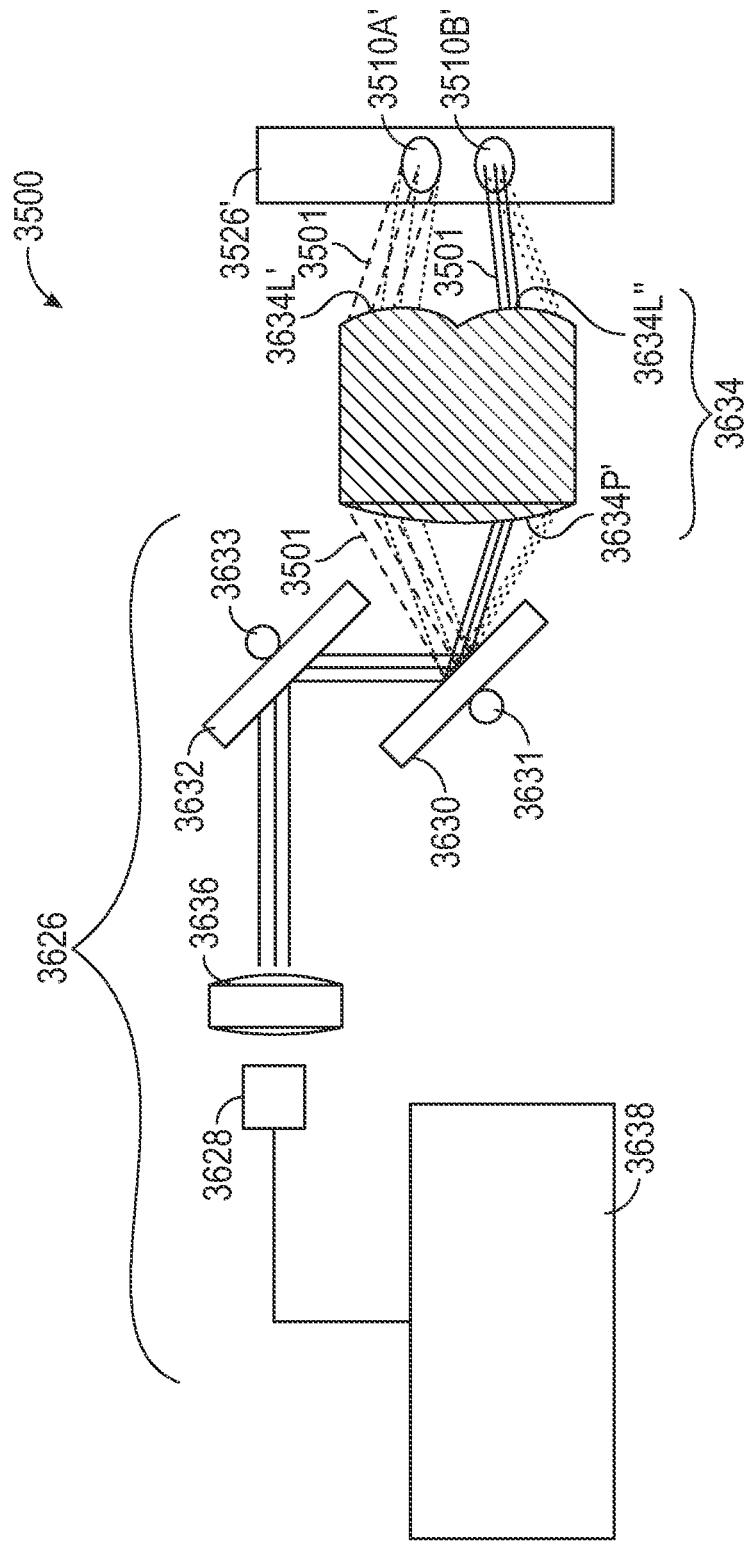

FIGS. 21A and 21B illustrates another example movable injection system 3600 that includes at least one scanning mirror system for directing the propagation of light to different locations. The light injection system 3626 may include an image source 3628 that may output image light and mirrors 3630 and 3632, which are moved by actuators 3631 and 3633, respectively. Examples of image sources 3628 include one or more light sources and spatial light modulators that encode image information into light passing through the spatial light modulator from the light source to the mirror 3632.

As illustrated, light 3501 may be propagated from the image source 3628 to the mirror 3632, which reflects the light to the mirror 3630 which then reflects the light to propagate through projection optics 3634 towards an in-coupling optical region 3510A' or 3510B' of a waveguide 3526'. The mirrors 3630 and 3632 may be part of a dual-axis galvanometer, with the actuators 3631 and 3633 rotating the mirrors along different axes, e.g., orthogonal axes, thereby allowing light to be directed to an area defined along the two axes of the waveguide 3526'. In some implementations, the actuators 3631, 3633 may be motors. The projection optics 3634 may be a linear transfer lens such as a F-theta (F-θ or F-tan θ) lens and may be configured to project light onto the waveguide 3526' at an in-coupling optical region, such as 3510A' or 3510B'. In some implementations, the light injection system 3626 may also include a collimating lens 3636 to collimate light emitted by the light emitter 3628 before the light reaches the mirror 3632. In some examples, as illustrated in FIG. 21A, the projection optics 3634 may include various lens structures. In some examples, as illustrated in FIG. 21B, the projection optics 3634 may include convex lens structure 3634P' and a lenticular lens, comprising a plurality of lens 3634L', 3634L", each configured to direct collimated light to an associated in-coupling optical region, such as 3510A' or 3510B'.

With continued reference to FIGS. 21A and 21B, the light injection system 3626 preferably also includes or is in communication with a processing module 3638 that controls and synchronizes the output of light from the light emitter 3628 with the movements of the actuators 3631, 3633 and the image to be formed. For example, the processing module 3638 may coordinate the movements of the mirrors 3632, 3630 with the emission of light from the image source 3628. In some implementations, the mirrors 3632, 3630 are continuously rotated or swiveled back and forth by the actuators 3631, 3633 on the axis on which the mirror is designed to move. The emission of light (e.g., a pulse of light) by the image source 3628 is timed with this movement such that the light is directed to a desired location on the waveguide 3526' at a given moment in time, and this location and time are also determined based on the image to be displayed (e.g., in-coupling region coincides in time with the display of an image for that particular in-coupling region). In some implementations, the emission of light from the image source 3628 is controlled by switching the image source 3628 between on and off states (e.g., by supplying or not supplying power, respectively, to the light emitter). In some other implementations, the emission of light from the image source 3628 may be controlled mechanically, using a physical switch that selectively allows or blocks light from reaching the waveguide 3526'.

In some other implementation, rather than two mirrors 3632 and 3630, the movable light injection system 3600 may include only a single mirror configured to direct light along a single axis. Such a configuration may be utilized, e.g., in arrangements where the in-coupling regions such as 3510A' or 3510B' are arranged in a row, along the single axis.

Some movable injector techniques are discussed in U.S. Patent App. Pub. No. 2018/0113311, published Apr. 26, 2018, entitled "SYSTEM AND METHOD FOR PRESENTING IMAGE CONTENT ON MULTIPLE DEPTH PLANES BY PROVIDING MULTIPLE INTRA-PUPIL PARALLAX VIEWS", the entire disclosure of which is incorporated by reference herein.

Example Electronically Switchable Light Output without Mechanical Actuation

The light injection system 3404 may include an injector system in which the location of output light is switched electronically without mechanical actuation. A stationary injector system may include one or more components configured to selectively emit light in order to direct light towards a desired location, such as an in-coupling region 3414A, 3414B, 3414C on a waveguide 3412.

Figure 22:
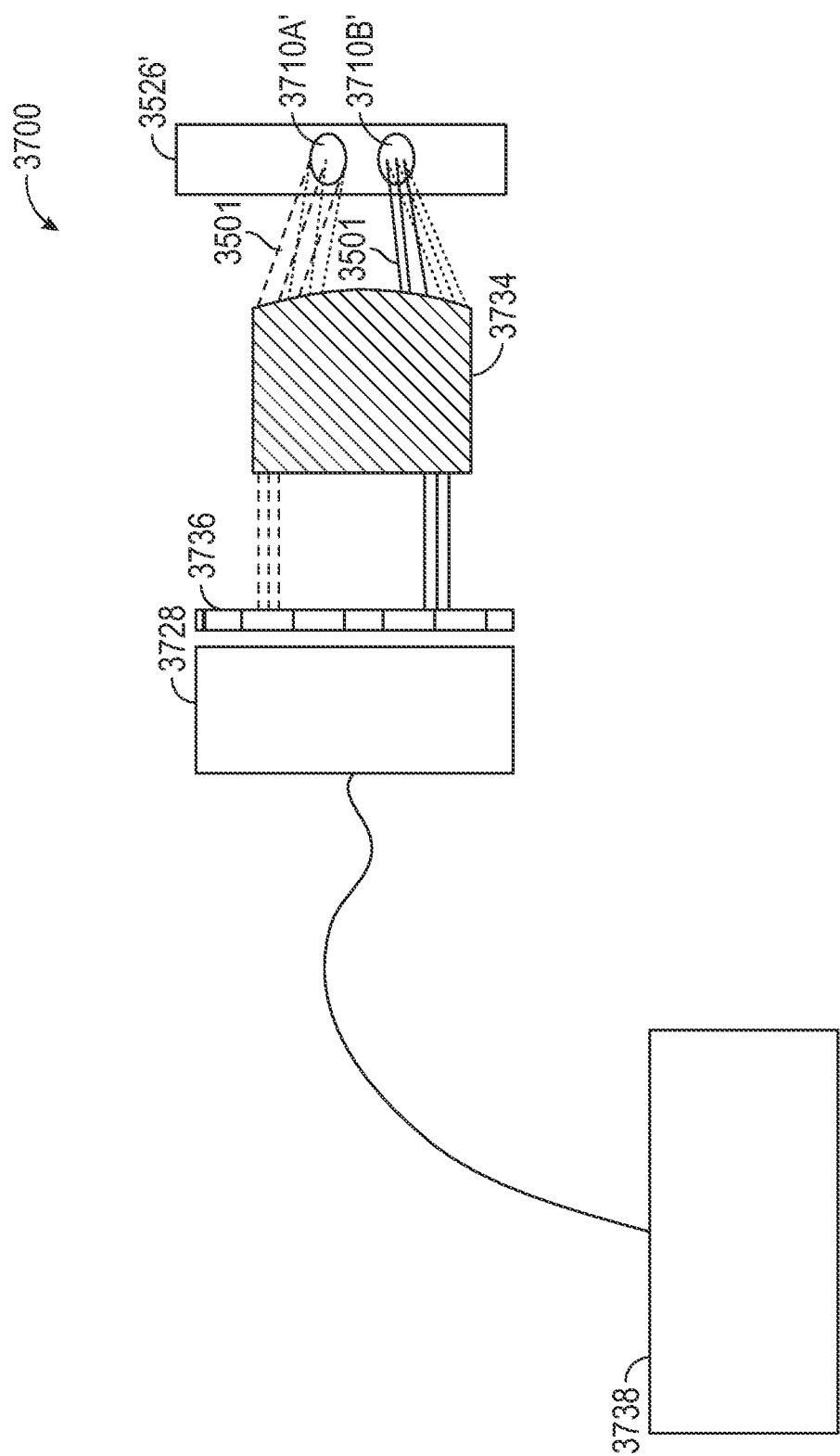
FIG. 22 illustrates an example stationary light injection system that includes a spatial light modulator.

FIG. 22 illustrates an example stationary injection system 3700 that includes a spatial light modulator (SLM) 3736 configured to project light 3501 towards one or more in-coupling optical regions 3710A', 3710B' on a waveguide 3526'. The stationary injection system 3700 may include a light emitter 3728 and a spatial light modulator (SLM) 3736. Examples of light emitters 3528 include LED's and lasers. In some implementations, a fiber optic cable may transmit light from a remotely situated light emitter. As illustrated, light 3501 may be propagated from the light emitter 3728 to the SLM 3736, which modulates the light to propagate through optics 3734 towards an in-coupling optical region 3710A' or 3710B' in a waveguide 3526'. In some implementations, the SLM 3736 may be configured to modulate light transmitted through the SLM. In some other implementations, the SLM 3736 may be configured to reflect and modulate light. Examples of SLM's include liquid crystal display panels, DLP mirror arrays, LCoS, etc. The optics 3734 may be a linear transfer lens such as a F-theta (F-θ or F-tan θ) lens and may be configured to focus light onto the waveguide 3526' at an in-coupling optical region, such as 3710A' or 3710B'. However, other configurations of optics 3734 are also contemplated, such as a lens system including some combination of a collimating lens, a lenticular lens, or other lens structures.

The SLM 3736 which may comprise a panel display which may include an array of light emitters such as LEDs or lasers. In order to select which in-coupling optical region, such as 3710A' or 3710B', to propagate to, a controller 3738 may communicate with the light injection system 3700 to cause the SLM 3736 to activate certain pixels, arrays, or groups of pixels in the SLM 3736 that may be associated with the desired in-coupling optical region or in-coupling region. In some implementations, different sections of the SLM may be utilized to form different images for different associated ones of the in-coupling regions 3710A', 3710B'. In some implementations, the size of the group of activated light-emitting pixels on the light source SLM 1020 may provide an image that is smaller or larger. In some other implementations, the size of the light emitting area on the light source SLM 3736 may be modified to control the depth of focus of the display system.

Some movable injector techniques are discussed in International Patent Pub. No. WO 2019/173158, published Sep. 12, 2019, entitled "DISPLAY SYSTEM WITH LOW-LATENCY PUPIL TRACKER", the entire disclosure of which is incorporated by reference herein.

Example Depth Plane Projection

Some implementations of display devices, such as those described above, may be configured to adjust the wavefront divergence of light (including light for image information projected from the display system as well as incoming light from objects in the surrounding real world) by tuning focal lengths of variable focus lens elements included in the augmented reality system. As discussed above, the augmented reality system may comprise a display device that may include a plurality of stacked waveguides (e.g., corresponding to the plurality or set 660 of stacked waveguides of FIGS. 9A and 9B, or corresponding to the stacked waveguide assembly 260 of FIG. 6) that project light towards the eyes of a user or a viewer (e.g., the viewer or user 90 of FIG. 2). In some other implementations, the display device may include only a single waveguide. Consequently, while plural waveguides are referenced in various parts of the disclosure herein, it will be appreciated that the plural waveguides may be replaced by a single waveguide.

As discussed herein, the projected light from the waveguides may be used to provide virtual, augmented reality image information to the viewer. The light may be projected such that the user perceives the light to originate from one or more different depths, or distances from the viewer. The display device may be optically transmissive, such that the user may see real-world objects in the surrounding environment through the display device. In some implementations, the waveguides may be configured to have fixed optical power. To provide the appearance that the projected light is originating from different depths, the waveguides may be configured to output divergent beams of light, with different amounts of divergence corresponding to different depth planes.

In order to provide a sensation of multi-dimensionality to a displayed virtual object, a display system may display an image on multiple depth planes. In the case of an array of in-coupling elements, there are a number of ways to project an image on multiple depth planes. These include a separated pupil system, such as illustrated in FIG. 23, a variable focus lens system, such as illustrated in FIG. 24, and a system configured to approximate a continuous wavefront using multiple intra-pupil images, such as illustrated in FIGS. 25C and 25D.

Example Separated Pupil Depth Plane Projection

In some examples, depth plane projection may be accomplished by projecting an image towards in-coupling optical elements in a waveguide stack, such as described with reference to FIGS. 9A-9C above. In the case of an array of in-coupling regions in a waveguide, depth plane projection may be accomplished by, for example, having a plurality of in-coupling optical regions for each in-coupling element corresponding to a particular depth plane.

Figure 23:
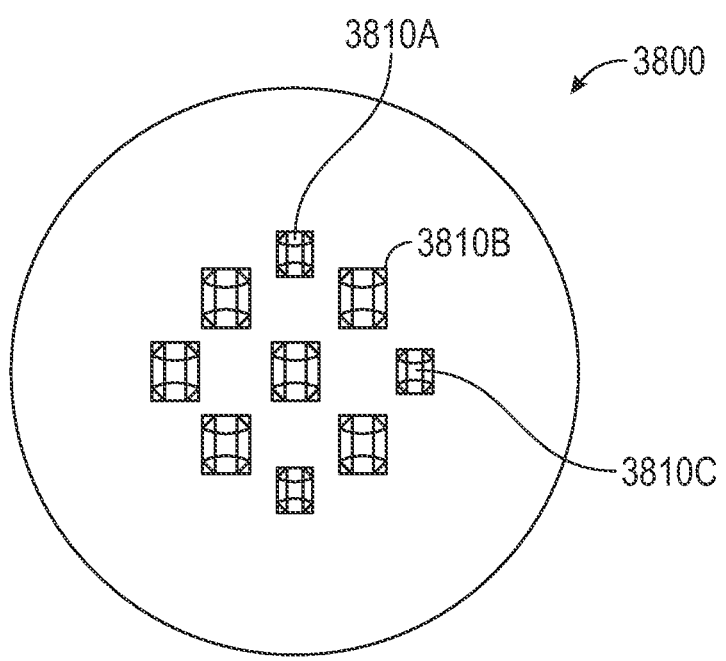
FIG. 23 illustrates a top down plan view of a light module having a plurality of light emitters.
Figure 24:
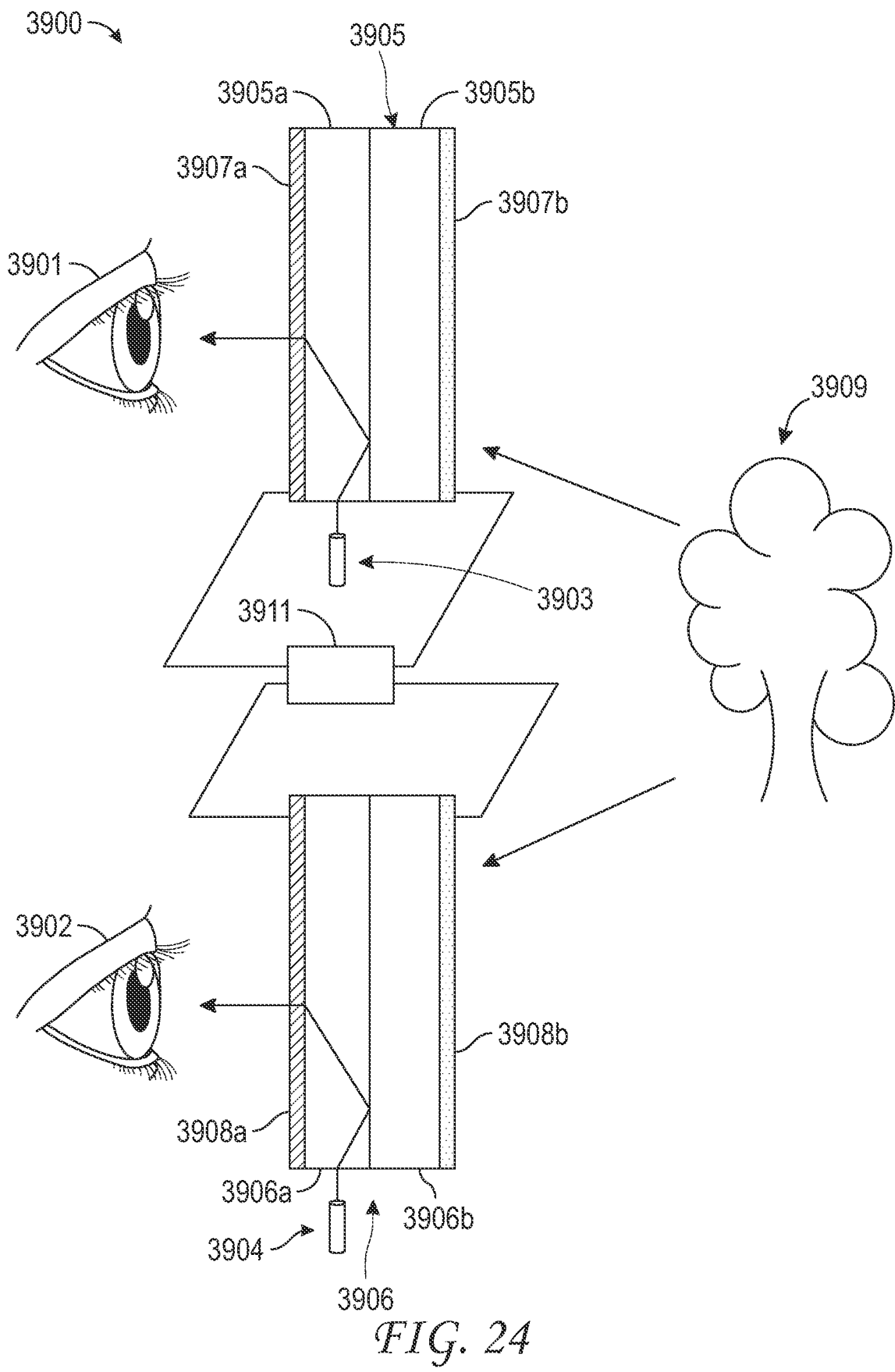
FIG. 24 illustrates a variable focus lens system.

FIG. 23 illustrates a top down view of an in-coupling region 3800 that may include a plurality of in-coupling optical elements 3810A, 3810B, 3810C. Light emitters (not shown) may emit light of a wavelength corresponding to one of a plurality of colors towards an in-coupling element 3810A, 3810B, 3810C. The in-coupling optical elements 3810A, 3810B, 3810C may be arranged as spaced-apart in a similar manner as the light emitters. For example, individual ones of the in-coupling optical elements 3810A, 3810R, 3810C may be in a direct light path of an associated one of the light emitters. The plurality of in-coupling optical elements, such as elements 3810A, 3810B, 3810C, may be disposed in a waveguide stack so as to provide multi-depth plane projection for an image projected towards the region 3800 containing the in-coupling optical elements.

In the illustrated example, there are nine in-coupling optical elements 3810. The nine in-coupling optical elements 3810 may be configured to project a single image having multiple colors on multiple depth planes. The illustrated nine in-coupling optical elements 3810 may include, for example, three elements configured to emit light of a first color (for example, red), three elements configured to emit light of a second color (for example, green), and three elements configured to emit light of a third color (for example, blue). However, other numbers of in-coupling optical elements having other groupings are possible. The groupings may each include in-coupling optical elements of differing colors (for example, each grouping may have one in-coupling optical element for the first color, one in-coupling optical element for the second color, and one in-coupling optical element for the third color), and each grouping may be configured to form images on a particular depth plane. For example, the in-coupling optical elements 3810 form groups of three, with each group project images on an associated one of three depth planes. However, other numbers, arrangements and configurations of in-coupling optical elements are also possible, such as six in-coupling optical elements configured to project light of three component colors on two depth planes, twelve in-coupling optical elements configured to project light of four colors on three depth planes, etc.

In some examples, an in-coupling region may be configured to project light on multiple depth planes in multiple colors using temporal multiplexing. For example, an in-coupling element may include a plurality of in-coupling regions configured to project light on multiple depth planes. One or more light emitters may be coupled to the in-coupling elements to project light of a particular color at a particular time towards an in-coupling optical element. If the time between color projections is fast enough, a resulting perceived image may be an image having all the colors projected towards the in-coupling optical elements.

Example Variable Focus Lens Configurations

In some examples, depth plane projection may be accomplished using a variable focus lens system. FIG. 24 illustrates an example variable focus lens system 3900 that may be used to accomplish depth plane projection.

With reference to FIG. 24, in some implementations, a first variable focus lens element may be provided between the waveguide and the viewer's eye to provide an appropriate adjustment to the wavefront of the light outputted by the waveguide, to allow this light to be correctly focused by the viewer's eye. This first lens element, however, is also in the path of light propagating from the surrounding environment to the viewer's eye. As a result, the first lens element may modify the wavefront of the light from the surrounding environment and, thereby cause aberrations in the viewer's view of the world. To correct such aberrations, a second variable focus lens element may be disposed on the opposite side of the plurality of stacked waveguides from the rust variable focus lens element; that is, the second variable focus lens element may be between the plurality of stacked waveguides and the surrounding real world to adjust the wavefront of light from real-world objects in the surrounding environment. The second variable focus lens element may be configured to compensate for aberrations caused by the first variable focus lens element. In some implementations, the second variable focus lens may also be configured to compensate for aberrations caused by the waveguides.

In some implementations, the focus of the second variable focus lens element may be inverse or opposite the focus of the first variable focus lens element. For example, if the first variable focus lens element has a positive optical power, then the second variable focus lens element may have a negative optical power, which may be of similar magnitude. In some other implementations, to compensate for both the optical power of the first variable focus lens element and the optical power of the intervening waveguides, the optical power of the second lens elements may be opposite to and of similar magnitude as the aggregate optical power of the first lens element and the waveguides.

In some other implementations, the waveguides may not have optical power (e.g., the waveguides may be configured to output collimated light), and the first variable focus lens elements may be configured to modify the wavefront of light emitted from the waveguides to provide the appropriate amount of divergence for image information to be interpreted by the viewer as being on a particular depth plane. It will be appreciated that the appropriate amount of divergence may vary for different viewers since optical power for placing image information on a particular depth plane will be adjusted by a particular differential to account for a viewer's optical prescription for that depth plane. In such implementations, the waveguide stack between the first and second variable focus lens elements may simply be formed by a single waveguide.

It will be appreciated that the first and second variable focus lens elements may be provided for one of the viewer's eyes, and that third and fourth variable focus lens elements that are similar to the first and second variable focus lens elements, respectively, may be provided for the other of the viewer's eyes.

FIG. 24 shows a schematic illustration of an example display system (e.g., augmented reality display systems) having variable focus lens elements and a waveguide stack. It will be appreciated that the display system 3910 may correspond to the display system 250 (FIG. 6). A first variable focus lens element 3907*a* and a second variable focus lens element 3907*b* are disposed on either side of a waveguide stack 3905 and a third variable focus lens element 3908*a* and a fourth variable focus lens element 3908*b* are disposed on either side of a waveguide stack 3906.

The various illustrated waveguides 3905*a*, 3905*b*, 3906*a*, 3906*b* may have characteristics and/or features similar to individual ones of waveguides 270, 280, 290, 300, 310 of FIG. 6 and/or waveguides 670, 680, and 690 of FIGS. 9A and 9B. The waveguide stacks 3905, 3906 may have characteristics and/or features similar to the plurality or set 660 of stacked waveguides of FIGS. 9A and 9B or to the stacked waveguide assembly 260 of FIG. 6. In some implementations, the waveguides 3905*a*, 3905*b*, 3906*a*, 3906*b* may include optical elements, such as diffractive optical elements, that provide the waveguides with optical power, e.g., a fixed optical power. For example, one or more of these waveguides may have an optical power in the range between 0 Diopter and about 5.0 Diopters, between about 0.5 Diopters and about 4.5 Diopters, between about 1.0 Diopters and about 4.0 Diopters, between about 1.5 Diopters and about 3.5 Diopters, between about 2.0 Diopters and about 3.0 Diopters, or any value in these ranges or sub-ranges. As another example, in a particular implementation, each of the waveguides may have an optical power of 1.5 Diopters.

As discussed above, light providing image information (e.g., virtual content) from an optical source 3903 or 3904 may be injected into the waveguide 3905a or 3906a, respectively, such that the light propagates through each of those waveguides by total internal reflection. The propagating light may be projected out of the waveguide 3905a (or waveguide 3905b) by out-coupling elements (e.g., corresponding to out-coupling elements 800, 810, 839 of FIGS. 9A and 9B) towards the user's eye 3901. In some implementations, the optical sources 3903, 3904 may be fiber scanning devices (FSD) that utilize a moving fiber to create a 2D image pattern, as disclosed herein. The FSD may create the 2D image pattern by projecting light in a variety of patterns, such as, for example, raster scan, spiral scan, Lissajous, etc. In some other implementations, the optical source 3903a (and/or 3903b) may be an image projection system, e.g. in which a full image is projected onto a waveguide, as also disclosed herein. It will be appreciated that light from the optical source 3903a (and/or 3903b) may be injected into the waveguide stack 3905 through edges of the waveguides or through a major surface of the waveguide. Where the waveguide stack includes a plurality of waveguides, the optical source 3903 and/or 3904 may be configured to inject light into multiple ones of these waveguides, or additional optical sources, e.g., one optical source for each waveguide, may be provided.

The first variable focus lens element 3907a may be disposed between the waveguide stack 3905 and the user's eye 3901, and the second variable focus lens element 3907b may be disposed between the waveguide stack 3905 and the real world surrounding the user. It will be appreciated that the eye 3901 may correspond to the viewer's eye 210 of FIG. 6. Similarly, the third variable focus lens element 3908a may be disposed between the waveguide stack 3906 and the user's eye 3902 and the second variable focus lens element 3908b may be disposed between the waveguide stack 3906 and the real world surrounding the user.

In some implementations, the first and the second variable focus lens elements 3907a and 3907b, and third and fourth variable focus lens elements 3908a and 3908b, may be adaptable optical elements. The adaptable optical elements may be dynamically altered, for example, by applying an electrical signal thereto, to change the shape of a wavefront that is incident thereon. In some implementations, the adaptable optical elements may comprise a transmissive optical element such as a dynamic lens (e.g., a liquid crystal lens, an electro-active lens, a conventional refractive lens with moving elements, a mechanical-deformation-based lens, an electrowetting lens, an elastomeric lens, or a plurality of fluids with different refractive indices). By altering the adaptable optics' shape, refractive index, or other characteristics, the wavefront incident thereon may be changed, for example, to alter the focus of the light by the viewer's eyes, as described herein.

In some implementations, the variable focus lens elements 3907a. 3907b, 3908a, 3908b may comprise a layer of liquid crystal sandwiched between two substrates. The substrates may comprise an optically transmissive material such as, for example, glass, plastic, acrylic, etc. In some implementations, the substrates may be flat. In some implementations, the substrates may have curved regions such that portions of the substrates may have fixed optical power.

In some implementations, the optical power of the variable focus lens elements 3907a, 3907b, 3908a, 3908b may be varied by adjusting an electrical signal (e.g., current and/or voltage) applied to the liquid crystal layer via, e.g., one or more thin film transistors (TFTs) and/or electrodes integrated with the liquid crystal layer and/or the substrates. It will be appreciated that the orientations of liquid crystal species in the liquid crystal layer determines the refractive index of the layer. The applied electrical signal sets the orientation of the liquid crystal species, thereby allowing the refractive index of the liquid crystal layer to be varied as desired by altering the applied electrical signal. In some implementations, the optical power of the variable focus lens elements 3907a, 3907b, 3908a. 3908b may be varied between about ±5.0 Diopters (e.g., between about −4.0 Diopters and +4.0 Diopters; between about −3.5 Diopters and about +3.5 Diopters, between about −3.0 Diopters and about +3.0 Diopters, between about −2.0 Diopters and about +2.0 Diopters, between about −1.5 Diopters and about +1.5 Diopters, including values in any of these ranges or sub-ranges).

Advantageously, the variable focus lens elements 3907a, 3907b, 3908a, 3908b may have a wide aperture that is substantially matched to the aperture of the waveguides of their respective associated waveguide stacks 3905, 3906. In some implementations, the apertures of the variable focus lens elements 3907a. 3907b, 3908a, 3908b may be substantially equal (e.g., within about ±39%, about ±15%, or about ±10%) to the surface areas of the waveguides of the waveguide stacks 3905, 3906. Consequently, the areas over which the variable focus lens elements 3907a, 3907b, 3908a, 3908b and the waveguide stacks 3905, 2396 transmit light to an associated eye 3901, 3902 may be substantially equal.

With continued reference to FIG. 24, the first and third variable focus lens elements 3907a, 3908a may each have its optical power varied to adjust the wavefront of light projected from a waveguide of the waveguide stacks 3905, 3906, respectively, to properly focus that light onto the retina of the eyes 3901, 3902, respectively. As noted herein, the first and third variable focus lens elements 3907a, 3908a may cause aberrations in the wavefront of incoming light from an object 3909 in the surrounding environment, thereby diminishing the optical image quality of real-world objects 3909 viewed through the first variable focus lens element 3907a. The second and fourth variable focus lens elements 3907b, 3908b may advantageously compensate for the aberrations introduced by the first and third variable focus lens elements 3907a, 3908a, respectively, and any waveguides when viewing the object 3909. In some implementations, the second and fourth variable focus lens elements 3907b, 3908b may be configured to provide an optical power opposite to the optical power provided by the first and third variable focus lens elements 3907a, 3908a, respectively, and the associated waveguide stack 3905, 3906. In some implementations, the magnitude of the opposite optical power is such that the net optical power of the display system 3910, for each eye 3901, 3902, is equal to an optical prescription for the eye at the depth plane that the eye is verging towards. The optical power provided by the first and the second variable focus lens elements 3907a and 3907b may be varied and controlled by an electronic hardware control system 3911. In some implementations, the electronic hardware control system 3911 may correspond to the local processing and data module 140 and/or the remote processing module 150 of FIG. 2.

In some implementations, the augmented reality display system 3910 may be configured to determine vergence of the user's eyes. The optical power of the first and the second variable focus lens elements 3907a, 3907b may be set based upon the vergence point of the eyes 3901, 3902. The optical power of the third and the fourth variable focus lens elements 3908a, 3908b may also be set based upon this vergence point. It will be appreciated that the vergence point is the point in space at which the lines of sight of the eyes 3901, 3902 converge and may correspond to the physiologic accommodation target of those eyes. In some implementations, the distance that the point is away from the eyes 3901, 3902 may be calculated based, e.g., on the known quantities of the separation between the eyes 3901, 3902 and the angles made out by the each eye. Once that distance is calculated, an appropriate correction for the viewer for that distance may be determined. For example, the display system 3910 may be programmed with one or more optical prescriptions. In some implementations, the optical prescriptions may be stored in the local processing and data module 140 and/or the remote data repository 160. The distance between the eyes 3901, 3902 and the vergence point may be matched with the appropriate correction for that distance, and the variable focus lens elements 3907a, 3907b, 3908a, 3908b may be adjusted to provide the correction. In some implementations, the eyes 3901, 3902 may have different prescribed corrections and, as a result, the pairs of variable focus lens elements 3907a, 3907b, and 3908a, 3908b, may provide different optical power.

Advantageously, the variable focus lens elements 3907a, 3907b, 3908a, 3908b provide for a large number of possible corrections since their optical power may be adjusted as desired by, e.g., the application of different voltages. In some implementations, the total number of corrections per eye maybe 1, 2, 3, or 4 more. In some implementations, the total number of corrections per eye may be equal to the number of depth planes that the display system 3910 is configured to display image information on. It will be appreciated that these corrections may correspond to optical prescriptions, which may be determined for objects at various distances from the eyes 3901, 3902. For example, four prescriptions may be obtained by determining corrections for refractive errors at four progressively farther distances (e.g., close, close intermediate, far intermediate, and far distances) from the eyes 3901, 3902. In some implementations, the number of possible corrections for viewing image content outputted by the waveguide stack 3905 may be different from the number of possible corrections when viewing objects 3909 in the surrounding environment.

In some implementations, the focus, or optical power, of the variable focus lens elements 3907a, 3907b, 3908a, 3908b may each be set based upon the determined vergence of the user's eyes 3901, 3904. For example, the optical power of the first and the second variable focus lens elements 3907a and 3907b may be varied based on the vergence of the user's eyes 3901 without specific reference to the optical power of the other lens element.

In some implementations, one of the first and the second variable focus lens elements 3907a, 3907b, or one of the third and the fourth variable focus elements 3908a, 3908b, may be designated as a master and the other of the first and the second variable focus lens elements 3907a, 3907b, or the third and the fourth variable focus lens elements 3908a, 3908b, may be designated as a slave. The variable focus lens element designated as the slave may be configured to follow the master variable focus lens element. In some other implementations, the second and the fourth variable focus lens elements 3907b, 3908b may be slaved to the first and third variable focus lens elements 3907a, 3908a, and the focus of the first and third variable focus lens elements 3907a, 3908a may be set based upon the determined vergence point of the user's eyes 3901, 3902. For example, if the waveguide 3905a (and/or waveguide 3905b) has an optical power of about 1.5 Diopters and the user is verging at 2.0 Diopters, the first variable focus lens element 3907a may have an optical power of +0.5 Diopters and the second variable focus lens element 3907b may have an optical power −0.5 Diopters.

The optical powers of the variable focus lens elements 3907a, 3907b, 3908a, 3908b may be varied in real time, and may preferably be changed at a rate equal to or greater than the rate at which the human eye changes accommodation states. Preferably, the first and second variable focus lens elements may change their optical power before the human eye changes accommodation states, such that the user does not experience a delay in receiving the appropriate correction for a given vergence point. In some implementations, the first and second variable focus lens elements may change in optical power in less than about 300 ms, less than about 275 ms, or less than about 250 ms. The electronic hardware control system 3911 may drive the variable focus lens elements 3907a, 3907b, 3908a, 3908b such that the optical powers of the variable focus lens elements 3907a, 3907b, 3908a, 3908b may be varied simultaneously.

Variable focus lens techniques are discussed in U.S. Patent App. Pub. No. 2017/0293145, published Oct. 12, 2017, entitled "AUGMENTED REALITY SYSTEMS AND METHODS WITH VARIABLE FOCUS LENS ELEMENTS", the entire disclosure of which is incorporated by reference herein.

Example Wavefront Approximation Using Multiple Intra-Pupil Images

Figure 25A:
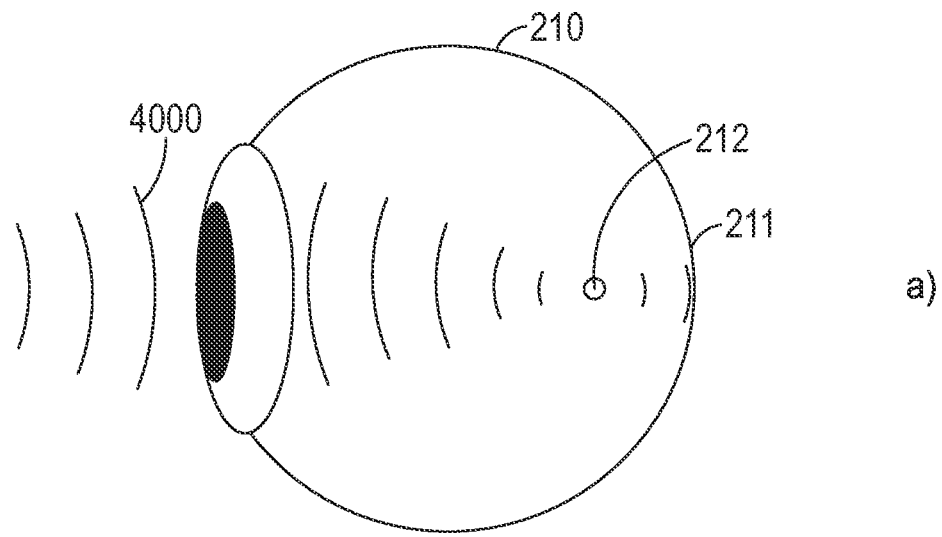
FIG. 25A illustrates pre-accommodation and post-accommodation conditions of an eye for a continuous incoming wavefront.
Figure 25A:
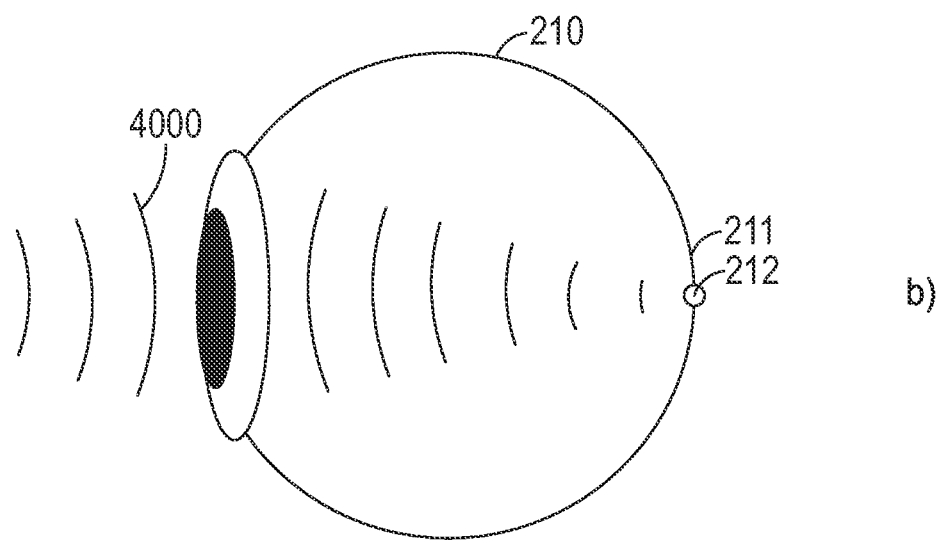

It has been found that a continuous wavefront such as the wavefront 4000 of FIG. 25A may be approximated using a plurality of wavefronts. In some examples, depth plane selection may be accomplished by approximating continuous wavefronts at one or more desired depth planes using a plurality of discrete intra-pupil images directed into the eye within the flicker fusion threshold.

With reference now to FIG. 25A, the pre-accommodation and post-accommodation conditions of an eye 210 upon receiving a continuous input wavefront 4000 are illustrated. Illustration a) shows the pre-accommodation condition, before the visual system brings the wavefront 4000 into focus on the retina 211. Notably, the focal point 212 is not on the retina 211. For example, the focal point 212 may be forward of the retina 211 as illustrated. Illustration b) shows the post-accommodation condition, after the human visual system flexes pupillary musculature of the eye 210 of the viewer to bring the wavefront 4000 into focus on the retina 211. As illustrate, the focal point 212 may be on the retina 211.

Figure 25B:
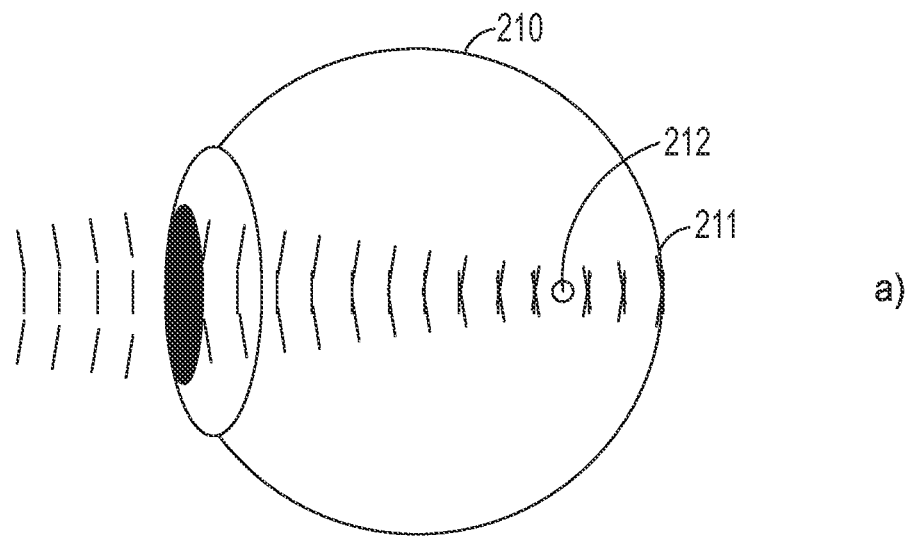
FIG. 25B illustrates pre-accommodation and post-accommodation conditions of an eye for a piecewise approximation of a continuous incoming wavefront.
Figure 25B:
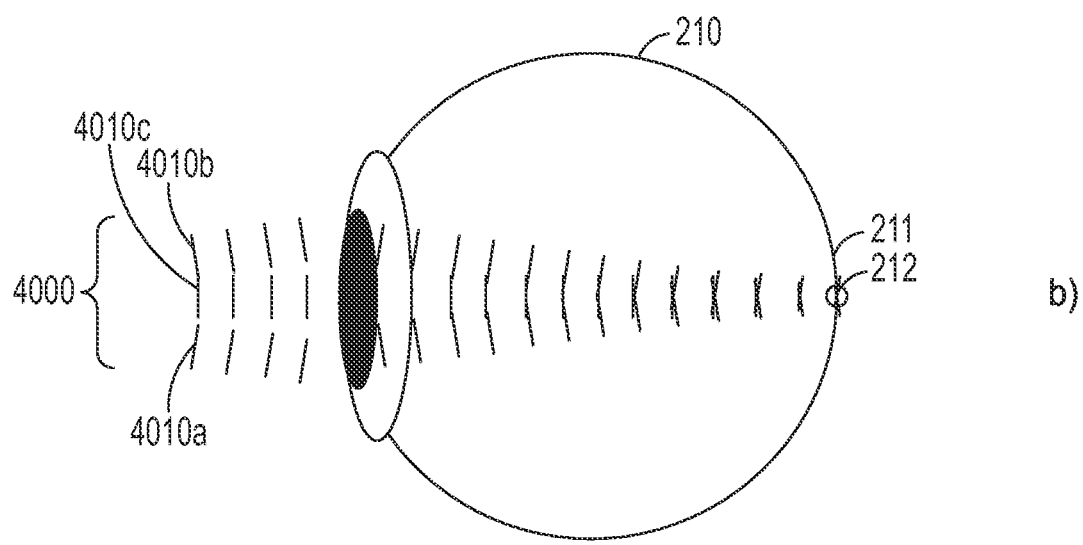
Figure 25C:
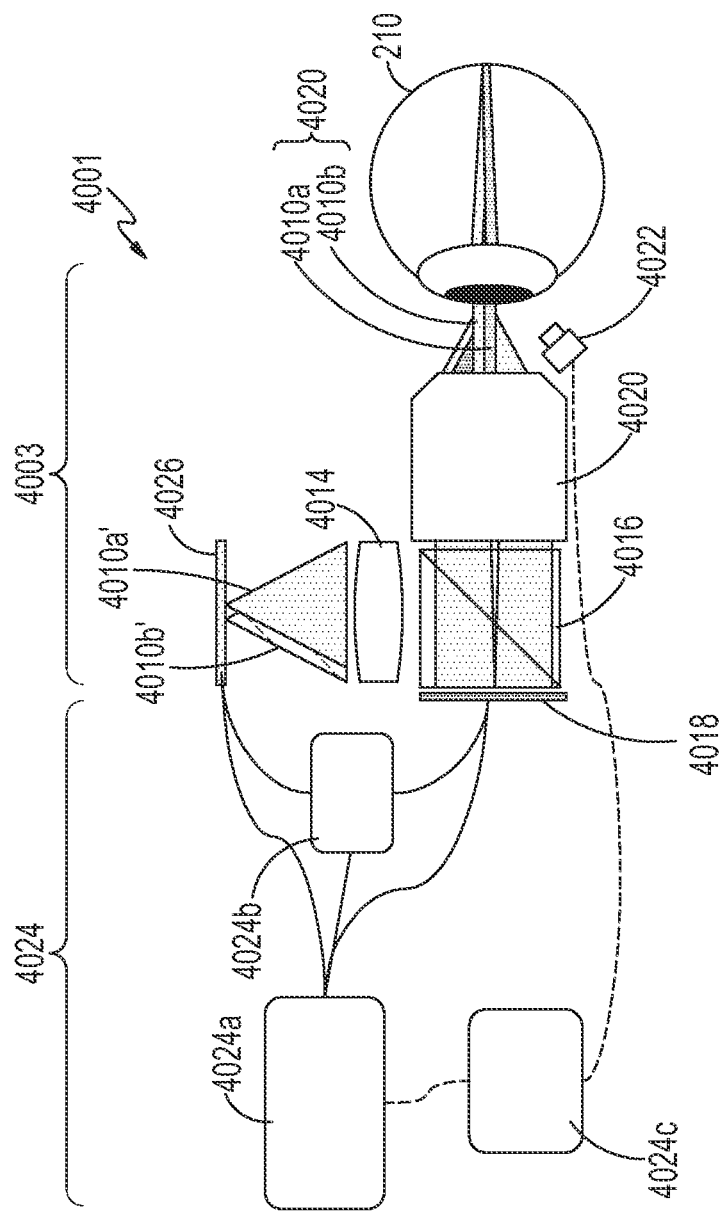
FIG. 25C illustrates an example of a display system comprising a projection system for forming the divergent wavefront approximation of FIG. 25B.
Figure 25D:
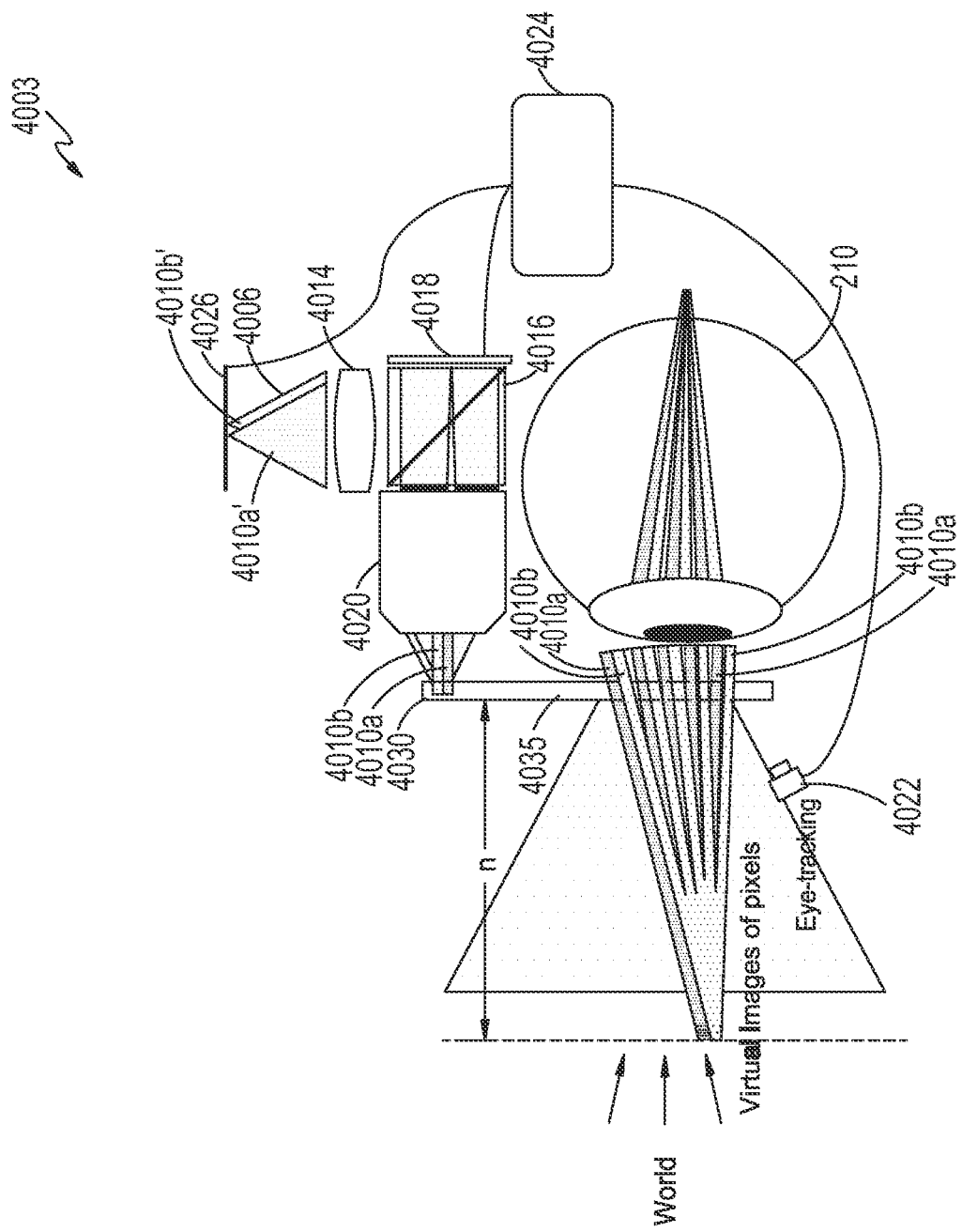
FIG. 25D illustrates an example of a display system comprising an eye tracking system and a pupil rely combiner eyepiece with a pupil expander configured to produce a non-infinity depth plane.

FIG. 25B illustrates the pre-accommodation and post-accommodation conditions of the eye 210 upon receiving a piecewise approximation of the continuous wavefront 4000 of FIG. 25A. Illustration a) of FIG. 25B shows the pre-accommodation condition and illustration b) shows the post-accommodation condition of the eye 210. The approximation may be formed using a plurality of constituent wavefronts 1010a, 1010b, and 1010c, each of which is associated with separate beams of light. As used herein, references numerals 1010a, 1010b, and 1010c may indicate both a light beam and that light beam's associated wavefront. In some implementations, the constituent wavefronts 1010*a* and 1010*b* may be planar wavefronts, such as formed by a collimated beam of light. As shown in illustration b), the wavefront approximation 1010 formed by the constituent wavefronts 1010*a* and 1010*b* are focused by the eye 210 onto the retina 211, with the focal point 212 on the retina 211. Advantageously, the pre- and post-accommodation conditions are similar to that caused by the continuous wavefront 4000 shown in FIG. 25A.

It will be appreciated that continuous divergent wavefronts may be approximated using optical projection systems that output a plurality of parallactically-disparate intra-pupil images into the eye. FIG. 25C illustrates an eye accommodating to a divergent wavefront emanating from a finite focal-distance virtual image provided by a projection system. The system includes a spatial light modulator 4018 and projection optics 1020 with focal length "F" and an external stop. An image may be formed by the spatial light modulator 1018 and light from the spatial light modulator 4018 containing the image information may be directed through projection optics 4020 to the eye 210. The spacing (less than F) between the spatial light modulator 4018 and the projection optics 4020 may be chosen such that a divergent wavefront 4000 is outputted towards the eye 210. As noted above regarding FIG. 25A, the eye 210 may then focus the wavefront 4000 on the retina 211.

With continued reference to FIG. 25C, an example of a display system 4001 comprising a projection system 4003 for forming the divergent wavefront approximation 4010 of FIG. 25B is illustrated. The projection system 4003 comprises a light source 4026 configured to output light 4010*a*' and 4010*b*' to a spatial light modulator 4018, which modulates the light to form images showing slightly different parallax views of the same object or scene. The modulated light with the image information then propagates through the relay/projection optics 4020, and is outputted by the relay/projection optics 4020 as light beams 4010*a* and 4010*b* into the eye 210. The projection system 4003 may also include a lens structure 4014, which may be configured to convert the spatial differences in the emission of the light 4010*a*' and 4010*b*' into angular differences in the propagation of that light to the spatial light modulator 4018. The projection system 4003 may further include a polarizing beam splitter 4016 configured to 1) direct light from the light source 4026 to the spatial light modulator 4018; and 2) permit modulated light from the spatial light modulator 4018 to propagate back through the beam splitter 4016 to the relay/projection optics 4020. In some implementations, the display system 4001 may include an eye tracking device 4022, e.g., a camera, configured to monitor the gaze of the eye. Such monitoring may be used to determine the direction in which the viewer is looking, which may be used to select image content appropriate for that direction, and for eye pose determination, as discussed herein. Preferably, the eye tracking device 4022 tracks both eyes of the viewer, or each eye includes its own associated eye tracking device. As a result, vergence of both eyes of the viewer may be tracked and the convergence point of the eyes may be determined to determine in what direction and at what distance the eyes are directed.

It will be appreciated that the light 4010*a*' and 4010*b*' may be outputted by the light source 4026 at different times, the spatial light modulator 4018 may form the different parallax views with the light 4010*a*' and 4010*b*' at different times, and the resultant light beams 4010*a* and 4010*b* may be injected into the eye 210 at different times, as discussed herein.

With continued reference to FIG. 25C, the light source 4026 may be a 2D light source having a plurality of selectively-activated light output locations disposed substantially on a plane. In some implementations, the selectively-activated light output locations may be selectively activated light-emitting regions. For example, the light source 4026 may be a light-emitting diode (LED) array, or a spatial light modulator (e.g., a digital micromirror device such as a digital light processing (DLP) device, a LCOS device, etc.) containing an array of discrete units or light emitters that output light. Examples of LED arrays include organic light-emitting diode (OLED) arrays and inorganic light-emitting diode (ILED) arrays, each of which may be part of a micro-display. In some implementations, individual light-emitting diodes and/or light modulators in the light source 4026 may constitute a light-emitting region. In some other implementations, groups of light-emitting diodes and/or light modulators may form light-emitting regions. In such implementations, there may be some overlap between the light-emitting diodes and/or light modulators of different light-emitting regions although the regions may be considered distinct because the overlap is not complete.

In some other implementations, the light source 4026 may be configured to focus light onto an image plane to, in effect, provide a virtual 2D light source on that image plane. Different locations on the image plane may be considered to be different light output locations and those locations may be activated by directing light through those locations on the image plane using actuated mirrors or a fiber scanner to steer light from a light emitter. Further details regarding such virtual 2D light sources are provided below in the discussion of FIGS. 19 and 20.

In some implementations, examples of spatial light modulators 4018 include liquid crystal on silicon (LCOS) panels. As another example, in some other implementations, spatial light modulator 4018 may comprise a transmissive liquid crystal panel or a MEMs device, such as a DLP.

With continued reference to FIG. 25C, the display system 4001 may also include control systems 4024 for determining the timing and the type of image content provided by the display system. In some implementations, the control system 4024 comprises one or more hardware processors with memory storing programs for controlling the display system 4001. For example, the system 4024 may be configured to control activation of the light-emitting regions of the light source 4026, the actuation of individual pixel elements of the spatial light modulator 4018, and/or the interpretation and reaction of the display system 4001 to data received from the eye tracking device 4022. Preferably, the system 4024 includes a computation module 4024*a* configured to receive an input regarding a desired depth plane or wavefront divergence and to calculate the appropriate light-emitting regions to activate, in order to form parallax views with the proper amount of disparity for the desired depth plane or wavefront divergence. In addition, computation module 4024*a* may be configured to determine the appropriate actuation of the pixels of the spatial light modulator 4018 to form images of the desired parallax views. The system 4024 may also include a synchronization module 4024*b* that is configured to synchronize the activation of particular light-emitting regions of the light source 4026 with modulation of light by the spatial light modulator 4018 to form images to provide the parallax view corresponding to those activated light-emitting regions. In addition, the system 4024 may include an eye tracking module 4024*c* that receives inputs from the eye tracking device 4022. For example, the eye tracking device 4022 may be a camera configured to image the eye 210. Based on images captured by the eye tracking device 4022, the eye tracking module 4024*c* may be configured to determine the orientation of the pupil and to extrapolate the line of sight of the eye 210. This information may be electronically conveyed to the computation module 4024a. The computation module 4024a may be configured to select image content based upon the line of sight or the gaze of the eye 210 (preferably also based upon the line of sight or gaze of the other eye of the viewer).

Because the light source 4026 may include arrays of discrete light emitters, the size and shape of the light-emitting regions formed by the light emitters may be varied as desired by activating selected ones of the light emitters. For example, different emitting regions may be activated for different parallax views. In one example, elongated light-emitting regions may be horizontally spaced apart, which may be desirable for horizontal parallax-only driven accommodation. In another example, circular light-emitting regions may have both horizontal and vertical displacement. In another example, light-emitting regions may have a luminance fall-off. In another example, light-emitting regions may overlap. In another example, light-emitting regions may form arrays. Accordingly, the light source 4026 (FIG. 25C) may include light emitters that are binary (which simply turn on and off) and/or light emitters that incorporate grayscale (which emit light of selectively variable intensity). In some implementations, the light source 4026 may include elements that switch at very high rates, including rates beyond the parallax-switching rate for the system 4001. For example, the light source 4026 may have light outputting elements that switch the light output on and off at a rate higher than the rate at which the parallax (intra-pupil) images are switched in implementations in which different intra-pupil images are displayed at different times.

It will be appreciated that different amounts of wavefront divergence may be approximated by appropriate selection of the physical distance separating light emitters activated to form different intra-pupil images. The light emitters of the light source 4026 may direct light from different angles through projection optics to provide parallactically-disparate intra-pupil images for approximating different amounts of wavefront divergence. In some implementations, a relatively large distance between individual light sources may provide wavefront divergence corresponding to a relatively close depth plane, while a relatively small distance between individual light sources may provide wavefront divergence corresponding to a relatively far depth plane.

With reference again to FIG. 25C, in some implementations, the control system 4024 may include two parts: 1) light field generation and 2) factored light field optimization. As discussed herein, to approximate a wavefront, an appropriate image is displayed on the spatial light modulator 4018 for each activated light-emitting region of the light source 4026. It will be appreciated that these images are created during the light field generation step, where a 3D scene is rendered from multiple, slightly offset viewpoints corresponding to the slight shifts in activated light-emitting regions. For example, to display a 5×5 light field, the 3D scene would be rendered 25 times from 25 different viewpoints that are arranged in a grid pattern. The location of the viewpoint in the grid pattern would correspond to the location of the activated light source region, and the rendered image would correspond to the image formed by the spatial light modulator.

It may be desirable to increase the brightness of images formed by the spatial light modulator 4018. Advantageously, utilizing a light source 4026 comprising an array of light emitters allows the formation of light-emitting regions having a variety of shapes and sizes, which may be utilized to increase brightness. In some implementations, brightness may be increased by increasing the size of the activated light-emitting region without significantly changing the image formed by the spatial light modulator 4018. The computation module 4024a may be configured to determine the size and shape of the activated light-emitting region using factored light field optimization. The module 4024a may be configured to take an input focal stack and create a series of patterns to be displayed on the spatial light modulator 4018 as well as on the light source 4026, with the patterns configured create a desired approximation to the focal stack in the least squared sense. The optimization takes advantage of the fact that small shifts in the viewpoint do not significantly change the perceived image, and is able to generate light-emitting region patterns utilizing illumination from a larger area on the light source 4026, while displaying the same image on the spatial light modulator 4018.

The optimization problem may be formulated as a non-convex optimization problem, given below:

$$\arg\min_{\{A, B\}} \quad \frac{1}{2}\|y - \mathcal{P}\{AB^T\}\|_2^2$$

$$\text{subject to} \quad 0 \le A, B \le 1,$$

where the projection operator p performs the linear transformation from the 4D light field to the 3D focal stack (using the shift and add algorithm). This problem is a nonnegative matrix factorization embedded in a deconvolution problem. The algorithm solving this problem uses the alternating direction method of multipliers (ADMM). Additional details regarding an example method of solving this problem are discussed in Appendix I. It will be appreciated that the module 4024a is configured to actively calculate, in real time, the appropriate size and shape of the light-emitting region based upon the parallax view to be formed by a spatial light modulator 4018.

In some other implementations, the optimization problem may be formulated as a slightly different non-convex optimization problem, as given below:

$$\arg\min_{\{A, B\}} \quad \frac{1}{2}\|y - \{AB^T\}\|_2^2$$

$$\text{subject to} \quad 0 \le A, B \le 1,$$

where A and B represent the patterns displayed on the spatial light modulators (e.g., the light source 4026 and the spatial light modulator 4018 for forming images), y is the target 4D light field that is the desired output of the algorithm, and AB' is the operator combining the spatial light modulator patterns to simulate the 4D light field emitted by the physical display when A and B are shown on the modulators. This problem is a nonnegative matrix factorization. The algorithm solving this problem uses an iterative optimization technique to refine A and B from a random initial guess.

With continued reference to FIG. 25C, it will be appreciated that the flicker fusion threshold of the human visual system places a time constraint on the number of images that may be injected into the eye 210 while still being perceived as being injected simultaneously. For example, the processing bandwidth of the control system 4024 and the ability to switch light-emitting regions of the light source 4026 and light modulators of the spatial light modulator 4018 may limit the number of images that may be injected into the eye 210 within the duration allowed by the flicker fusion threshold. Given this finite number of images, the control system 4024 may be configured to make choices regarding the images that are displayed. For example, within the flicker fusion threshold, the display system may be required to inject a set of parallactically-disparate intra-pupil images into the eye, and in turn each parallax view may require images of various component colors in order to form a full color image. In some implementations, the formation of full color images using component color images is bifurcated from the elucidation of a desired accommodation response. For example, without being limited by theory, it may be possible to elicit the desired accommodation response with a single color of light. In such a case, the parallactically-disparate intra-pupil images used to elicit the accommodation response would only be in the single color. As a result, it would not be necessary to form parallactically-disparate intra-pupil images using other colors of light, thereby freeing up time within the flicker fusion threshold for other types of images to be displayed. For example, to better approximate the wavefront, a larger set of parallactically-disparate intra-pupil images may be generated.

In some other implementations, the control system 4024 may be configured to devote less time within the flicker fusion threshold for displaying images of colors of light for which the human visual system is less sensitive. For example, the human visual system is less sensitive to blue light then green light. As a result, the display system may be configured to generate a higher number of images formed with green light than images formed with blue light.

With reference now to FIG. 25D, an example is illustrated of a projection system 4003 comprising eye tracking system 4022 and a combiner eyepiece 1005 with a pupil expander 1035 configured to produce a non-infinity depth plane. In some implementations, the non-infinity depth plane may be at 3 meters, which offers an in-budget accommodation of ~2.5 meters to infinity. For example, given the tolerance of the human visual system for accommodation-vergence mismatches, virtual content at distances of ~2.5 meters to infinity from the viewer may be placed on the 3 meter depth plane with little discomfort. In such a system, the parallactically-disparate intra-pupil images may be used to drive accommodation for a narrower range of depth planes, possibly all closer to the viewer than the fixed "default" focal plane. In some implementations, this system may also incorporate the eye tracking system 4022 to determine the distance of the viewer's fixation based, e.g., on vergence angles of both eyes of the viewer.

In some implementations, the light source 4026 may be replaced with a virtual light source formed on the image plane of a light projection system. The light projection system may include an actuator capable of causing a beam of light to scan across an area on the image plane corresponding to the virtual light source. To mimic the ability to activate the discrete light-emitting areas of the light source 4026, the output of light by the projection system is synchronized with the movement of the actuator to cause light to be outputted to desired locations on the image plane at particular times. Preferably, the rate at which the actuator is able to scan the beam of light across the image plane is sufficiently high that all desired light output locations on image plane may be accessed during the timeframe in which any given intra-pupil image is displayed. For example, during the amount of time that a particular intra-pupil image is displayed, the actuator is preferable be able to scan a beam of light at least once, and preferably a plurality of times, across the area of the image plane corresponding to the virtual 2D light source.

It will be appreciated that the parallactically-disparate intra-pupil images may be directed into a waveguide having a plurality of in-coupling regions with associated out-coupling regions, as discussed herein. Image light for each of these intra-pupil images may be routed to a desired in-coupling region by various schemes, including: a scanning fiber system, such as discussed regarding FIG. 20; a movable mirror system, such as discussed regarding FIG. 21; and a system forming images for different in-coupling regions at different parts of the spatial light modulator, such as discussed regarding FIG. 22.

Some wavefront approximation techniques are discussed in U.S. Patent App. Pub. No. 2018/0113311, published Apr. 26, 2018, entitled "SYSTEM AND METHOD FOR PRESENTING IMAGE CONTENT ON MULTIPLE DEPTH PLANES BY PROVIDING MULTIPLE INTRA-PUPIL PARALLAX VIEWS", the entire disclosure of which is incorporated by reference herein.

Other Implementations

The various aspects, implementations, implementations or features of the described implementations may be used separately or in any combination. Various aspects of the described implementations may be implemented by software, hardware or a combination of hardware and software. The described implementations may also be embodied as computer readable code on a computer readable medium for controlling manufacturing operations or as computer readable code on a computer readable medium for controlling a manufacturing line. The computer readable medium is any data storage device that may store data, which may thereafter be read by a computer system. Examples of the computer readable medium include read-only memory, random-access memory, CD-ROMs, HDDs, DVDs, magnetic tape, and optical data storage devices. The computer readable medium may also be distributed over network-coupled computer systems so that the computer readable code is stored and executed in a distributed fashion.

The foregoing description, for purposes of explanation, used specific nomenclature to provide a thorough understanding of the described implementations. However, it will be apparent to one skilled in the art that the specific details are not required in order to practice the described implementations. Thus, the foregoing descriptions of specific implementations are presented for purposes of illustration and description. They are not intended to be exhaustive or to limit the described implementations to the precise forms disclosed. It will be apparent to one of ordinary skill in the art that many modifications and variations are possible in view of the above teachings.

It will also be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some implementations, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems may generally be integrated together in a single computer product or packaged into multiple computer products.

In the foregoing specification, the invention has been described with reference to specific implementations thereof. It will, however, be evident that various modifications and changes may be made thereto without departing from the broader spirit and scope of the invention. The specification and drawings are, accordingly, to be regarded in an illustrative rather than restrictive sense. For example, while advantageously utilized with AR displays that provide images across multiple depth planes, the augmented reality content disclosed herein may also be displayed by systems that provide images on a single depth plane.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every implementation.

It will be appreciated that conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. In certain circumstances, multitasking and parallel processing may be advantageous.

Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. A display system comprising:
a light projection system;
a head-mounted display configured to project light into an eye of a user to display virtual image content, the head-mounted display comprising:
at least one waveguide comprising:
a plurality of light in-coupling regions configured to receive light from the light projection system; and
a plurality of light out-coupling regions configured to output light to the eye of the user; and
processing electronics in communication with the display and the light projection system, the processing electronics comprising one or more processors and one or more computer storage media storing instructions that when executed by the one or more processors, cause the one or more processors to perform operations comprising:
determining a location for a virtual object to be presented by the display system;
identifying a light out-coupling region corresponding to the location; and
providing instructions to direct light from the light projection system to a light in-coupling region associated with the identified light out-coupling region, wherein the light is directed to present at least the virtual object.

2. The display system of claim 1, wherein identifying the light out-coupling region comprises:
determining an eye pose of the eye; and
based at least partly on the eye pose, determining a light out-coupling region overlapping the location to be occupied by the virtual object in the field of view.

3. The display system of claim 2, further comprising an inward-facing imaging system configured to capture one or more images of the eye of the user, wherein the operations further comprise:
receiving the one or more images of the eye of the user captured by the inward-facing imaging system; and
determining the eye pose based on the received one or more images.

4. The display system of claim 1, wherein the operations further comprise providing movement for the virtual object.

5. The display system of claim 1, wherein the operations further comprise providing changes to a visual property of the virtual object over time, wherein the visual property comprises one or more of color, size, and brightness.

6. The display system of claim 1, wherein the light in-coupling regions are disposed in a row around at least one side of the plurality of light out-coupling regions.

7. The display system of claim 1, wherein the light projection system comprises at least one light source and at least one movable light injector configured to output image light.

8. The display system of claim 7, wherein the at least one movable light injector comprises a scanning mirror.

9. The display system of claim 7, wherein the at least one movable light injector comprises a scanning fiber injector.

10. The display system of claim 1, wherein the light projection system comprises at least one light source and at least one spatial light modulator configured to modulate light from the at least one light source.

11. The display system of claim 1, wherein the head-mounted display is configured to display virtual objects on a plurality of depth planes.

12. The display system of claim 11, wherein the operations further comprise injecting sets of parallactically-disparate intra-pupil images of the virtual objects into the eye to display the virtual objects on one of the depth planes.

13. The display system of claim 1, wherein the operations further comprise providing instructions to direct light to a plurality of in-coupling elements in the light in-coupling region associated with the identified light out-coupling region.

14. The display system of claim 1, further comprising at least one variable focus lens element on a user side of the at least one waveguide, wherein the at least one variable focus lens element is configured to modify the projected light to correct for a refractive error of the eye of the user.

15. The display system of claim 1, wherein the at least one waveguide is a plurality of waveguides, each of the waveguides comprising a plurality of the light in-coupling regions and a plurality of the light out-coupling regions, wherein the light in-coupling regions of different ones of the waveguides are laterally displaced relative to each other as seen in a head-on plan view as viewed from a direction of in-coming light incident on the light in-coupling regions.

16. The display system of claim 1, wherein the at least one waveguide is a plurality of waveguides, wherein the light out-coupling regions of a same waveguide are configured to output light with a same wavefront divergence, wherein the light out-coupling regions of different waveguides are configured to output light with different amounts of wavefront divergence than the light out-coupling regions of at least one other waveguide, and wherein the different amounts of wavefront divergence correspond to different depth planes.

17. The display system of claim 1, wherein the at least one waveguide is a plurality of waveguides, wherein the light in-coupling regions of each waveguide are configured to in-couple light of a range of wavelengths corresponding to a same component color, wherein the light in-coupling regions of some waveguides are configured to in-couple light of ranges of wavelengths corresponding to different component colors than the light in-coupling regions of other waveguides.

18. The display system of claim 1, wherein the light in-coupling regions comprise diffractive gratings.

19. The display system of claim 1, wherein the light out-coupling regions comprise diffractive gratings.

20. The display system of claim 1, wherein the light projection system comprises a plurality of projectors, and wherein a projector of the plurality of projectors is configured to provide image content for a portion of a field of view of the display system.

* * * * *